(12) United States Patent
Borghetti

(10) Patent No.: US 7,849,213 B1
(45) Date of Patent: Dec. 7, 2010

(54) SECURE COMMUNICATION ARCHITECTURE, PROTOCOLS, AND METHODS

(75) Inventor: William Franklin Borghetti, Salt Lake City, UT (US)

(73) Assignee: Sendside Networks, Inc., Salt Lake City, UT (US)

( * ) Notice: Subject to any disclaimer, the term of this patent is extended or adjusted under 35 U.S.C. 154(b) by 261 days.

(21) Appl. No.: 11/928,295

(22) Filed: Oct. 30, 2007

(51) Int. Cl.
*G06F 15/16* (2006.01)
*G06F 15/173* (2006.01)
*G06F 7/00* (2006.01)
*G06F 17/00* (2006.01)
*G06F 15/177* (2006.01)

(52) U.S. Cl. .................. 709/238; 707/705; 707/609; 715/234; 709/217

(58) Field of Classification Search .......... 709/217–228, 709/236–239; 715/234; 707/705, 609
See application file for complete search history.

(56) References Cited

U.S. PATENT DOCUMENTS

| | | | |
|---|---|---|---|
| 5,889,943 | A | 3/1999 | Ji et al. |
| 6,691,156 | B1 | 2/2004 | Drummond et al. |
| 6,779,021 | B1 | 8/2004 | Bates et al. |
| 6,832,245 | B1 | 12/2004 | Isaacs et al. |
| 6,941,466 | B2 | 9/2005 | Mastrianni |
| 7,039,807 | B2 | 5/2006 | Spitz |
| 7,124,191 | B2 | 10/2006 | McIntyre |
| 7,142,676 | B1 | 11/2006 | Hillier et al. |
| 7,188,358 | B1 | 3/2007 | Hisada et al. |
| 7,243,153 | B2 | 7/2007 | McIntyre |
| 7,398,318 | B2 | 7/2008 | McIntyre |
| 7,398,319 | B2 | 7/2008 | McIntyre |
| 7,596,606 | B2 | 9/2009 | Codignotto |
| 2002/0077986 | A1 | 6/2002 | Kobata et al. |
| 2002/0087647 | A1 | 7/2002 | Quine et al. |
| 2003/0005058 | A1 | 1/2003 | Sorotzkin |
| 2003/0009569 | A1 | 1/2003 | McIntyre |
| 2003/0187942 | A1 | 10/2003 | Quine et al. |
| 2004/0212639 | A1 | 10/2004 | Smoot et al. |
| 2005/0188026 | A1 | 8/2005 | Hilbert et al. |
| 2006/0010365 | A1* | 1/2006 | Bodin et al. ............. 715/500.1 |
| 2006/0010370 | A1* | 1/2006 | Bodin et al. ................ 715/513 |
| 2006/0089837 | A1 | 4/2006 | Adar et al. |
| 2006/0095511 | A1 | 5/2006 | Munarriz |
| 2006/0095524 | A1 | 5/2006 | Kay et al. |
| 2006/0190734 | A1 | 8/2006 | Spitz |
| 2006/0195527 | A1 | 8/2006 | Allen et al. |

(Continued)

OTHER PUBLICATIONS

E-Discovery E-Tip #6, Mark & Associates, retrieved May 24, 2007. markandassociates.com, p. 1.

(Continued)

*Primary Examiner* — Haresh N Patel
(74) *Attorney, Agent, or Firm* — Workman Nydegger

(57) ABSTRACT

A trusted network system includes a data center, a gateway, and a trusted sender registry that provide a secure network to allow one or more user clients to generate and send communications to one or more recipients. The data center, gateway and trusted sender registry act independently and/or conjunctively to increase the likelihood that only desirable communications enter the secure network formed by the data center and bounded by the gateway. The systems and methods of the present invention drastically reduce spam and network resources as well as provide enhanced messaging, document management, and tracking features that make communications more meaningful and more versatile to senders and recipients.

17 Claims, 37 Drawing Sheets

U.S. PATENT DOCUMENTS

| | | | |
|---|---|---|---|
| 2006/0200547 A1* | 9/2006 | Edwards et al. | 709/224 |
| 2007/0106741 A1 | 5/2007 | Christoff et al. | |
| 2008/0089516 A1* | 4/2008 | Cocchi et al. | 380/200 |
| 2008/0154969 A1* | 6/2008 | DeBie | 707/200 |
| 2008/0154970 A1* | 6/2008 | DeBie | 707/200 |
| 2009/0164598 A1 | 6/2009 | Nelson et al. | |
| 2009/0177673 A1 | 7/2009 | Cunningham | |
| 2010/0017864 A1 | 1/2010 | Codignotto | |

OTHER PUBLICATIONS

Cheng, Nathan, Hypertext Mail Protocol (aka Stub Email): A Proposal, online (retrieved Jun. 12, 2007), http://www.circleid.com/posts/print/hypertext_mail_protocol_aka_stub_emaill/, p. 1.

Internet Mail 2000, online (retrieved Jun. 12, 2007), http//:en.wikipedia.org/wiki/Internet_mail_2000, p. 1.

Bernstein, D. J., Internet Mail 2000, online (retrieved Jun. 12, 2007), http://cr.yp.to/im2000.html/, p. 1.

de Boyne Pollard, Jonathan, Fleshing out IM2000, online (retrieved Jun. 12, 2007), http://homepages.tesco.net/~J.deBoynePollard/Proposals/IM2000/, p. 1.

de Boyne Pollard, Jonathan, IM2000 Design Principles, online (retrieved Jun. 12, 2007), http://homepages.tesco.net./~J.deBoynePollard/Proposals/IM2000/design.html, p. 1.

de Boyne Pollard, Jonathan, IM2000: Architecture, online (retrieved Jun. 12, 2007), http://homepages.tesco.net./~J. deBoynePollard/Proposals/IM2000/Architecture/, p. 1.

de Boyne Pollard, Jonathan, Case Study of IM2000: Lucy reading her mail, online (retrieved Jun. 12, 2007), http://homepages.tesco.net./~J.deBoynePollard/Proposals/IM2000/CaseStudies/lucy-reading-her-mail/, p. 1.

de Boyne Pollard, Jonathan, Case Study of IM2000: A public mailing list, online (retrieved Jun. 12, 2007), http://homepages.tesco.net./~J.deBoynePollard/Proposals/IM2000/CaseStudies/public-mailing-list/. p. 1.

de Boyne Pollard, Jonathan, Case Study of IM2000: Bill sending a message to Ben, online (retrieved Jun. 12, 2007), http://homepages.tesco.net./~J.deBoynePollard/Proposals/IM2000/CaseStudies/bill-and-ben/, page 1.

de Boyne Pollard, Jonathan, IM2000 and Unsolicited Bulk mail, online (retrieved Jun. 12, 2007), http://homepages.tesco.net.~J.deBoynePollard/Proposals/IM2000/anti-ubm.html/, p. 1.

de Boyne Pollard, Jonathan, Constructing shims to allow old SMTP/POP3 MUAs to interact with IM2000, online (retrieved Jun. 12, 2007), http://homepages.tesco.net.~J.deBoynePollard/Proposals/IM2000/shims.html/, p. 1.

de Boyne Pollard, Jonathan, Answers to Dan Bernstein's questions, online (retrieved Jun. 12, 2007), http://homepages.tesco.net./~J.deBoynePollard/Proposals/IM2000/djb-answers.html, p. 1.

de Boyne Pollard, Jonathan, So you want to migrate to IM2000, do you?, online (retrieved Jun. 12, 2007), http://homepages.tesco.net./~J.deBoyne-Pollard/Proposals/IM2000/migration.html, p. 1.

de Boyne Pollard, Jonathan, Differences from SMTP-based Internet mail, online (retrieved 06/12/2007), http://homepages.tesco.net./~J.deBoynePollard/Proposals/IM2000/differences-from-smtp.html, p. 1.

Duan, Zhenhai, DMTP: Controlling Spam Through Message Delivery Differentiation, (retrieved Jun. 12, 2007), http://www.cs.fsu/edu/research/reports/TR-041025.pdf, p. 1.

U.S. Appl. No. 11/931,367, Aug. 6, 2009, Office Action.

U.S. Appl. No. 11/925,836, Aug. 28, 2009, Office Action.

Asleson, Foundations of Ajax, 2006, pp. 1-37, Dec. 31.

U.S. Appl. No. 11/925,343, mailed Feb. 17, 2010, Office Action.

U.S. Appl. No. 11/925,836, mailed Apr. 9, 2010, Office Action.

U.S. Appl. No. 11/927,212, mailed Mar. 18, 2010, Office Action.

U.S. Appl. No. 11/931,367, mailed Apr. 12, 2010, Office Action.

* cited by examiner

```xml
402 — <?xml version="1.0" encoding="ISO-8859-1" ?>
      - <esmp xmlns:xsi="http://www.w3.org/2001/XMLSchema-instance"
          xsi:noNamespaceSchemaLocation="esmp.xsd" xmlns:msg="smp.schema.smp"
          xmlns:tab_ai="smp.schema.accountInfoTab" xmlns:tab_msg="smp.schema.messageTab">
          <!-- Specific information comming from atlantis -->
        - <communication-info>
            <companyFrom>9</companyFrom>
404         <sentDt>2006-05-23T09:30:10.5</sentDt>
            <externalMessageId>1</externalMessageId>
            <server>www.anyenterpriseserver.com</server>
          </communication-info>
405 —     <!-- Message information -->
        - <smp>
          - <sender>
406           <id>6</id>
            </sender>                                             400
          - <recipients>
            - <recipient>
411             <id>5</id>
                <email />
                <type>0</type>
409             <!-- TO -->
                <senderName>Jonathan "Jon" Gamba</senderName>
              </recipient>
            - <recipient>
                <id />
                <email>test@email.com</email>
408             <type>1</type>
                <!-- CC -->
                <senderName>Jonathan Gamba</senderName>
              </recipient>
            - <recipient>
                <id>3</id>
                <email />
                <type>1</type>
                <!-- CC -->
                <senderName>Jonathan "Jon" Gamba</senderName>
              </recipient>
410         </recipients>
            <priority>1 (Highest)</priority>
          - <messageDetail>
              <subject>BitTorrent Addresses Closed Source Issues</subject>
412           <body contentType="plain/text">BitTorrent 6.0, the official mainline client based on uTorrent,
                was released on July 28, 2006...   </body>
            </messageDetail>
          - <tabs>
            - <tab type="message" version="1">
414             <tab_msg:message>BitTorrent 6.0, the official mainline client based on uTorrent, was
                  released on July 28, 2006....'</tab_msg:message>
              </tab>
            - <tab type="accountInfo" version="1.1">
              - <tab_ai:accountInfo>
                - <login>
                    <url>https://www.zionsbanks.com</url>
                  </login>
                - <account>
                    <balance>6450.05</balance>
416                 <number>4589</number>
                    <type>primary</type>
                  </account>
                - <certificate>
                    <url>http://www.sendside.com/certificates/messages/A23RtBn88Vv9Kp</url>
                    <issueDate>2006-05-22T15:58:10.5</issueDate>
                    <certNumber>7867868686868</certNumber>
                  </certificate>
                </tab_ai:accountInfo>
```

FIG. 4

```
            </tab>
          </tabs>
        </smp>
        <!-- Attachments list -->
      - <attachments>
        - <attachment>
            <name>AprilStatement.pdf</name>
419 ──────<category>balance</category>
            <mimeContent>LKJLJLJIGUIUGYTDTRDREY LKJLJLJIGUIUGYTDTRDREY
              LKJLJLJIGUIUGYTDTRDREY LKJLJLJIGUIUGYTDTRDREY LKJLJLJIGUIUGYTDTRDREY
418 {         LKJLJLJIGUIUGYTDTRDREY LKJLJLJIGUIUGYTDTRDREY LKJLJLJIGUIUGYTDTRDREY
              LKJLJLJIGUIUGYTDTRDREY LKJLJLJIGUIUGYTDTRDREY LKJLJLJIGUIUGYTDTRDREY
              LKJLJLJIGUIUGYTDTRDREY LKJLJLJIGUIUGYTDTRDREY LKJLJLJIGUIUGYTDTRDREY
              LKJLJLJIGUIUGYTDTRDREY</mimeContent>
            <size>1900</size>
          </attachment>
        - <attachment>
            <name>MayStatement.pdf</name>
            <category>balance</category>
            <mimeContent>OIUIHUGITYYF879756URYTRHGF OIUIHUGITYYF879756URYTRHGF
420 {         OIUIHUGITYYF879756URYTRHGF OIUIHUGITYYF879756URYTRHGF
              OIUIHUGITYYF879756URYTRHGF OIUIHUGITYYF879756URYTRHGF
              OIUIHUGITYYF879756URYTRHGF OIUIHUGITYYF879756URYTRHGF</mimeContent>
            <size>2400</size>
          </attachment>
        </attachments>
      </esmp>
```

Compose Secure Mesage

| Secure | Unsecure (email) | | | | Monday, June 25, 2007 | 11:08 pm |

| Send | Attach | Spell | Options | Save | Cancel |

From: [William Borghetti ▼]   ☐ Use as default ID

To: [                    ]   ▣ Add CC
                             ▣ Add BCC

Subject: [                    ]

Body: [                    ]

FIG. 7E

Monday, June 25, 2007    12:51 pm

| | Secure Messaging | Documents | Contacts | Options | Help | Feedback | |

Secure Messaging - Sent

| Inbox | Sent | Drafts | Archive | Trash |

◩ 4 Matching    ⌂ 5 Total

| | Update | Compose | Send Reminder | Recall | Forward | Delete | |
| Date: | Today | Week | Month | 3 Months | 6 Months | Year | All | Advanced |

| ☐ | Subject | Recipients | Read/Unread | Size | Date ◩ |
|---|---|---|---|---|---|
| ☐ 🖉 | Getting over the next hurdle...Confidential | Richard "Dick" Shanaman, Geoff Kahler | 1/2 | 94k ☐ | 9:27 AM |
| ☐ 🖉 | Approval Needed | Erik Christiansen, Richard "Dick" Shanaman | 1/1 | 35k | 23Jun2007, 6 |
| ☑ | Need to set up a BOD Meeting | Board Of Directors(L), Geoff Kahler | 3/1 | 1k ☐ | 21Jun2007, 6 |

| Message | Summary | Attachments | Reach | Activity Log | | Full Report |

To:  Board of Directors(L) Dave Colbert ☑, Jane Doe ☑, Joe Johnson ☑, Geoff Kahler ☑
Subject: Need to set up a BOD Meeting Hello all, Its that time again. When and where should the next BOD Meeting be?

-W

© 2007 Sendside Networks, Inc. All Rights Reserved. Privacy Policy Terms of Service powered by Sendside NETWORKS

*FIG. 8B*

Monday, June 25, 2007   12:51 pm

| | Secure Messaging | Documents | Contacts | Options | Help | Feedback | |

Secure Messaging - Sent

| Inbox | Sent | Drafts | Archive | Trash |

◧ 4 Matching  ◈ 5 Total

| | Update | Compose | Send Reminder | Recall | Forward | Delete | |

Date: | Today | Week | Month | 3 Months | 6 Months | Year | All |   Advanced

| ☐ | Subject | Recipients | Read/Unread | Size | Date |
|---|---|---|---|---|---|
| ☐ 📎 | Getting over the next hurdle...Confidential | Richard "Dick" Shanaman, Geoff Kahler | 1/2 | 94k ☐ | 9:27 AM |
| ☐ 📎 | Approval Needed | Erik Christiansen, Richard "Dick" Shanaman | 1/1 | 35k | 23Jun2007, 6 |
| ☑ | Need to set up a BOD Meeting | Board Of Directors(L), Geoff Kahler | 3/1 | 1k ☐ | 21Jun2007, 6 |

| Message | Summary | Attachments | Reach | Activity Log |    Full Report

Sort By: | Read | Unread    Recipient Name

☑  
Read  
Dave Colbert

☑  
Read  
Geoff Kahler

☑  
Read  
Joe Johnson

☑  
Unread  
Jane Doe

Message Options
- ☑ Priority
- ☐ Forward Prevention

Attachments
None

Read/Unread:
Original Recipients: 3/1 (75%)
All Recipients: 4/2 (66%)

Message Reach
Total Unique Recipients: 8
Generations: 2

Recalls
None

© 2007 Sendside Networks, Inc. All Rights Reserved. Privacy Policy  Terms of Service powered by ◉ Sendside™ NETWORKS

*FIG. 8C*

Monday, June 25, 2007    12:52 pm

| 🏠 | Secure Messaging | Documents | Contacts | Options | Help | Feedback | |

Secure Messaging - Sent

| Inbox | Sent | Drafts | Archive | Trash |

🌐 4 Matching    🌐 5 Total

| | Update | Compose | Send Reminder | Recall | Forward | Delete | |

Date: | Today | Week | Month | 3 Months | 6 Months | Year | All | Advanced

| ☐ | Subject | Recipients | Read/Unread | Size | Date |
|---|---------|------------|-------------|------|------|
| ☐ 📎 | Getting over the next hurdle...Confidential | Richard "Dick" Shanaman, Geoff Kahler | 1/2 | 94k ☐ | 9:27 AM |
| ☐ 📎 | Approval Needed | Erik Christiansen, Richard "Dick" Shanaman | 1/1 | 35k | 23Jun2007, 6 |
| ☑ | Need to set up a BOD Meeting | Board Of Directors(L), Geoff Kahler | 3/1 | 1k ☐ | 21Jun2007, 6 |

| Message | Summary | Attachments | Reach | Activity Log | | Full Report |

Activity as of:  29 JUL 2006, 10:14 AM    ⬇ Update

| Attachment Name | Recipient Name | Date |
|-----------------|----------------|------|
| 📎 📊 ConfidentialExcelFile.xls (53k) | Geoff Khaler | |
| | Richard "Dick" Shanaman | 7 JUL 2006, 2:07 PM (Viewed) |
| | William "Bill" Boyd | |

© 2007 Sendside Networks, Inc. All Rights Reserved. Privacy Policy  Terms of Service    powered by 🌐 Sendside™ NETWORKS

*FIG. 8D*

Monday, June 25, 2007    12:52 pm

| 🏠 | Secure Messaging | Documents | Contacts | Options | Help | Feedback | |

Secure Messaging - Sent

| Inbox | Sent | Drafts | Archive | Trash |    ☑ 4 Matching   @ 5 Total

| | Update | Compose | Send Reminder | Recall | Forward | Delete | |

Date: | Today | Week | Month | 3 Months | 6 Months | Year | All | Advanced

| ☐ | Subject | Recipients | Read/Unread | Size | Date |
|---|---|---|---|---|---|
| ☐ 📎 | Getting over the next hurdle...Confidential | Richard "Dick" Shanaman, Geoff Kahler | 1/2 | 94k ☐ | 9:27 AM |
| ☐ 📎 | Approval Needed | Erik Christiansen, Richard "Dick" Shanaman | 1/1 | 35k | 23Jun2007, 6 |
| ☑ | Need to set up a BOD Meeting | Board Of Directors(L), Geoff Kahler | 3/1 | 1k ☐ | 21Jun2007, 6 |

| Message | Summary | Attachments | Reach | Activity Log |    Full Report

| Original Recipients | Read Message? | Att(s) Viewed? | Resent To Others? | |
|---|---|---|---|---|
| ☐ To: Richard Shanaman | 3 | 1 of 2 | 2 | |
| ☐ To: Geoff Kahler | No | No | No | |
| ☐ Cc: William Boyd | 3 | No | 2 | Each selection from the left will open additional information in this area |
| | 66% | 33% | 4 | |

▶ Update

Total Original Recipients  3

© 2007 Sendside Networks, Inc. All Rights Reserved. Privacy Policy  Terms of Service     powered by Sendside NETWORKS

*FIG. 8E*

Monday, June 25, 2007    12:52 pm

| Secure Messaging | Documents | Contacts | Options | Help | Feedback |

Secure Messaging - Sent

| Inbox | Sent | Drafts | Archive | Trash | | 4 Matching   5 Total |

| | Update | Compose | Send Reminder | Recall | Forward | Delete | |

Date: | Today | Week | Month | 3 Months | 6 Months | Year | All | Advanced |

| ☐ | Subject | Recipients | Read/Unread | Size | Date |
|---|---|---|---|---|---|
| ☐ | Getting over the next hurdle...Confidential | Richard "Dick" Shanaman, Geoff Kahler | 1/2 | 94k | 9:27 AM |
| ☐ | Approval Needed | Erik Christiansen, Richard "Dick" Shanaman | 1/1 | 35k | 23Jun2007, 6 |
| ☑ | Need to set up a BOD Meeting | Board Of Directors(L), Geoff Kahler | 3/1 | 1k | 21Jun2007, 6 |

| Message | Summary | Attachments | Reach | Activity Log | | Full Report |

Activity as of: 29 JUL 2006, 10:14 AM    Update

| User | Activity | Date |
|---|---|---|
| Geoff Kahler | Reminder Sent | 9 JUL 2006, 11:34 AM |
| Richard "Dick" Shanaman | Message Deleted | 7 JUL 2006, 2:11 PM |
| Richard "Dick" Shanaman | Deleted (someWordDoc.doc) | 7 JUL 2006, 2:10 PM |
| Richard "Dick" Shanaman | Downloaded (someWordDoc.doc) | 7 JUL 2006, 2:09 PM |
| Richard "Dick" Shanaman | Deleted (ConfidentialExcelFile.xls) | 7 JUL 2006, 2:09 PM |
| Richard "Dick" Shanaman | Downloaded (ConfidentialExcelFile.xls) | 7 JUL 2006, 2:08 PM |
| Richard "Dick" Shanaman | Viewed (ConfidentialExcelFile.xls) | 7 JUL 2006, 2:07 PM |
| Richard "Dick" Shanaman | Message Forwarded | 7 JUL 2006, 2:02 PM |
| Richard "Dick" Shanaman | Replied to Message | 7 JUL 2006, 1:56 PM |
| Richard "Dick" Shanaman | Message Read | 7 JUL 2006, 1:49 PM |

© 2007 Sendside Networks, Inc. All Rights Reserved.  Privacy Policy  Terms of Service            powered by Sendside NETWORKS

*FIG. 8G*

| MESSAGE ID: 34567 | SENT: 12 Nov. 2006 1:25pm | MESSAGE RECALLED: No |

 SENDER:
William Borghetti
william@transparent.com

 RECIPIENT:
Dave Colbert
dave@transparent.com

Subject: Annual Meeting Minutes

| Message | VIEW STATUS |
|---|---|
| Hi Dave,<br><br>Please take a look at the attached minutes and let me know if you have any revisions. They need to be submitted by the 30th. I attached last years minutes for reference.<br><br>Thanks,<br>William | VIEWED BY: Dave Colbert<br>VIEW DATE: 12 Nov. 2006 2:06pm |

| Attachment(s) | VIEW STATUS |
|---|---|
| BOD_minutes06.ext (document ID#234567) | OPENED BY: Dave Colbert<br>OPEN DATE: 12 Nov. 2006 2:06pm |
| BOD_minutes05.ext (document ID#234566) | Unopened |

| Options |
|---|
| Marked Urgent; Password Required |

Receipt Created: 12 Dec. 2006 4:26pm     Receipt Created For: William Borghetti

Signature: _____   Date Signed: _____

*FIG. 8H*

Monday, June 25, 2007    11:05 pm

| 🏠 | Secure Messaging | Documents | Contacts | Options | Help | Feedback | 📄 |

Documents - Repository

Repository                                                          ⊠ 3 Matching   📧 41 Total

| Add File | Send Message | Properties | View | Download | Delete |

NARROW LIST BY:                    Date: | Today | Week | Month | 3 Months | 6 Months | Year | All |
Source  Category      Reset        Advanced

| Name | ☑ All |
|---|---|
| 🏠 Alistate Insurance | [2] ☐ |
| 🏠 Amy Farr | [2] ☐ |
| 🏠 Bill Boyd | [1] ☐ |
| 🏠 Cingular Wireless | [3] ☐ |
| 🏠 Countrywide Financial | [1] ☐ |
| 🏠 Dave Colbert | [3] ☐ |
| 🏠 David Emmit | [1] ☐ |
| 🏠 Doug Mealing | [1] ☐ |
| 🏠 Erik Christiansen | [0] ☐ |
| 🏠 Geoff Kahler | [1] ☐ |
| 🏠 Rocky Mountain Power | [0] ☐ |
| 🏠 Wels Fargo | [6] ☐ |
| 🏠 William Borghetti | [1] ☐ |

| ☐ | File Name▼ | Source | Category | Date |
|---|---|---|---|---|
| ☐ 📄 | CreditCards.pdf | | | Zions State 10 3⁵ PA |
| ☐ 📄 | Meeting_Agenda.pdf | | | Dave Worl 22 3⁵ |
| ☐ 📄 | OverdraftProtection.pdf | | | Zions state 10 2⁵ PA |

Sources: All  |  Categories: All

© 2007 Sendside Networks, Inc. All Rights Reserved. Privacy Policy Terms of Service          powered by 🌐 Sendside™ NETWORKS

*FIG. 9A*

Monday, June 25, 2007    11:06 pm

| 🏠 Secure Messaging | Documents | Contacts | Options | Help | Feedback | 📄 |

Documents - Repository

Repository                                    ⊗ 3 Matching    ⊕ 41 Total

| Add File | Send Message | Properties | View | Download | Delete |

NARROW LIST BY:  Reset    Date: | Today | Week | Month | 3 Months | 6 Months | Year | All |
Source  Category                Advanced

| Name | ☑ All | | ☐ | File Name ▼ | Source | Category | Date | Size |
|---|---|---|---|---|---|---|---|---|
| Agreements | [5] ☐ | | | | | | | |
| Banking | [7] ☐ | | ☐ 📄 CreditCards.pdf | | | Zions Stat | 10 PA | 36 |
| Brokerage Accounts | [0] ☐ | | ☐ 📄 Meeting_Agenda.pdf | | | Dave Worl | 22 | 36 |
| Credit Cards | [0] ☐ | | | | | | | |
| eCommerce | [0] ☐ | | ☐ 📄 OverdraftProtection.pdf | | | Zions state | 10 PA | 25 |
| Forms | [11] ☐ | | | | | | | |
| Healthcare | [0] ☐ | | | | | | | |
| Insurance | [2] ☐ | | | | | | | |
| Invoices | [0] ☐ | | | | | | | |
| Legal | [0] ☐ | | | | | | | |
| Mortgage | [1] ☐ | | | | | | | |
| Notices | [3] ☐ | | | | | | | |
| Personal | [0] ☐ | | | | | | | |

Sources: All | Categories: All

© 2007 Sendside Networks, Inc. All Rights Reserved.  Privacy Policy  Terms of Service      powered by 🌐 Sendside™ NETWORKS

*FIG. 9C*

Monday, June 25, 2007    11:06 pm

| 🏠 | Secure Messaging | Documents | Contacts | Options | Help | Feedback | 🖥 |

Documents - Repository

Repository                                                         📄 3 Matching  📄 41 Total

| Add File | Send Message | Properties | View | Download | Delete |

| NARROW LIST BY: | Reset | Date: | Today | Week | Month | 3 Months | 6 Months | Year | All |
| Source  Category | | Advanced |

| Name | ☑ All | File Name: [            ] | File Type: 📄 📄 📄 ☑ All |
|---|---|---|---|
| Agreements | [5] ☐ | ☐  File Name▼  Source | Category | Date |
| Banking | [7] ☐ | ☐ 📄 CreditCards.pdf | Zions State | 10 35 PM |
| Brokerage Accounts | [0] ☐ | ☐ 📄 Meeting_Agenda.pdf | Dave Worl | 22 36 |
| Credit Cards | [0] ☐ | ☐ 📄 OverdraftProtection.pdf | Zions state | 10 25 PM |
| eCommerce | [0] ☐ | | | |
| Forms | [11] ☐ | | | |
| Healthcare | [0] ☐ | | | |
| Insurance | [2] ☐ | | | |
| Invoices | [0] ☐ | | | |
| Legal | [0] ☐ | | | |
| Mortgage | [1] ☐ | | | |
| Notices | [3] ☐ | | | |
| Personal | [0] ☐ | | | |

Sources: All   Categories: All

© 2007 Sendside Networks, Inc. All Rights Reserved. Privacy Policy Terms of Service        powered by  Sendside™ NETWORKS

FIG. 9D

SECURE COMMUNICATION ARCHITECTURE, PROTOCOLS, AND METHODS

CROSS-REFERENCE TO RELATED APPLICATIONS

Not applicable.

BACKGROUND OF THE INVENTION

1. The Field of the Invention

The present invention relates to secure communications and/or communication technologies that allow people to interact and transact with individuals and/or organizations. In particular, the present invention relates to systems and methods for forming a trusted network while providing various security, scalability, interaction, user interface elements and trackability features for communications and/or transactions occurring in association with the trusted network.

2. The Relevant Technology

The digital age has revolutionized the way that people communicate with each other—both for personal communications and business communications. For some people, email is the preferred method of communication and has replaced other forms of communication such as in person meetings, telephonic conversations, standard post, facscimile, and the like. However, despite the obvious convenience and cost advantage of sending information electronically, many individuals and organizations are still unable to use email due to structural weaknesses and vulnerabilities found in the underlying technology: SMTP. SMTP (Simple Mail Transfer Protocol) was designed in 1982 as a simple communication protocol to facilitate the transfer of messages from one machine on a network to a user on another machine. SMTP was developed in a trust-based environment and came to light long before eCommerce, online banking, healthcare, and legal industries presented new, more stringent requirements as to how information should be sent. Although security remains one of the primary concerns and reasons that individuals and organizations are unable to use SMTP-based email, there are other issues including a lack of functionality and an inability to compose, transport and display complex sets of information that go beyond simple text.

SMTP, specifically, lacks a basic facility to authenticate senders and recipients on the network and permits users to construct messages fraudulently and masquerade as other individuals or organizations. The underlying network construct and protocol do nothing to prevent this and instead rely on the recipient to wade through all incoming messages to determine which are legitimate and which are not.

Spam, or unsolicited email has risen significantly in occurrence over the past decade and, by some accounts, accounts for more than 90% of all email traffic. SMTP was built to ensure delivery of a message, not prevent messages from being sent. As a result, there is no provision within the SMTP protocol to examine messages at the point of entry into the network, only to filter what is received on the other end. This places a huge cost and administrative burden on the recipient to have the bandwidth, hardware, software and time to manage it all.

Thus, it would be advantageous to assure a sender that a communication will get to its intended destination in its original form and, conversely, assure a recipient that a communication is coming from a trusted person or source. SMTP has no provisions to guarantee the origin on the message and who sent it. SMTP is unable to determine the sender type. It would be advantageous to notify a recipient whether the message originated from a known and institution or individual.

SMTP also has no provisions to determine the type of message traveling through a server. This is an important functional shortcoming in that many recipients would like to receive certain types of information from an individual or organization, but not others. For example, users may want to receive a bank statement, but not promotional material from a bank.

In addition, SMTP is a simple, text-based protocol. If the sender includes any additional content other than text in the SMTP message, the additional content (such as binary data, audio, video, etc.) must be munged (attached) to the SMTP message body via Multipurpose Internet Mail Extensions (MIME). This approach to dealing with binary data requires that the content or application be handed off to the operating system and/or a "helper" application. This redirection outside of the email environment is a key attribute to modern Phishing attacks (email fraud attacks) where users are asked to click on a link embedded in an email message and are redirected to a fraudulent website. Further, the additional content is always related to the SMTP message body, which makes it difficult to file, sort, and organize the additional content for both the sender and the recipient.

Furthermore, communication systems across organizations are tied to the email address paradigm in which the DNS naming system has conventionally been used to direct messages from a sender to a recipient. Thus, if a person does not know a person's email address, it is difficult to contact that person through electronic means. In addition, even if a person has an email address, it is difficult to keep this information updated and current. Often a person trying to contact another person is informed by a webmaster or server that the recipient's email address is no longer functional, but is given no other information on how to contact that recipient. It would be desirable to have the ability to contact individuals and organizations electronically without total reliance on email addresses for that information.

Another aspect of inflexibility is the inability of a sender or recipient to define where and how messages are stored. With SMTP-based email, messages simply arrive in a given user's inbox. When the sender transmits large files, it is difficult for the recipient to retrieve important messages when a large attachment is ahead of these messages in download order. Also, the current email paradigm generally prevents users from having adequate storage space which means that certain messages are likely to be returned as undeliverable. For example, if a sender is sending a large file (5 MB) to a recipient, the sender may not want to commit the recipients to storing such a large file in the recipient mailbox.

SMTP is also highly inefficient sending messages and attachments to multiple recipients. For example, when a sender creates and sends a 5K message and 5 MB attachment to 10 unique recipients, that message is replicated 10 times and will be sent out to each recipient. This results in 50K of bandwidth and storage for the message body and 50 MB for the attachment.

Given the inefficiencies mentioned above, there is a need to reduce the sheer amount of information being sent out in an effort to reduce hardware, software and bandwidth requirements. When having to send an SMTP message to potentially millions of individuals, the organization must be equipped to handle the bandwidth required to accomplish this. In addition, network activities which require individuals to access the organization can cause bandwidth problems at peak high usage times, etc. It would be an advantageous to send only a minimum amount of information.

Although solutions exist today to provide some level of control over email sent within an organization's boundary, SMTP cannot provide any sort of control over each message once it has left the organization. For example, the organization does not have control over who has access to a message or its attachments, where copies are stored, who is forwarding the communication, preventing alteration of the communication, retracting the communication, etc. It would be advantageous to provide organizations with the ability to maintain control over aspects of messaging that occur once the communication leaves the organizational boundary.

There are many inefficiencies with regard to how SMTP routes message traffic, and deliverability in general, which would be advantageous to resolve. For example, there is no provision within SMTP to provide delivery notification back to the sender. Additionally, should a machine be offline and be unable to process inbound email traffic as expected, emails may queue up for an inordinate amount of time and no timely notification will be sent to either the recipient or the sender. There is also no concept within SMTP of being able to get a message back once it has left the organizational boundary. SMTP operates on a system of "fire and forget." It would be advantageous to be able to retrieve messages and/or perform verifications, approvals, or other analysis on a message and/or recipients of a message determine whether it the message should be sent into the network.

SMTP is one-dimensional as an electronic communication technology. SMTP cannot distinguish between a message that is high-priority and one that is of a lower priority. They are all treated the same. It would be advantageous to route important or priority messages differently, according to the priority or importance of the message, depending on the desires of the sender or the recipient. For example, it would be beneficial to receive an SMS, Fax or phone call should a fraud alert be sent from a person's bank, and not just an email message.

Finally, SMTP messaging has no facility to provide for categorization of messages or attachments. It would be advantageous, for example, to have a bank statement be categorized automatically as a "statement" so that it could be filed or otherwise treated uniquely on the receiving end as a statement.

BRIEF DESCRIPTION OF THE DRAWINGS

To further clarify the features of the present invention, a more particular description of the invention will be displayed by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 4 illustrates an exemplary XML file implementing sendside message protocol.

FIG. 7A illustrate a screen shot of a home page displayed to a user.

FIG. 7D illustrates a screen shot of an inbox displayed to a user.

FIG. 7E illustrates a screen shot of a communication composition window.

FIG. 8B illustrates a screen shot of a sent page.

FIG. 8C illustrates a screen shot of message summary.

FIG. 8D illustrates a screen shot of content files.

FIG. 8E illustrates a screen shot of tracking information.

FIG. 8G illustrates a screen shot of an activity log.

FIG. 8H illustrates a tracking report.

FIG. 9A illustrates a content file search page that can be organized by source.

FIG. 9C illustrates a document page that can be organized by category.

FIG. 9D illustrates an advanced document features page.

DETAILED DESCRIPTION OF THE PREFERRED EMBODIMENTS

The present invention is generally directed to systems and methods for providing secure, synchronous and asynchronous electronic communications and/or messaging in a manner that addresses many of the problems that result from SMTP protocol-based messaging. The present invention provides a private, managed communication network that does not rely on the open architecture and vulnerabilities of SMTP, while still being able to providing trust, security, flexibility, scalability and ease of communication between parties.

I. Exemplary Network Environment

The inventive, secure communication network, unlike a traditional SMTP-based email network, is highly versatile, scalable and may be configured in a variety of ways to permit the sending and receiving of important communications from the source to the destination, depending on the type of information being sent and the needs and/or preferences of the sender and/or recipient. The network consists of four primary components: 1) a data center, 2) a gateway appliance, 3) a Trusted Sender Registry (TSR) and 4) various end users that are able to access the network through user client computers or devices.

Figure 1A:
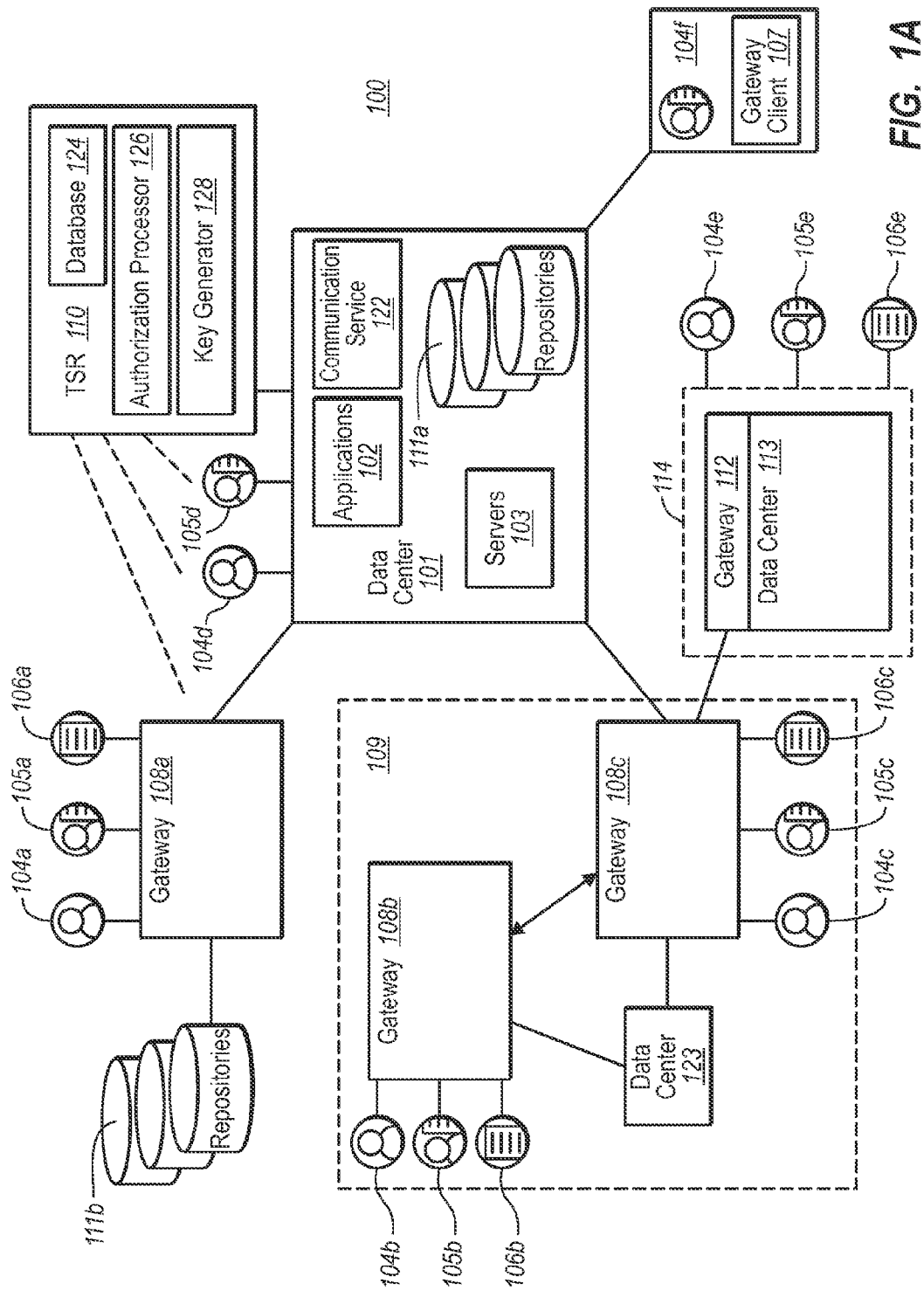
FIG. 1A illustrates a block diagram of an exemplary network environment.

FIG. 1A illustrates an exemplary network environment 100 showing various configurations for implementing the data center, gateway, TSR, and/or end-user clients (or users). FIG. 1A depicts a data center 101 that includes of a variety of applications 102 and database servers 103 which, among other things, provide authentication, and access to information to one or more end users types 104, 105, 106. Broadly, a "data center" is responsible for receiving, analyzing, storing, managing, generating, and delivering messages to one or more users. The data center 101 can provide standard messaging functionalities as well as the unique communication and messaging functionalities of the present invention. Particularly, when a message is received by the data center formatted in what is referred to herein as "sendside messaging protocol" (SMP), the data center recognizes and perform certain functionalities based on the SMP. The data center 101 may be designed and implemented in a variety of ways and may include a single access point or, in the case of a large distributed system, may be replicated and may exist in many locations. The purpose of the data center 101 is to provide a central point of access and storage for all aspects of a message. This allows a user to access messages from any location, anywhere in the world, provided that Internet connectivity is available. The data center 101 will be described in further detail below.

FIG. 1A shows that one or more gateways 108a, 108b, 108c can connect to a data center 101 in a hub and spoke configuration. A "gateway" serves as an access point for an organization to the network, effectively listening for inbound connections from end users and ultimately directing that traffic toward the secure network. The gateway is managed centrally, to allow for remote updates and for an organization to control access to and from the gateway. The gateway allows the sending organization to increase the value of the communication flowing through the network. The organization can create rules to define predetermined conditions that govern how messages are sent, a timing by which messages are sent, how messages are rendered to recipients, categorization of messages, and the like. As used herein, the term "render" broadly refers to various ways in which a message can be presented to a user including visually on a display, audibly on an audio device, and/or tactically by a tactile device, and the like. For example, a message can be rendered on a user interface of a computer, a telephone, a post card, a television, and the like.

Additionally, the gateway provides a conversion, from a standard, open SMTP format to a more robust, SMP format for storage into a relational database at the data center for further access and retrieval to render the message. Information may be sent to the gateway in a variety of ways including, but not limited to, SMTP (with an embedded SMTP server or SMTPd running), direct post SMP for senders that may already have message data in that form, via web service or SOAP, and the like. This gives the organization using the gateway the ability to send messages using means other than properly formatted SMTP.

Once a message has undergone one or more verifications, approvals, and/or transformations, it is held at the gateway before sending. The gateway checks the load at the given data center and determines when the message should be sent to the recipient, depending on characteristics of the message (such as priority, category, notification preferences, confidentiality). In addition, the gateway can be configured to restrict or deny sending messages into the network, and route information instead via SMTP, or delete and not send at all. Aspects of the gateway will be described in further detail below.

A gateway generally physically resides at an organization and defines an access point for an organization to enter the secure network provided by gateways 108 and data center 101. As depicted in FIG. 1A, an organization 109 can include more than one gateway 108b, 108c (e.g., for parent and subsidiary organizations), with the gateways belonging to the organization being able to communicate with each other and to the data center 101.

FIG. 1A also shows that different types of end-users 104, 105, 106 can access the gateway 108 through, for example, a Mail User Agent (MUA) executed through a browser operating on a user client computer, PDA, mobile phone, or the like. User accounts are generally profile-based, and sending messages to a user can be done by identifying an external address. An "external address" is a broader concept than a conventional in that it allows a sender to address a message to a recipient using any type of identifying information and is not required to be nor is restricted to an email address. The external address can thus be an email address or any other identifying information about the recipient including, but not limited to, name, address, telephone number, military ID, social security number, a unique code, and the like. Many organizations have identifying information other than a person's email address, so it would be an advantage to provide these organizations alternative means for addressing messages to patrons where, in some cases, an accurate email address for the patron is unknown. This is possible because the present invention provides other levels of authentication that validates recipients by other than just email addresses. In addition, an external address could be a "matter" or "category" and may not actually require a sender to specifically identify the recipients. The matter or category is associated with one or more recipients.

Each end-user is associated with at least one of three sender types: 1) Institution, for when the user is sending as an entity and not as a person per se; 2) Professional, for when the user is sending on behalf of an institution; or 3) an Individual for allowing a user to perform personal-type activities outside of the scope of the user's professional activities. A user can have more than one sender type. The sender type can be associated with a message based on a default sender type assigned to the sender's user profile. When a user composes a message, the sender type is identified based on the login credentials that the sender used. Alternatively, the sender type can be based on the system type that generated the message.

Being able to provide a recipient with confirmation that a message is from a trusted sender helps address the multi-billion dollar phishing scam problem. There is no facility within SMTP to distinguish between sender type, which means that recipients are unable to determine whether a message is truly from a purported source. Technology which allows a fraudulent sender (typically an individual) to mimic information about a usually well-known, well-respected organization seeks to confuse recipients into thinking that the message is from a trusted source. Thus, being able to identify whether the message is from an institution versus an individual can assist to enhance the credibility of messages purporting to come from an institution, because a recipient will understand that a message going through system of the present invention will have gone through a large amount of analysis before even being sent into the network.

Thus, FIG. 1A exemplarily shows that an individual 104a, a professional 105a, or an institution 106a can each access the gateway 108a through client computers. (For sake of completeness, gateways 108b and 108c also have users 104b, 105b, 106b and users 104c, 105c, 106c, respectively). Since the gateway 108a physically resides at the organization, the gateway typically sits behind a firewall of the organization. Thus, the users 104a, 105a, 106a can communicate with the gateway 108a using the same secure intranet that they use for other communications within that organization. Organizations can be configured so that certain personnel have varying levels of access and visibility to the functionalities of the gateway 108. For example, the functionalities of the gateway 108 may be transparent to employee-type user clients and not for administrative-type user clients.

In certain cases, end-users are allowed to access the data center 101 directly. These types of users can be an individual 104d and professional 105d (institutional users 106 are generally required to access a data center through a gateway). Users 104d, 105d can access the data center 101 using, for example, a browser interface operating on a client computer to access one or more web applications 102 on the data center. The users 104d, 105d can connect to the data center 101 using Transport Layer Security (TLS) or Secure Sockets Layer (SSL) or some other remote secure protocol to access the data center. For users 104d, 105d, a gateway is not needed and the data center processes all outgoing and incoming communications for these types of user clients. User accounts may have different levels of functionality. However, since a user client 104d, 105d access the data center without a gateway, they may or may not be able to benefit from the same functionalities that a user 104a, 105a, 106a could with a gateway 108a.

As used herein, the term "communication" will refer broadly to any piece of information shared between a sending party and a receiving party. In some embodiments, a communication will include a message that can be similar to a conventional SMTP message that is sent and received in the traditional messaging sense. However, most embodiments of the invention will have messages formatted according to SMP protocol, which is configured differently than conventional SMTP messaging, described below. The present invention also contemplates that certain communications can be composed without requiring that a sending party compose message text per se. For example, communication may consist with a user posting a content file on the database and sharing access of the file with other users. Thus, while most communications will likely require some sort of message body such that the terms "communication" and "message" can be used substantially interchangeably, it should be understood that the present invention has significantly broader abilities than have traditionally been associated with conventional electronic messaging. However, generally as used herein and in the accompanying drawings, reference to the term "message" should be understood to be interchangeable with the term "communication."

Gateways can also have different configurations than a deployed gateway 108, as depicted in FIG. 1A. In one alternative embodiment, a data center 113 hosts a gateway 112 to form a hosted gateway 114 where the gateway does not physically reside at an organization. Users 104e, 105e, 106e communicate with the hosted gateway via a client computer using Transport Layer Security (TLS) or Secure Sockets Layer (SSL) or some other remote secure protocol to access the hosted gateway 114. The hosted gateway configuration can, in some situations, provide better flow control and administrative behaviors between the gateway 112 and data center 113. In another alternative embodiment, a user client 104f is shown having a gateway client 107 residing on the client to provide standard messaging functionalities as well as the new communication and messaging functionalities provided by the gateway and/or data center of the present invention.

Where a gateway and/or data center is used to process an outgoing message, advantageously this can prevent unwanted messages from even being sent into the network which drastically reduces the burden on the recipient to find methods for filtering out unwanted messages. The gateway provides a "bridge" or connection between communication from an organization to another location within (e.g., to another gateway) or without (e.g., to data center) the organization. The gateway does stateful inspection on inbound SMTP traffic, provides verifications, approvals, categorization, prioritization, modification of the message content, and the like, depending on defined rule sets all before the message is even sent outside the gateway. After performing this analysis, the message is then sent to the data center for rendering the message to the recipient.

The data center 101 can also provide many of the functionalities of the gateway 108. However, the data center 101 is not defined by an organization per se and can serve many gateways 108, hosted gateways 114, and/or user clients 104d, 105d, 104f. The data center is a data management system that stores messages, notifies users, provides secure authentication to incoming users, and allows other users to interact and transact communications, all of which can be occurring outside of a gateway or a specific organization itself.

Depending on how and where a message is stored, the gateway 108 and/or data center 101 can contain storage capabilities for storing and accessing information related to messages. The data center 101 includes various storage repositories 111a. Similarly, gateway 108a is shown being able to access storage repositories 111b. In one embodiment, the gateway 108a communicates with a communication service 122 that acts as a broker and load-balancer for the data center 101 and network. In other words, the communication service 122 may not accept inbound communication at busy times, etc. Once an inbound request to store message data has been accepted by the communication service 122, but the network traffic is considered less than ideal, the message data is spooled at the gateway for further delivery into the proper repository 111*b*. The spooling is also handled via a separate service (not shown).

As shown in FIG. 1A, the data center can have various hardware configurations. For example, the data center 101 can be a central access point, or the data center 113 can host a gateway. In another embodiment, aspects of the data center 123 can reside internally in an organization 109 any of these configurations can have a clustered and/or redundant distributed data center topology. Much of the following description will describe a single data center 101 for purposes of describing the invention; however, the invention is not limited to use of a single data center and contemplates any of the above configurations.

Both gateway 108 and data center 101 have the ability to send and receive communication. When a gateway and/or data center processes an outgoing message, document or content, it will be referred to as the "sending system." Further, the "rendering system" or "receiving system" will typically be a combination of a user client and the data center in that for a recipient to view a message, a web browser at a user client (whether going through a gateway or not) accesses a web application and message components at the data center to render message to the user. To simplify the description of the present invention, sending functionalities will be described with regard to the gateway 108 while many of the rendering functionalities will be described with regard to the data center 101.

The network 100 includes a trusted sender registry (TSR) 110 that provides authorization and/or validation of sending entities, such as gateways 108, hosted gateway 114, and/or user clients 104*d*, 105*d*, 104*f*, to send a message through the data center. The TSR 110 includes a database 124 containing information on authorized gateways or sending systems, an authorization processor 126 to evaluate whether an authorization request from a sending system can be authorized or a validation request from a rendering system can be validated, and a key generator 128 to generate a temporary key that allows an authorized sending system to open a connection to the data center to complete the sending process.

Much of the purpose of the architecture of the invention is to prevent unwanted email to even enter the network bounded by the data center 101 and gateways 108, 114, 107 and user clients 104*d*, 105*d*, 104*f*. The TSR serves a valuable stopgap function to ensure that only authorized senders can send messages through a gateway and onto the data center. For example, when a gateway 108*a* prepares to send a message originating from a user client 104*a*, 105*a*, 106*a*, the gateway communicates with TSR 110 to verify that the sending system is an authorized gateway. Optionally, the TSR 110 can also verify the sending user client is an authorized sender, and the recipient user client is an authorized recipient. Thus, in one aspect, the TSR 110 can be responsible for maintaining the identity of user clients, or, more broadly users in general, as well as identification information for gateways 108, hosted gateways 114, and/or client gateways 107. The TSR 110 can serve a similar function when the data center 101 desires to render messages to users or to otherwise send outgoing messages.

The TSR 110 provides an added layer of security, redundancy and reliability to the messaging features of the present invention. The TSR provides at least two key aspects to secure communication methods of the present invention: 1) The TSR provides a robust two-way authentication mechanism for gateways on the network. This is accomplished by having a sending or requesting gateway first contact a TSR before the sending gateway can successfully open a connection to the data center or to another gateway. The TSR can verify the location of the sending gateway, ensure that a license is in good standing and issue a temporary key which will then be used by the sending gateway to open a connection to the data center. This frees up the data center network to receiving only authenticated inbound sending requests by ensuring that only authenticated gateways with the proper key can successfully connect to servers located in the data center. 2) A secondary function of the TSR is to provide a robust and scalable way to authenticate users and direct communication from the users to the nearest server. This allows the user to have the fastest possible experience when sending and receiving information on the network and allows for a central user authentication mechanism.

While the TSR 110 is shown in FIG. 1A as physically located outside the data center 101, the TSR 110 could be part of the data center. However, one advantage of having the TSR located physically separate from the data center is that the TSR can operate in a distributed manner. For example, a TSR can be located within a particular geographic region which can access a data center anywhere in the world that is in real-time sync with other TSRs. Furthermore, a distributed TSR configuration can be globally based to provide redundancy in case of network failures. Having a distributed TSR can contribute to dynamic load balancing by dynamically tracking users and gateways.

When a gateway 108 is first associated with an organization (e.g., organization 109), the TSR 110 maintains identifying information about the gateway to respond to queries about whether a gateway is authorized to send messages or is a valid gateway. The gateway 108 is associated with a physical IP address of the organization and a MAC address and requires a valid licensing key to activate. Thus, even if someone tried to fraudulently relocate the gateway 108 a different location and had a valid licensing key, such attempts would be unsuccessful because the location of the gateway and its corresponding IP address would not match the entry in the TSR, causing the TSR to reject inbound connections from the fraudulently-used gateway.

When a gateway desires to send a message to the data center, the gateway connects to the TSR and sends an authorization request to the TSR. The authorization request includes identifying information about the gateway and, optionally, about the sender and/or recipients. In some cases, the authorization request may also include a MAC address to make sure a network card is authenticated and/or an IP address to ensure that the device is in a correct location. For example, if the message comes from a rack of servers having a message generator capable of generating millions of messages rather than a basic user client computer, the TSR may be more interested in identifying the MAC address and/or IP address. The TSR may also check that a message is formatted using proper format, such as a custom header. In yet another embodiment, the gateway may present a digital certificate in the authorization request instead of or in addition to other identifying information, such as the MAC address or IP address. Other types of uniquely identifying information can be used, as will be understood to those of skill in the art. Once the TSR validates a gateway, the TSR gives the gateway a temporary key to open a connection to the data center.

Figure 1B:
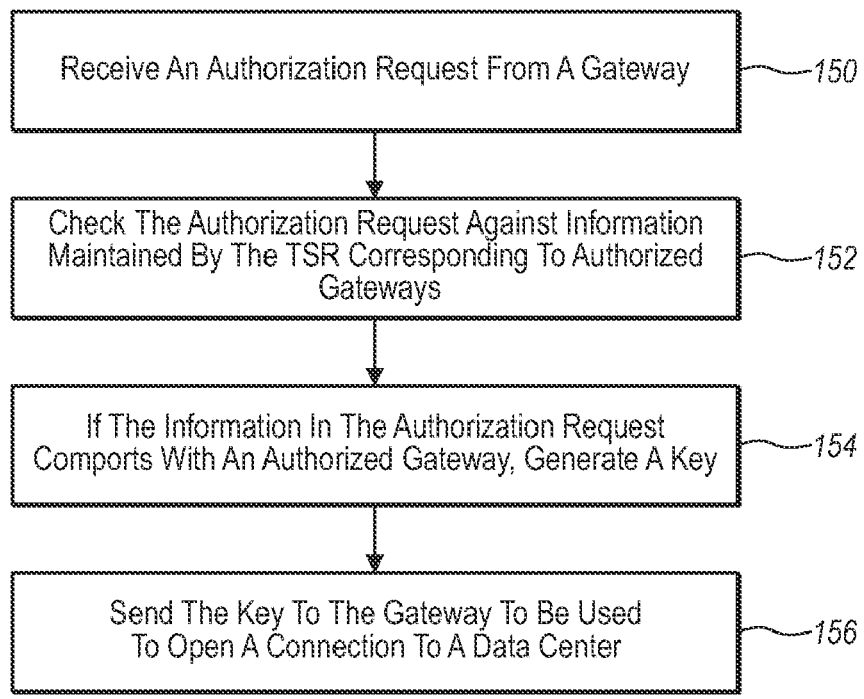
FIG. 1B illustrates an exemplary method for authorizing a gateway to send a message to a data center.

FIG. 1B depicts one exemplary authorization protocol performed by the gateway and TSR before the gateway is allowed to open a connection to the network (e.g., data center) to send a message. At 150, a TSR receives an authorization request from a gateway. In one embodiment, the authorization request includes a gateway ID, password, an IP address, MAC address, and licensing key. An authorization request may also include a digital certificate which is unique to a given gateway and encrypts the authorization request while in transit. The authorization request may further include identifying information of the sender and/or recipients of the message. Essentially, the authorization request can contain any information that the TSR uses to verify that the gateway is trusted.

At 152, the TSR checks the authorization request, such as gateway ID and password combination, the IP address, and MAC address, against information about trusted gateways maintained by the database of the TSR to determine if there is a match. Checking the authorization request can also include the TSR determining whether the licensing key is valid, a digital certificate is valid, whether the sender and/or recipients are valid, and the like. Checking a digital certificate may further includes sending a request to a digital certificate authority to validate the digital certificate and receiving a response to the digital certificate validation request. The TSR may then store the validated digital certificate in its database to respond to future validation requests from the data center. At 154, if the information in the authorization request comports with an authorized gateway, the TSR generates a temporary key. At 156, the TSR sends the key to the requesting gateway which is then used by the gateway to open a connection to one or more servers on the network (i.e., one or more data centers).

Figure 1C:
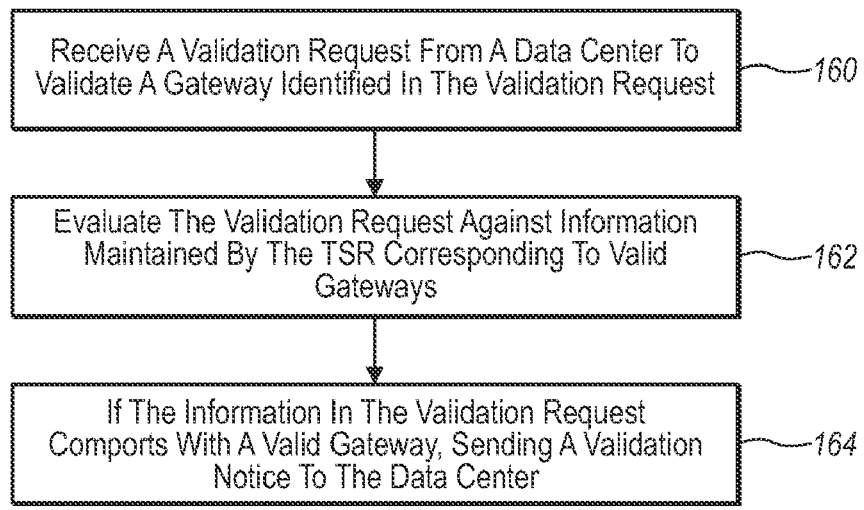
FIG. 1C illustrates an exemplary method for a data center to validate a gateway.

Similarly, FIG. 1C illustrates an exemplary validation protocol when a receiving system (such as a data center) receives a request to make a connection from a sending system (such as a gateway). At 160, the data center can query the TSR with a validation request to validate a gateway that desires to send a message through the data center. At 162, the TSR evaluates the validation request against information stored in the database of the TSR to ensure that the identified gateway is valid. The TSR can optionally determine whether the gateway has attempted to make a connection to the data center within a given amount of time from receiving a key from the TSR. In one embodiment, the validation request may include a digital certificate proffered by the gateway that desires to send a message through the data center. At 164, if the validation request comports with information corresponding to a valid gateway, the TSR sends a validation notice to the data center. If the TSR has previously validated a digital certificate of the gateway, the TSR can compare the proffered digital certificate with valid digital certificate data stored in the database of the TSR. The data center than thus be assured that it is receiving a connection request from a valid gateway. This also allows the data center to restrict IP addresses for computers that are known to make invalid requests to the TSR and put them on a watch list or suspend certain end-user accounts.

When an individual user 104d, 105d accesses the data center, the data center can generally perform a validation over a SSL or TLS connection to determine whether the individual is trusted without the TSR. Further when a user client wants to access a message in their inbox whether indirectly through a gateway or directly to the data center, there does not necessarily have to be a TSR authentication step for the user client to view messages. Further, a validation over a SSL or TLS connection can also authenticate an individual user 104d, 105d to compose and/or send messages through the data center. However, since the TSR could be configured in a distributed manner (much like the DNS system), the TSR can serve as a global user directory/registry. In this configuration, the TSR can direct the user client to the nearest data center server. Further, the TSR could also be used to authenticate sending user clients, recipient user clients, and sending gateways and recipient gateways for all messages to and/or from the data center. In one embodiment, a user client can authenticate with the TSR by passing the user client's username, password, MAC address, IP address, and/or any other authentication information to the TSR before the user client is allowed to view messages. This may be the case in a system where the user client accesses messages using a POP or IMAP solution.

Figure 1D:
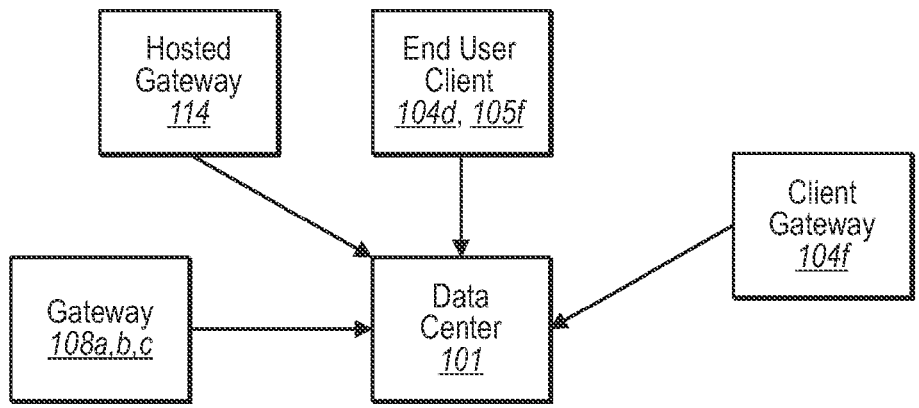
FIG. 1D illustrates a block diagram of a hub/spoke communication configuration.

Various sending configurations will now be described based on the architecture described above. First, as shown in FIG. 1D, any number of gateways 108a, 108b, 108c, hosted gateways 114 and user clients 104d, 105d, 104f can communicate with data center 101 in a hub/spoke configuration in which the data center serves as a center for communication. The authorization process for sending messages in this configuration has been discussed above in detail.

Figure 1E:
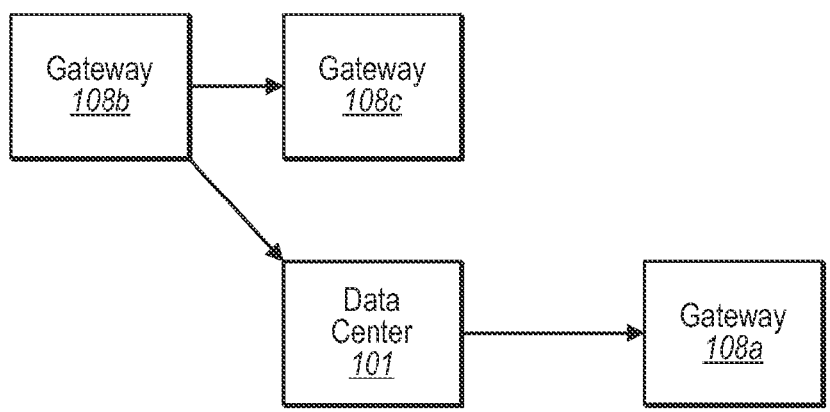
FIG. 1E illustrates a block diagram of a gateway-to-gateway communication configuration.

Second, shown in FIG. 1E, the gateway 108b can communicate with another gateway 108c. In a gateway-to-gateway communication, the sending gateway verifies itself and its right to communicate on the network by first contacting the TSR to receive a temporary key to open a connection to the receiving gateway. The sending gateway then opens a connection to the receiving gateway, encrypting the information using SSL or TLS and further obfuscating the communication using the SMP protocol. The gateway-to-gateway messaging configuration can be used in many situations where entities of an organization may be located in different geographic regions (e.g., a global corporation). Gateway-to-gateway communication can conceivably be used to communicate intra-company (e.g., one global division to another, or parent to subsidiary), but is not limited to this particular use. Various levels of complexity are possible when an organization adopts more than one gateway. Communication from all organization gateways may communicate with a master gateway or other hierarchy before going to the data center, the master gateway being able to override local settings if necessary. The gateway-to-gateway configuration can also be used to proxy SMTP messages from one gateway to another by taking unencrypted inbound SMTP messages, encrypting the message, and sending to another gateway without using SMP protocol.

Any of these sending configurations can operate in parallel. For example, as shown in FIG. 1E, a hub-spoke communication and gateway-to-gateway communication could happen simultaneously where a sending gateway 108B sends a message both to the receiving gateway 108c using SMTP and to the data center 101 using SMP. That is, the communication from gateway-to-gateway can use normal SMTP with no conversion to SMP, while the communication between the gateway to the data center can use a SMTP-to-SMP conversion. This situation may be beneficial where a receiving organization desires to have communications coming through the data center also delivered to an internal network via SMTP/POP/IMAP, for example if the organization has a storage-based system, or wants to use conventional SMTP-based messaging to view delivered messages.

Figure 1F:
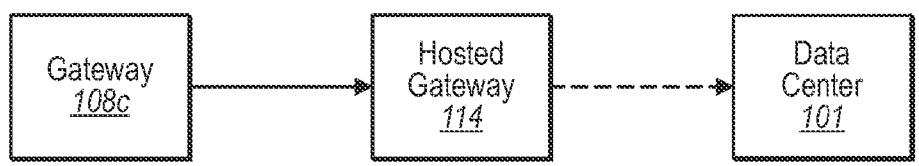
FIG. 1F illustrates a block diagram of a hybrid communication configuration.

Third, in a hybrid configuration shown in FIG. 1F, the gateway 108c can communicate with a hosted gateway 114, or vice versa. When either gateway 108c or hosted gateway 114 attempts to send a message, the sending gateway must validate with the TSR, such as using methods described above to ensure that the sending gateway is a trusted sender. Since the hosted gateway 114 has components of a gateway and a data center, the hosted gateway 114 can process the communication at the data center 113 or send it on to another data center 101. If the hosted gateway 114 processes the message at the data center 113, no additional authentication step is necessary. However, if the hosted gateway 114 passes the message to another data center 101, the hosted gateway 114 proceeds to authenticate itself with the TSR to open a connection to the data center 101.

As mentioned above, conventional messaging mechanisms used to attempt to secure an SMTP message do not prevent spamming, phishing attacks, and the like. Conventional messaging systems place the burden on the recipient to identify which messages are legitimate and which are unsolicited. Such security measures typically require specialized software to be placed at both the sender and the recipient side so that the two points can communicate with each other. One advantage of the invention is that specialized software is not required to be downloaded at the user clients. Another advantage of the present invention is that the encryption of the information traveling through the secure network occurs at more than one level. Encryption occurs at the network level (using SSL or TLS), at the application level (by the application and database servers), and at the protocol level (using the TSR), thereby ensuring the most robust and secure mechanism possible for safeguarding data. A key benefit of this approach is that users do not have to install any software at their client computers to benefit from the added security.

II. Gateway

Figure 2A:
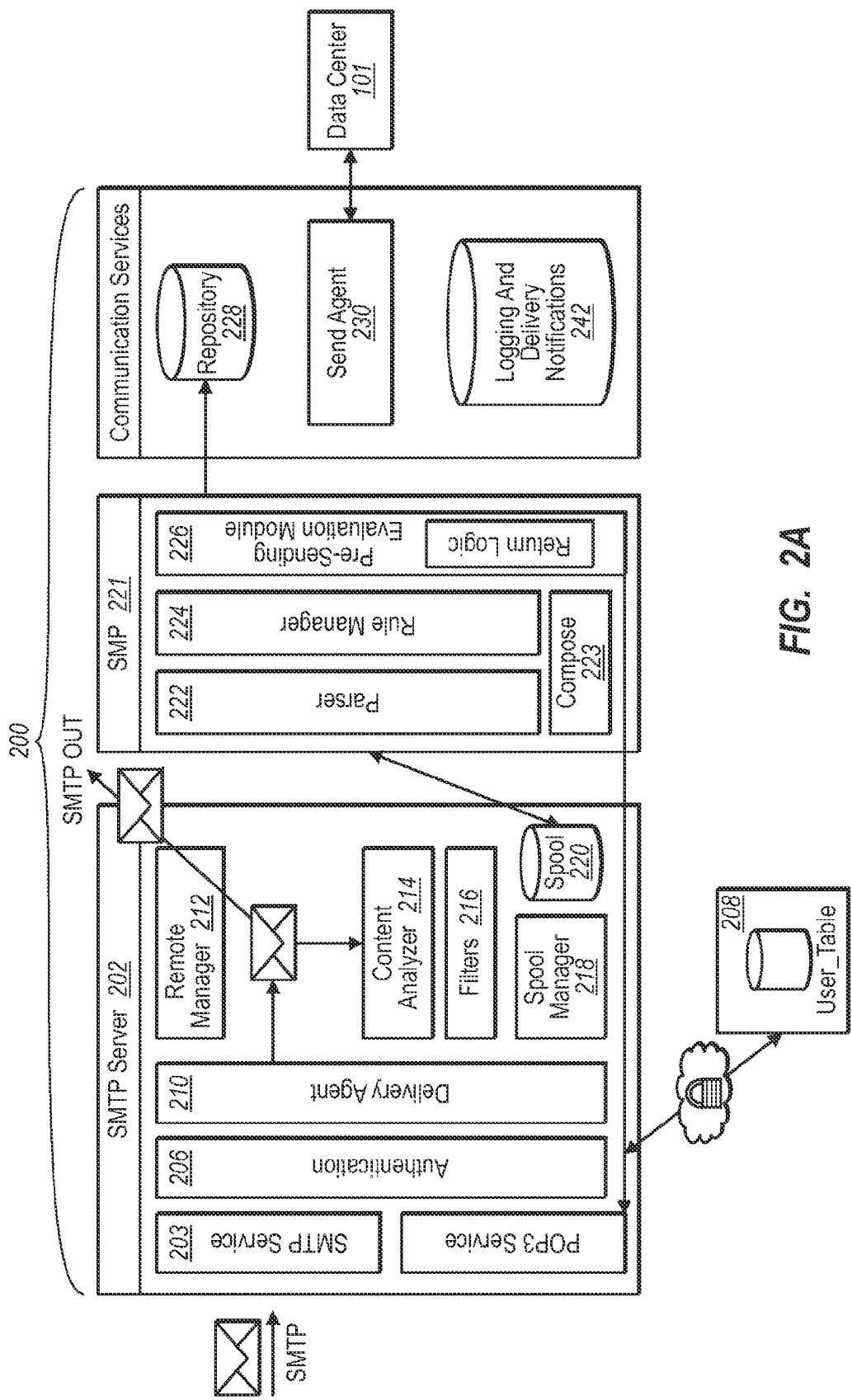
FIG. 2A illustrates a block diagram of an exemplary gateway.

The details of the gateway 108 will now be described in further detail. As mentioned above, the gateway 108 serves as a bridge between an organization's existing messaging system and the data center 101. This allows the organization to take advantage of the enhanced messaging functionalities of the present invention. FIG. 2A depicts a high-level overview of exemplary software architecture of a gateway 200.

In one embodiment, the gateway 200 is able to provide conventional messaging functionalities as well as new messaging functionality according to teachings of the present invention. Thus, the gateway 200 can act as a mail server to allow users to generate, send and receive SMTP-based email, for example, by having an embedded mail server 202, such as SMTP or daemon (SMTPd). A SMTP service 203 can provide the traditional functionalities of an mail server. The mail server 202 also includes a POP3 service 204 to provide for a return-path for certain messages, notification uses from the gateway and for compatibility with typical MUA's such as Thunderbird or Microsoft Outlook. The POP3 service 204 is one example of platform-dependent technology that can be integrated into the gateway 200 so that the gateway can easily be used by users of any email service. POP3 allows MUAs to query the gateway 200 using standard protocols and requests to see if any new messages have arrived for a user. The user's messages may or may not be stored on the gateway's POP3 server.

Gateway 200 also includes authentication module 206 which operates with a user account database 208 to verify that only users authorized to use the gateway have access. The user account database 208 can be physically located at the gateway or can be remotely accessed by the gateway. In one embodiment, the user account database could be part of the TSR (FIG. 1A). A delivery agent 210 verifies that a recipient identified in a message is an authenticated recipient, optionally using the TSR.

Further, the delivery agent 210 can route unsecured communications. Identifying unsecured communications can allow an organization to have greater flexibility on how messages are sent to certain recipients. For example, a newsletter may be sent from a gateway to a recipient using SMTP while a statement is sent to the same recipient in a secure manner using SMP. If the sender specifies that a message is to be sent in an unsecured manner, a remote manager 212 routes the message to conventional, unsecured messaging pathways, such as SMTP. For unsecured messages that are sent from gateway 200, sending of the message is logged by message logging and delivery notifications 242, a copy of the message may or may not stored at repository 228 and is sent along to an outgoing SMTP server for eventual dissemination to the recipient via SMTP. Additional details will be discussed below on how this accomplished, but this example shows that preliminary routing can be beneficial.

If the user specifies a secure delivery, a content analyzer 214 performs additional processing on a message to carry out a variety of complex mail processing tasks. These content analyzer tasks can include, but are not limited to, searching for symbols, patterns, expressions or keywords (i.e., any phrase or character string) in the outbound communication to identify confidential material. The content analyzer 214 provides intelligence to modify an initial status of a protocol attribute (e.g., message type, priority, confidentiality, or category status) of the message based on one or more predetermined conditions. One of the predetermined conditions can include parsing the content of the message to determine one or more keywords contained in the message or content files of the message. For example, if the content analyzer 214 identifies the term "payment due," in the message, the content analyzer may modify a category attribute in the metadata of the message (described below) from uncategorized message to "Business Important." Automatically modifying a protocol attribute of a message can change the timing by which the message is sent as well as how the message is stored and organized both for senders and recipients. In this example, when a recipient views this message, the message will be automatically prioritized, categorized and searchable based on its new category.

The content analyzer 214 could also search for certain keywords and dynamically add content to the message. Such content can be in the message body itself or can add content files to the message. For example, if a message contained a FedEx tracking number, the content analyzer 214 could automatically add additional content to the message from a third party site showing the package's location enroute, thus actually changing the message content itself. In another example, finding the term "directions" in the message can generate new message body text, "Here are the directions to my office," and attach a content file to the message containing a map of the directions generated from a third party web application. When a user accesses this message, the message would be rendered with this additional content. The content analyzer 214 could also match content in the message to rule sets defined by the organization's own servers or from the internet. Thus, the content analyzer can include matchers that match mail messages against certain conditions. The content analyzer can also be a vehicle for logically extending message and document delivery to include application or content delivery that is needed by a particular organization.

The content analyzer 214 could also look for indicia of spam to detect unwanted outbound messages. For example, even though the sender may be legitimate, perhaps the user's machine has been compromised (e.g., by a virus or bot) and should not be allowed to connect to the data center to send messages into the system.

The content analyzer 214 is able to direct message traffic to other processes for further filtering as depicted by filter 216. The messages can be filtered to identify potentially unwanted or unsolicited material. By filtering the message, certain unsolicited messages can be identified and flagged for further review before these types of messages are sent outside the organizational boundary. The filter 216 can require, depending on the condition, a return path to the sender for all communication or message sending requests so that the filter 216 can send a return confirmation message or communication to the sender. The confirmation message can include an embedded link that, when selected by the user, shows the user the message details, and requires a sender to manually approve a message before it is sent through the gateway 200. Further, this may ensure that the message was not machine-generated, and may further require the sender to solve a captcha sequence. This validation process is not found in conventional SMTP-based email technology and has the effect of greatly improving the quality of information sent through the network, and perhaps, more importantly, prevents messages from leaving the gateway 200 that might be maliciously generated (e.g., by a virus or bot).

The filter 216 can also provide even greater control over information flowing into the network by monitoring the number of recipients associated with messages sent from the gateway 200 at a given time or over a given period. If a large number of recipients is detected, the gateway 200 sends a return confirmation message back to the sender with an embedded link that a user can select to view message details to verify that the sender indeed wanted to send a message to such a large number of recipients. The return confirmation message can also include a mechanism that requires a sender to prove they are a person such as a manual approval, solving a captcha sequence, and the like.

A spool manager 218 stores the message in spool 220 for further processing based on, for example, filtering rules. For example, if filter 214 determines that the message appears to be appropriate to send to the identified recipient, the message is sent to spool 220 for further processing.

Additional secure message processing can occur at block 221. In certain situations, a parser 222 can parse an SMTP message and separate the components of an SMTP message into its constituent parts into the unique message format of the present invention. As discussed below, the unique message format enables many functions for reducing system resources. Thus, the parser 222 can convert an SMTP message into a separate SMTP header, SMTP message body and/or SMTP attachments, along with generating metadata that corresponds to the new message format. In embodiments where the components of the message are to be permanently stored at the gateway, the parser 222 may perform an additional step of initiating storing the message components in databases in repository 228, described below.

A compose module 223 at the gateway allows user client to compose an original message that may or may not be formatted in SMTP. When the original message is not formatted in SMTP, the original message is formatted using the unique separable data structure with an SMP header and one or more tabulation elements, described below. In addition, metadata is generated and associated with the original message.

A rule manager 224 analyzes messages against rules that identify predetermined conditions to modify and/or generate additional metadata. The rules may be specific to a sender or organization. For example, if message type of the message is a "statement" document, the rule manager 224 may automatically set metadata associated with the document, such as a category attribute, to be a "statement" so that the document is automatically stored according to its categorization by either the sending system and/or rendering system.

A pre-sending evaluation module 226 further perform verification, approval, load-balancing and aggregation functions, which are describe further below. These functions evaluate metadata attributes to determine whether or not a message should be sent from the gateway into the secure network and can generate and/or modify metadata and/or message content where necessary. Advantageously, analyzing the message before the message is even sent provides assurance to the recipients that the message has been evaluated for spam or other behaviors, as well as eliminates network resources by preventing messages from proliferating through the network when they are likely unwanted in the first place.

In other words, the secure messaging processing 221 performs the function of transforming an SMTP message into or to generate an original message in a format (referred to as SMP) and generating metadata for the message that is understood by the data center. The gateway enhances the data center's ability to load balance, categorize, prioritize, filter, process, etc. inbound communication. Note that in some embodiments, a message will be originally formatted in the SMP format and that additional reformatting will not be necessary. For example, this is the case for users who access the data center to compose messages since the message will automatically be generated using SMP format.

After this sendside message processing 221, the message content and metadata is stored in repository 228. Where the message is going to be only temporarily stored in repository 228, the message may be stored without parsing and separating the message into its constituent parts. However, there may be situations where the message content and metadata is parsed and stored in its constituent parts either temporarily or permanently in databases in repository 228 at the gateway. Thus, repository 228 can be similar or the same as repository 111*a* depicted in FIG. 1A. In embodiments where the message is to be stored elsewhere, for example, in repository 111*a* of data center 101 (see FIG. 1A), the message is temporarily stored in repository 228 at the gateway and then one or more portions of the message is sent and stored at repository 111*a* of data center 101.

The send agent 230 performs the function of monitoring the network traffic and determining which messages stored in the repository 228 to send out from the gateway at any given time. Urgent messages may be sent immediately and non-urgent messages may be queued up for delivery when the network is not busy or is ready to handle the incoming traffic.

A logging module and delivery notifications module 242 monitors sending of the message to the data center and stores delivery notifications from the data center. The logging module and delivery notifications module 242 also monitors access of the message and stores read receipt confirmations from the gateway when a recipient actually views a message and/or performs any other activity on the message. Where aspects of the message are stored at the gateway, the logging module and delivery notification module 242 may further server to generate delivery notifications and/or read receipts as necessary.

Based on the foregoing architecture, the gateway 200 performs a number of functions. One aspect of the gateway is to serve as a boundary to a secure network, authenticating users to access the network. The gateway further performs extensive analysis of all outgoing messages which can affect how and when the message is sent from the gateway including, performing verifications, analyzing messages against pre-defined rule sets, dynamically modifying metadata and/or content as necessary, obtaining appropriate approvals from senders and/or administrators, performing load balancing functions, and performing aggregation functions for the organization. Many factors can affect when and how a message is sent from a gateway including the type of message, the content of the message, user preferences, past sending history to a particular recipient, the recipient's behavior pattern in reading and/or discarding of messages, the network load, and the like. Certain undesirable circumstances prevent messages from being sent, preventing unwanted messages from even being sent into the network in the first instance. This serves to preserve network resources as well as provide end-users with a highly satisfactory experience in viewing only messages that are of value to the end-user. The gateway serves additional functions of storing data relating to outgoing messages as well as providing users with conventional messaging functionality where desired.

III. Data Center

Figure 2B:
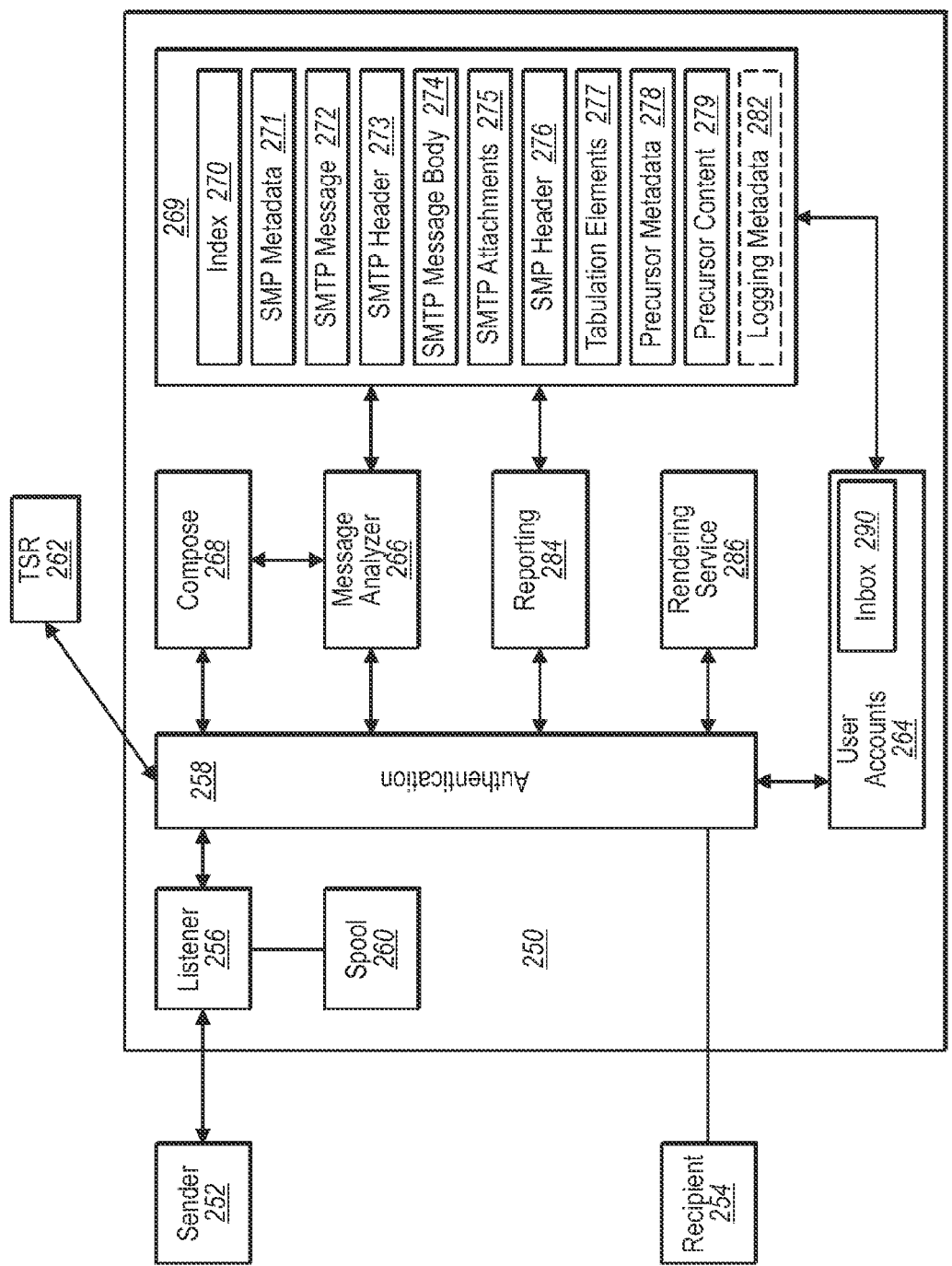
FIG. 2B illustrates a block diagram of an exemplary data center.

The data center includes a variety of application and database servers which, among other things, is responsible for receiving, analyzing, storing, managing, generating, and delivering messages to one or more users. The data center also allows a user to access their information from any location, anywhere in the world, provided that Internet connectivity is available. As depicted in FIG. 2B, the data center 250 receives inbound messages from a sender 252 (e.g., using a gateway) and renders messages to a recipient 254. While sender 252 and recipient 254 are shown as separate entities, in one embodiment, sender 252 and recipient 254 could be the same client computer.

A listener component 256 handles inbound requests from both user clients indirectly accessing the data center through gateways and user clients directly accessing the data center without a gateway. The listener component 256 uses an authentication layer 258 to authenticate requests to send messages through the data center. In addition, listener component 256 determines the priority of a message, such as by identifying information in metadata of the message (discussed below). The listener component 256 then queues the message (e.g., using spool 260) depending on the level of priority for delivery to other parts of the data center. The authentication layer 258 can also be used to authenticate requests to receive messages or have messages rendered through the data center, such as by recipient 254. Generally, the data center will communicate with a TSR 262 to perform authentication of gateways, and with user accounts 264 to perform authentication of end-user clients. However, the TSR 262 may be used in both situations.

When a request is received by the data center to send a message, the message is associated with information about the sender and the intended recipients by looking up various user account 264 information stored in one or more databases. The message is then reviewed by a communication or message analyzer 266 which, among other things, parses the message into its constituent components. Note that this assumes that a sender sending the message has previously obtained authorization to connect to the data center. In some cases, a message may be composed by an end-user client using a compose module 268 at the data center. The compose module communicates with the message analyzer to properly manage the message.

As mentioned below, the communication can include various components, including metadata, that can be divided and stored in a series of databases located in a repository 269 and linked together using a unique message identifier such as, but not limited to, pointers, hash IDs, content addressed storage, or other referencing mechanisms. The repository 269 is a relational database using one or more database servers and includes an index 270 to lookup the particular database storing aspects of the message. In one embodiment, the databases can be configured as lookup tables. The databases shown include an SMP metadata database 271, an SMTP message database 272, an SMTP header database 273, an SMTP message body database 274, an SMTP attachment database 275, an SMP header database 276, an SMP tabulation element database 277, a precursor metadata database 278, and a precursor content database 279. As described below, various messaging configurations are provided using the unique message construct of the present invention. Thus, a series of databases are provided to be able to accommodate these various messaging configurations.

Additional metadata is generated upon delivery of the message, and stored in logging metadata 282. The logging metadata 282 is typically stored at the same location as the other components of the message, but could also be stored elsewhere. A delivery record is recorded for each message. Thus, even if the user decides to delete the message, a record that the message was delivered is always maintained. A delivery confirmation is also sent via a reporting module 284 to the sender to confirm that the message has been delivered to the user account. Where the message is stored at the data center, a delivery receipt and read receipt is sent to the gateway via a return path identified by the gateway. In the case where the message is sent directly using the compose module 268 (through a web interface) on the data center, a delivery receipt to the sender is not necessary since it will be stored directly in repository 269 at the data center.

When a recipient 254 requests to view messages (e.g., using a browser on a client computer), the recipient is authenticated through authentication layer 258. A rendering service 286 then accesses the recipient's inbox 290 associated with a user account 264. When the recipient 254 selects one of the messages to view, a request is made to the repository 269 which uses index 270 to access the message components stored in databases 272, 273, 274, 275, 276, 277, 278 and/or 279. The rendering service 286 returns the message content to be rendered by a browser on the recipient computer. After a recipient views a message, the rendering system generates a read receipt. The read receipt can be stored at in logging metadata 282 or sent back to the sending system for storage. In one embodiment, storing the read receipts at the sending system allows an organization to maintain all customer message activity in one location.

In addition, logging metadata 282 monitors each access of the databases in the repository when users request to perform other actions on each component of the message such as, but not limited to, viewing, forwarding, replying, deleting, recalling, and the like. Furthermore, the rendering service 286 can monitor when a user hovers over a component regardless of whether the user selected content or not and store that action in the logging metadata 282. Monitoring of hovering over a particular are or portion of a communication is performed using a Javascript method that sends information back to the data center via AJAX using the XMLHTTP request header method.

Reporting module 284 can provide logging reports to sender 252 as to which recipients viewed each component of the message and at the specific time, and report on other actions that were taken on the components of the message, such as viewing, forwarding, replying, deleting, recalling, and the like. Further, the reporting module 284 can provide information on generations of forwarding the message or components of the message to other third parties and the activities performed by these subsequent generations on the message or components of the message, described further below.

As discussed above, users who are part of an organization having a gateway can send and view messages by using the gateway to connect to the data center. However, the data center also allows users who are not part of an organization to access the data center and send/receive messages thereon. The difference is that the data center is a web-based application and can serve as a hub for communications between organizations and individuals. Much of what occurs on the gateway when a sender composes and sends a message is related to how the message is ultimately rendered to a recipient at the data center. Therefore, most of the same functionalities for sending/rendering messages to users having a gateway are also available to users who connect directly to the data center, including configuring the data center to operate with conventional SMTP or the novel SMP protocols described herein.

IV. Separable Message Data Structure

Figure 3A:
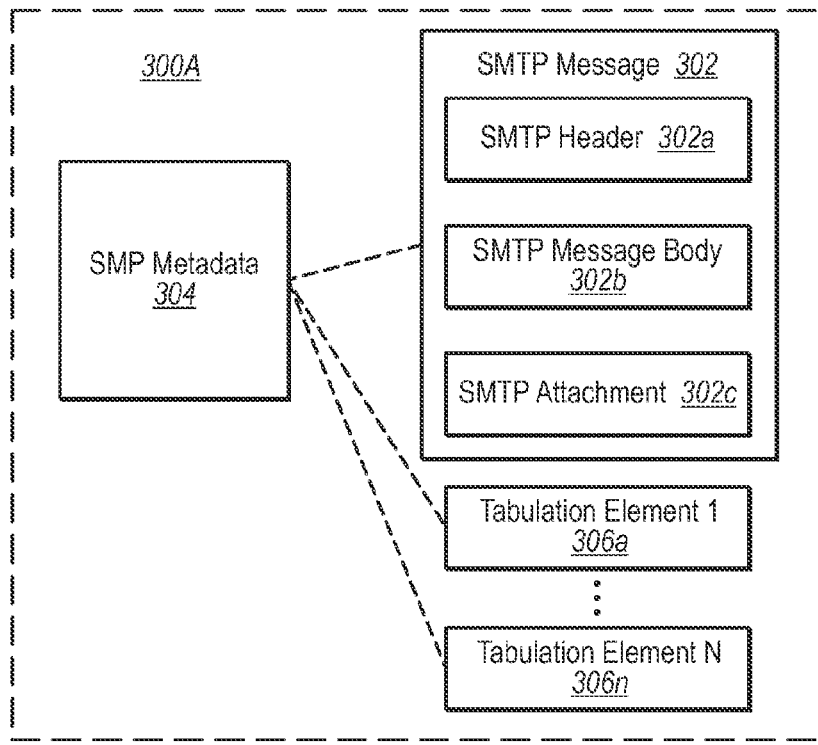
FIG. 3A illustrates a block diagram of an exemplary message data structure incorporating an SMTP message.

With reference to FIG. 3A, one aspect of the invention is that a message generated according to SMP protocol is distinct from a conventional SMTP message. With SMTP messaging, the SMTP message includes an SMTP header, an SMTP message body, and one or more attachments, all of which are an integral part of the SMTP message data structure and are inseparable. In addition, SMTP attachments are coupled to a SMTP message using MIME (Multi-purpose Internet Mail Extensions) that essentially munges binary data onto the body of the SMTP message. When an email application reads through the SMTP message body, it identifies the binary data that is encoded with MIME and generates a file for the data until the MIME encoding ends. The email application then renders the MIME code as an SMTP attachment along with basic properties of the SMTP attachment, such as its size and number of bytes. However, because the binary data associated with the attachment is munged onto the body of the message, it is very problematic to manage and find information; essentially, conventional email systems require the end-user to know what message a given attachment was associated with and provide no assistance in finding or managing the documents or attachments, separate from the message itself.

In contrast, the present invention provides messages using an entirely different paradigm for handling all content for a message that gives users enhanced messaging functionality. As used herein, the term "message" without an "SMTP" indicator typically refers to the unique communication data structure that will now be described, which provides many advantages above and beyond what conventional SMTP messaging is able to provide.

FIG. 3A depicts a conceptual diagram of an exemplary communication 300. A communication 300A includes an SMTP message 302 having an SMTP header 302a, an SMTP message body 302b, and, optionally, an SMTP attachment 302c. This embodiment shows an SMTP message 302 having a conventional SMTP message data structure with the SMTP header, SMTP message body, and SMTP attachment combined together.

The communication 300A also includes SMP metadata 304. The SMP metadata 304 is a file that contains information about the communication 300A that can be used to determine sending functionality as well as rendering functionality. When analyzed at a sending system, the SMP metadata 304 can determine a timing by which the message is sent, a priority by which the message is sent, where components of the message will be stored, whether the message will be sent securely or not, whether the message will be sent protected or not, and the like. When analyzed at a rendering system, the SMP metadata 304 can determine how the message should be rendered to a recipient, categories by which the message should be stored, access rights for a recipient to view, reply to, forward, delete, or perform other activity on the message, and the like. Thus, the SMP metadata contains protocol attributes that are generated using SMP protocol and can be interpreted using SMP protocol.

The communication 300A can also include any number of tabulation elements 306a to 306n. As used herein, the term "tabulation element" generally refers to a data structure configured to hold content. Examples of tabulation content can be textual content similar to message bodies of conventional SMTP messages, or can be "content files," such as, but not limited to, documents, videos, images, vcards, email entries, URL's, audio files, and the like. Content files are similar to "attachments" of conventional SMTP. The SMP metadata 304 can also include information specific to that tabulation element.

Adding at least one tabulation element 306a can alter the way the original SMTP message 302 is rendered to a recipient. For example, when there is at least one tabulation element 306a associated with an SMTP message 302, the SMP protocol in the SMP metadata 304 may instruct a rendering system to render the content of the SMTP message body 302b and the at least one tabulation element 306a in a tabular form as tabulated pages. In the example of FIG. 3A, the SMTP attachment 302c would appear as an attachment in the tabulated page containing the SMTP message body 302b. In another embodiment, tabulation element can be reflected as an "attachment," such that the SMP protocol in the SMP metadata 304 can instruct the rendering system to render the tabulation element as another attachment to the SMTP message body 302b or, alternatively, to another tabulation element.

The embodiment of FIG. 3A may be used where it is desired to implement SMP functionality while at the same time preserving certain aspects of the SMTP message. The separable nature of the components of communication 300A allows for various sending and storing configurations using the gateway and data center, as have been and will be described herein.

Figure 3B:
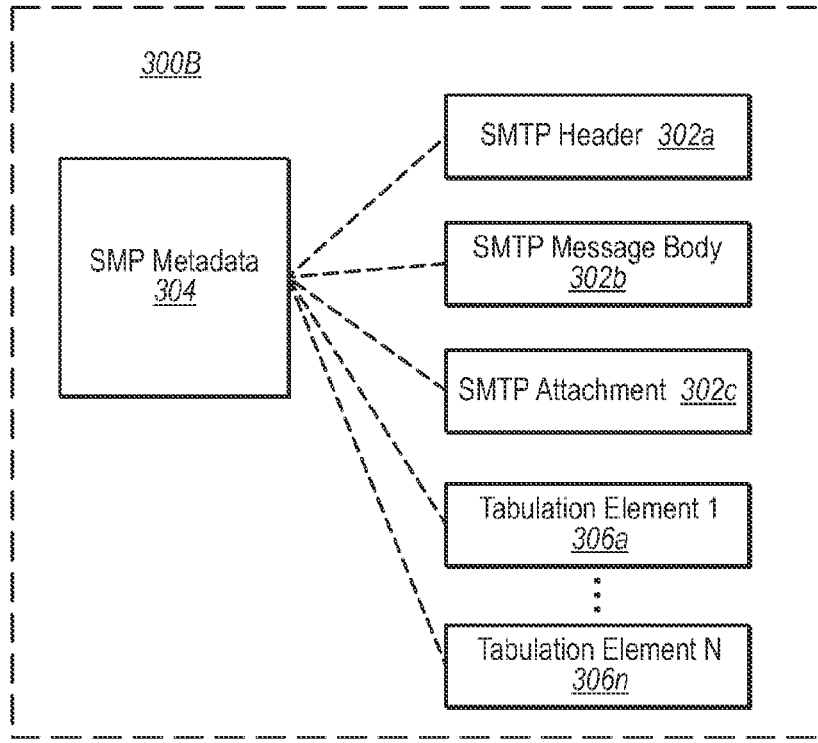
FIG. 3B illustrates a block diagram of another exemplary message data structure incorporating parsed components of an SMTP message.

FIG. 3B illustrates an embodiment where an SMTP message is parsed into its constituent components (e.g., by the gateway). Conventional SMTP messaging requires the message components to be integrated together, whereas, in the present invention, there is no such requirement. Thus, a communication 300B shows SMTP header 302a, SMTP message body 302b and SMTP attachment 302c as distinct components. This allows, in one example, the SMTP message body 302b to be stored and accessed from the data center while the SMTP attachment 302 is stored and accessed from the gateway. Other variations are possible with this unique data structure. The SMP metadata 304 provides instructions on how to send, store, and/or render each component of the message. In addition, any number of tabulation elements 306a through 306n can be defined for the communication 300. The separable nature of the components of communication 300B allows for various sending and storing configurations using the gateway and data center, as have been and will be described herein.

Figure 3C:
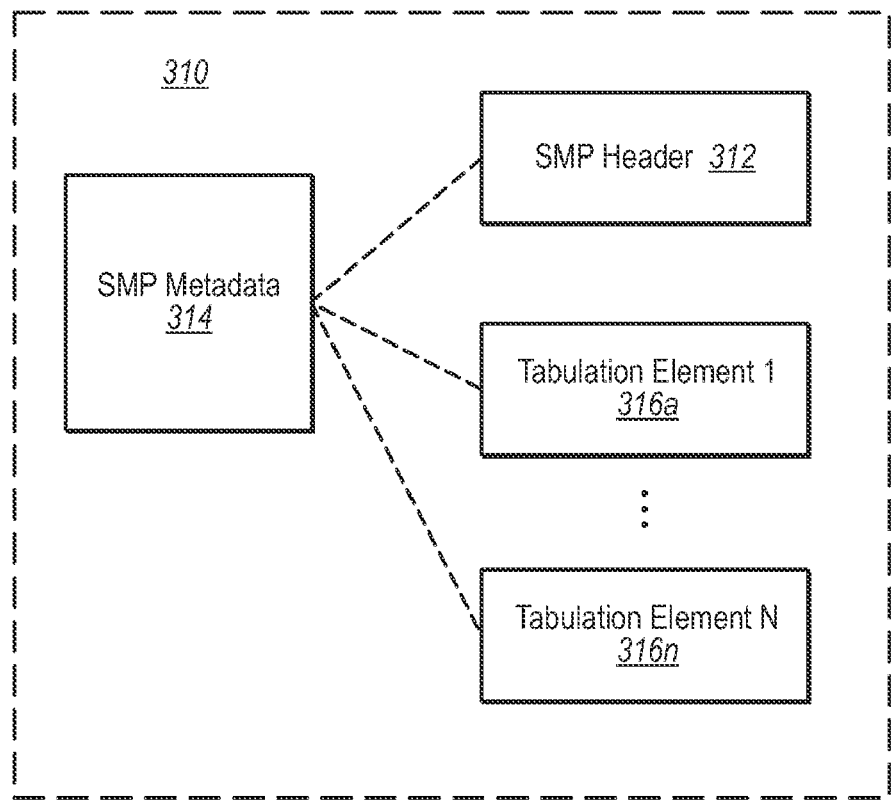
FIG. 3C illustrates a block diagram of still another exemplary message data structure that does not incorporate SMTP message components.

FIG. 3C illustrates an embodiment of a communication 310 that does not include SMTP messaging structure. FIG. 3C shows a communication 310 that includes a SMP header 312 that can function similar to a SMTP header in that it identifies some of the same information (such as sender, recipient(s), date of sending, etc.), but was not generated in association with an SMTP message. That is, it is generated as a separate component from the rest of the message as opposed to initially being generated as part of other components of the message. Communication 310 also includes SMP metadata 314 and can include one or more tabulation elements 316a through 316n. The separable nature of the components of communication 310 allows for various sending and storing configurations using the gateway and data center, as have been and will be described herein.

Thus, a tabulation element is a very versatile structure that can contain a binary file attachment (such as a text document, image document, and the like), third party content in the form of a fully qualified URL, or textual information such as that found in a traditional SMTP message body. The SMP message data structure 310 described above can facilitate traditional messaging (such as done using SMTP message 302 in FIG. 3A) in which a first tabulation content 316a contains a message body and a second tabulation content 316n contains a "content file" that is associated or linked with the first tabulation content such that the second tabulation content is rendered as an "attachment." Thus, the term "content file" and "content file attachment" may be used interchangeably.

However, the message data structure 310 also provides for alternative arrangements. For example, the message may contain a SMP header 312 and a single tabulation element 304a that includes textual content for a message body that is rendered in tabulation form. Or, the message data structure 310 may be composed solely of a SMP header 312 and a single tabulation element 304a that includes a content file. In this scenario, the content file may not be associated with a message body at all. One example of this is where a communication shares a shareholder update. Conventionally, this is done by physically mailing a large hardcopy document to shareholders or sending an SMTP message with a file attachment. With the present invention, no message body is required; a user can simply send the shareholder update in electronic format, without also having to send a message body. A communication 310 can also be composed solely of SMP header 312. Thus, the data structure of communication 310 allows for a higher amount of flexibility than conventional SMTP structure allow.

In the present invention, the term "content file" is a broader concept than a simple attachment that has heretofore been required by SMTP to always be attached to a "message body" section of the message. The term "send" is also broader than strictly sending a message from a sending system to a receiving system. The term "send" broadly covers any situation in which a user desires to communicate with another user and can be accomplished by sending a message from a gateway to a data center, generating a message at the data center and then sending it to one or more recipients, posting a shared file at the data center without sending a "message" per se, as well as other communication configurations. As mentioned above, a communication can be broader than simple messaging which is conventionally done using SMTP messaging.

The unique data structure of the communications of the present invention provides various advantages over conventional SMTP message data structures. First, communications 300A, 300B and 310 are shown having a dashed line to represent that the communication components are relationally related to each other but separable. That is, the data contained in the message components can be sent and/or stored separately from each other, yet still refer to each other so that the gateway and/or data center can relate them to the same message. Thus, the dashed line in communications 300A, 300B and 310 indicate that its components may not actually be located per se in the same single data structure, but may be linked by unique identifier, the unique identifier including, but not limited to, pointers, markers, tags, links, a hash ID, or other reference indicators that refer to each component of the message. In one embodiment, a hash ID (such as MD5 hash) may be associated with a communication with each of the components referring to the hash ID.

This message data structure is particularly useful for allowing different views of information related to each component of the message. In addition, the message data structure provides a foundation for multi-dimensional or multi-faceted communication, described below.

The metadata 304 of the message can include substantially more information than a standard SMTP header, and can be separable from other components of the SMP communication. The metadata 304 can contain information on how to render the message, the timing of sending a message, rights management (such as which users are allowed to view, forward, print, reply to, the message), and how to store and/or categorize data relating to the message. The metadata 304 can also include information specific to each component. For example, the metadata 304 may have protocol attributes that apply to the message as a whole and protocol attributes that apply to specific components of the message, such as individual tabulation elements. For example, the metadata 304 may have categorization for the message as a whole, while each specific tabulation element may have a particular sub-categorization. Thus, each message sent via the secure network formed by a gateway and data center will have a metadata file and one or more content components (i.e., SMTP message, SMTP header, SMTP message body, SMTP attachment, tabulation elements), with the metadata and content components being generally referred to herein as message components.

Figure 3D:
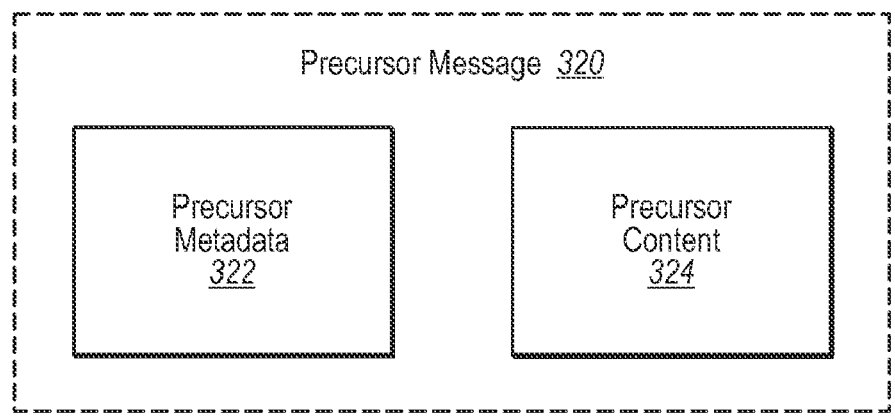
FIG. 3D illustrates a block diagram of a precursor message data structure.

FIG. 3D shows a precursor message 320 that can contain some of the same data as the metadata 304 shown as precursor metadata 322. The precursor metadata 322 provides a minimum amount of information that can be used to generate a precursor message 320. Precursor message 320 also contains precursor content 324 that is displayed to a recipient when a precursor message 320 is rendered. For all intents and purposes, the precursor message appears to the user as a normal message in the user's inbox. However, the precursor metadata 304 can perform a number of different functions, described below, to assist in enhanced security and load balancing of message sending from the gateway.

V. Load Balancing by Data Center

Figure 3E:
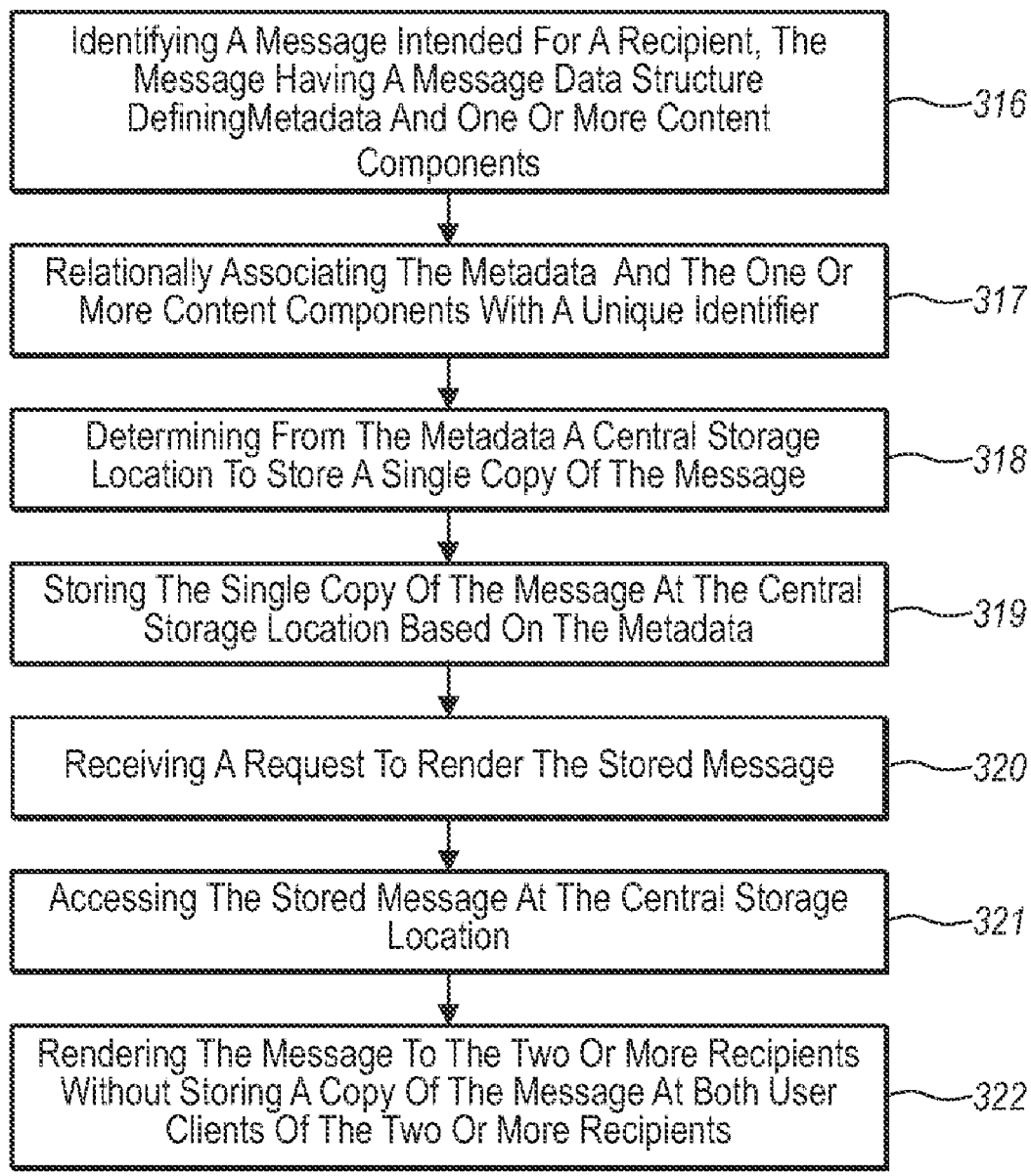
FIG. 3E illustrates an exemplary method for centrally storing message components.

One aspect of the present invention is that all messages can be stored centrally and do not have to actually be sent to the user clients for storage. As mentioned above, components of a message can be separable such that components can be stored separately or stored together. Components of a message can reside at a gateway 108, at the data center 101, and/or, in some cases, at a user client 104, 105, 106. Thus, gateway 108 and data center 101 can include a storage area network or other repository for storing large amounts of message information. FIG. 3E illustrates one exemplary method for centrally storing a message including, at 316, identifying a message intended for a recipient, the message having a message data structure defining a metadata and one or more content components, at 317, relationally associating the metadata and one or more content components with a unique identifier, at 318, determining from the metadata of the message a central storage location to store a single copy of the message, and at 319, storing the single copy of the message at the central storage location based on the metadata of the message. The method further includes, at 320, the central storage location receiving a request to render the stored message, at 321, accessing the stored message at the central storage location, and at 322, rendering the message to two or more recipients without storing a copy of the message at both user clients of the two or more recipients. Generally, the recipient is unaware of how the message is stored. When the message components are stored in a central storage location, all requests to access the message components are made to that single copy. This assists with load balancing of network resources by reducing the amount of information being transmitted across the network.

With conventional SMTP messaging, in each case of sending a message, an actual copy of the message and/or message content is delivered to each individual recipient and usually stored in the recipient's account. So, it can be appreciated that a message being sent to hundreds of recipients means literally hundreds of copies of the same message and the attachment (s) and this results in the given communication taking up a significant amount of bandwidth and storage space. The present invention drastically reduces the amount of storage space required to store messages and greatly reduces the amount of information traveling through the network.

Thus, in the present invention, the term "send" should be broadly construed to refer to acts performed by a user to communicate with another user, which can include, but is not limited to, actually delivering a copy of the message to a recipient of the message or mechanisms which have the appearance of delivering the message to the recipient of the message, even if a copy of the message is not stored at the receiving end.

Figure 3F:
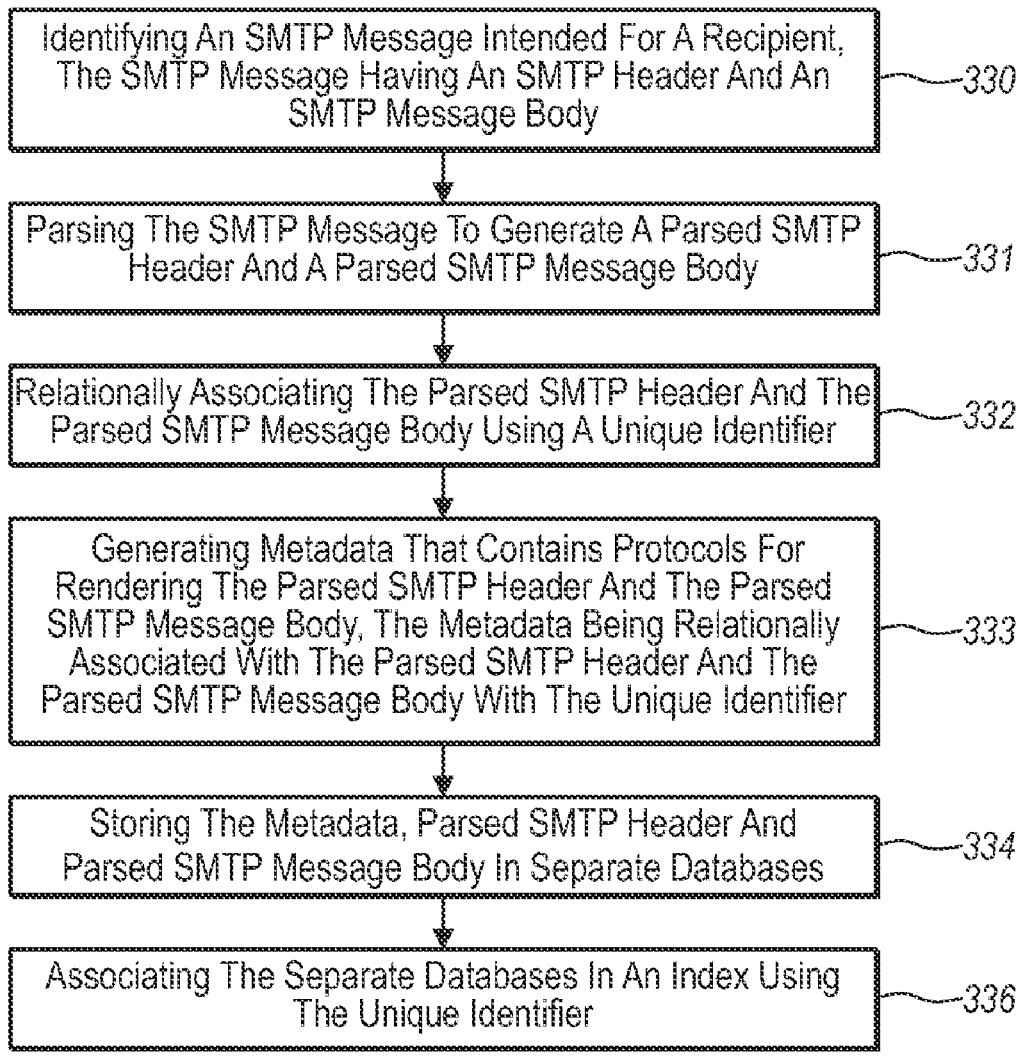
FIG. 3F illustrates an exemplary method for parsing an SMTP message into constituent components.

An exemplary method for parsing an SMTP message into its constituent components having the unique message data structure described above is shown in FIG. 3F, which includes, at 330, identifying an SMTP message intended for a recipient, the SMTP message having an SMTP header and an SMTP message body, at 331, parsing the SMTP message body to generate a parsed SMTP header and parsed SMTP message body, at 332, relationally associating the parsed SMTP header and the parsed SMTP message body using a unique identifier.

After parsing the SMTP message, at 333, metadata is generated that contains instructions for rendering the parsed SMTP header and the parsed SMTP message body, the metadata being relationally associated with the parsed SMTP header and the parsed SMTP message body using the unique identifier. At 334, the metadata, the parsed SMTP header, and parsed SMTP message body are stored in separate databases. The method also includes, at 336, associating the separate databases in an index using the unique identifier.

After the message components are stored, the message may be further rendered to a recipient by associating the message with an inbox of the intended recipient, receiving a request by the intended recipient to render the message, using the index to access the metadata, parsed SMTP header, and parsed SMTP message body in the separate databases using the unique identifier, and, rendering the message to the intended recipient. The method can further include applying similar parsing steps when the message includes one or more SMTP attachments. In addition, one or more tabulation elements can be relationally associated with the message and stored and/or rendered along with the other parsed components.

Figure 3G:
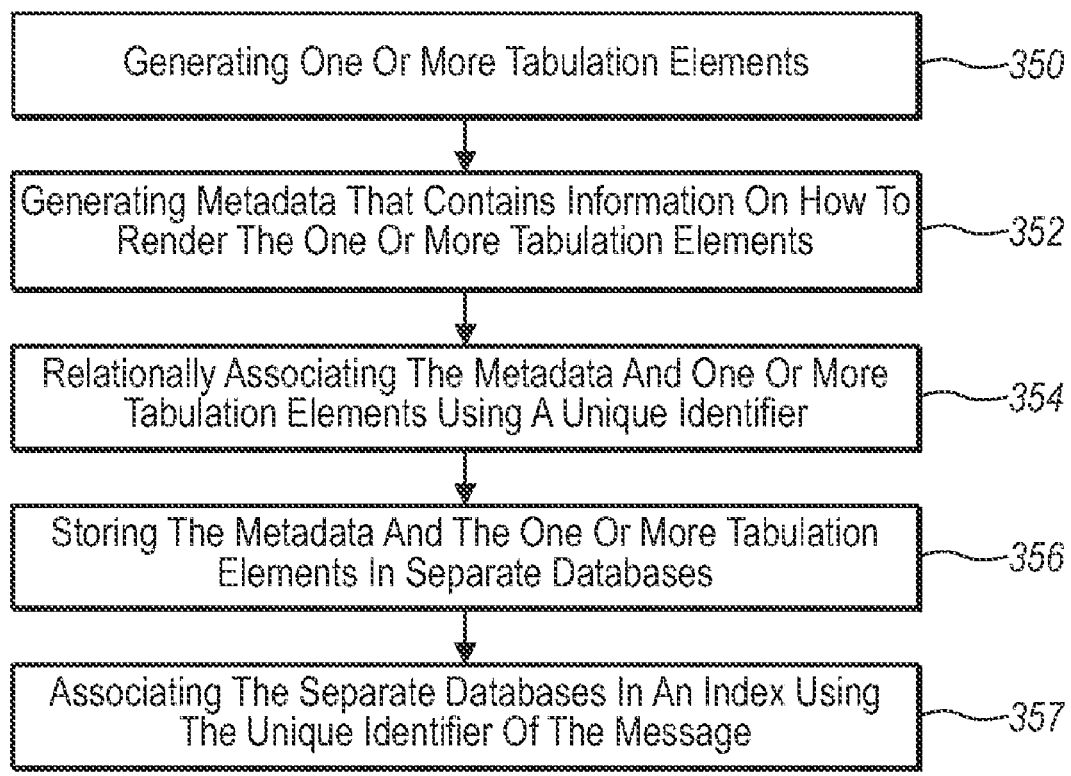
FIG. 3G illustrates an exemplary method for generating a message data structure having tabulation elements.

FIG. 3G illustrates an embodiment for generating a message without starting from an SMTP message. At 350, generating one or more tabulation elements, and at 352, generating metadata that contains information on how to render the one or more tabulation elements, the one or more tabulation element and the metadata being separable such that the one or more tabulation elements can be delivered together with or separate from the metadata, while still being able to render at least some aspects of the message to the user when at least one of the metadata or one or more tabulation elements is sent to a rendering system. At 354, the method further includes relationally associating the metadata and one or more tabulation elements using a unique identifier, at 356, storing the metadata and the one or more tabulation elements in separate databases, and at 358, associating the separate databases in an index using the unique identifier.

To render, the message, the method may further include associating the message with an inbox of the intended recipient, receiving a request by the intended recipient to render the message, using the index to access the metadata and one or more tabulation elements in the separate databases using the unique identifier, and, rendering the message to the intended recipient.

Conventional SMTP messaging uses the time stamp of a message to determine whether a document has been changed or not. In the present invention, instead of using the time stamp of a message, the data center can determine that subsequent receipt of a document is a duplicate by identifying that the unique identifier of the components of the message is the same. If the unique identifier of at least one of the components of the message is different, then the message has been changed and the sender may or may not choose to store the second version of the message. This is accomplished using an MD5 checksum to verify whether any aspect of the document has changed, other than the file name.

Also, other information relating to a message beyond the content of the message can be centrally stored and accessible by senders and/or recipients. This includes SMP metadata that may include information about the message, such as priorities, categories, message type, sender type, and the like. This also includes logging metadata that records time/date at which a message is sent and/or delivered, or additional actions performed on a message, such as reads, forwards, replies, deletes, modification, versions, and the like.

Another advantageous aspect of relational messaging is that an action taken on the message only needs to occur once, but the effect carries through to all users associated with the message. For example, if a sender decides to recall a message the system only has to identify one instance of storage of the message and can delete the message once.

Vi. Sendside Messaging Protocol (SMP)

The above provides a foundation for the following discussion of Sendside Messaging Protocol. Sendside Messaging Protocol (SMP) refers to the techniques and protocol for processing and transmitting the outbound message securely at the sending system (at the gateway), and processing inbound messages at the rendering system (at the data center) or another gateway. The SMP process involves extensive review of a communication before the message is even allowed into the network. This extensive review can include generating and/or modifying SMP metadata of a message for use by the gateway and the data center to perform functions in accordance with the SMP metadata. In some cases, the review can cause a message to not be sent at all from the gateway. The following will describe the various types of SMP metadata that can be included in the message.

FIG. 4 illustrates one example of an XML file 400 that has been generated for a communication according to SMP protocol. The XML file is only one way to format and transport SMP metadata. The XML file is another separable component of each message and can be stored in the same or different location as the other message components. The XML file can also be transported in various was such as an attachment to a conventional SMTP message, which is later parsed, or already parsed as a separate component from the message. The XML file 400 includes various protocol attributes of the message that define instructions on how the message is to be sent, how the message is to be rendered, and other characteristics of the message that will now be described below. Various ways for encoding the attributes in the metadata exist, the specific manner of doing so is not important so long as the gateway and/or data center can recognize and process the attributes. For example, attributes can be represented by code numbers, keyword tags, values, descriptors, and the like.

As mentioned above, before a sender and/or gateway can send to a data center, the gateway must authenticate itself, usually using the TSR. Thus, the XML file 400 may be generated either before or after authorization is received, but in any case, will not be sent if the sender and/or gateway are not authorized. The XML file 400 may indicate the XML version 402. The XML file 400 includes gateway information 404 such as the organization associated with the gateway, the date sent, and the server on which the gateway is located. The XML file 400 may also have an SMP indicator 405 that indicates to the data center that the XML file 400 is formatted according to SMP protocol.

The XML file 400 includes sender information 406. The sender information can include a "sender type" attribute that, when identified by the data center, can cause the associated sender type to be graphically rendered to the recipient of a message. Advantageously, graphically depicting the sender type helps a recipient immediately understand the origin of the message, who is trying to communicate with him/her and makes the interaction more meaningful and relevant. In one embodiment, a return path for the delivery notification and read receipt can be associated with the type attributesender type attribute so that the data center or other rendering system can determine where to send reporting information.

Figure 5A:
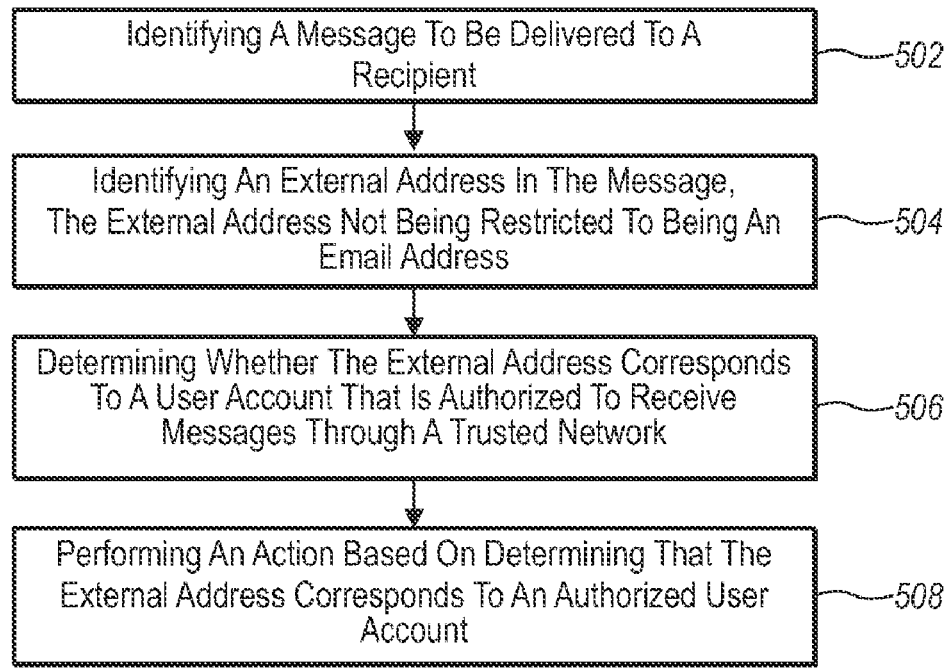
FIG. 5A illustrates an exemplary method for using an external address for sending a message.

The XML file 400 also includes recipient information 408. The recipient information can include any form of external address to identify the recipient. As mentioned above, the external address can be an email address, name, physical address, telephone number, military ID, social security number, a unique code, and the like, that can be used to send the communication. With reference to FIG. 5A, one exemplary method for using an external message includes, at 502, identifying a message to be delivered to a recipient, at 504, identifying an external address in the message, the external address having identification information for the recipient that can be useable to address the communication to a user account of the recipient, the external address not being restricted to being an email address, at 506, determining whether the external address corresponds to a user account that is authorized to receive messages through a trusted network, and at 508, performing an action based on determining that the external address corresponds to an authorized user account.

In some cases, selecting a recipient can automatically determine how the message is to be sent to the recipient (e.g., notification), how the message is rendered to the recipient (e.g., confidential), a timing or priority of sending the message, as well as categorization of the message for storing and searching functions. In addition, the sender could identify a "matter" which is associated with one or more recipients. In some cases, identifying a matter or category sets a recipient field or attribute to include the one or more recipients associated with the particular matter or category without a sender being required to manually select the one or more recipients to whom the message should be sent.

A "notification priority" attribute 411 dictates how the recipient should be notified, e.g., via email, fax, SMS, IM, desktop, phone call, or even via postcard, and the like. The external address can automatically be associated with user preferences indicating how the recipient wants to be notified for certain external addresses, confidentiality settings, priority settings, or category settings. Information in a SMTP header or SMP header can be separated out from the rest of the message by the gateway to be used to send notification messages to recipients.

Before sending the message, the gateway checks to see if all of the recipients have user accounts either on another gateway or on the data center that authorize the recipient to receive messages through the data center. This is one example where the TSR can be useful as a global registration system. If all of the recipients do not yet have user accounts, the message is stored at the gateway until at least one of them registers for a user account containing information matching the external addressing of the message.

The XML file 400 may also have a "priority value" attribute 410 that indicates whether the message is high, medium or low priority. This can be defined by the sender, or can be automatically defined based on other aspects of the message, such as the recipient, a message type (statement v. promotional material), a category type (business important).

The XML file 400 then includes information relative to an SMTP message body. The "message tab" attribute 412 relates to a SMTP message body and can provide information about the message content that can include a subject and the actual text of the message. Note that a "message tab" and a tabulation element could be used interchangeably, depending on the messaging configuration (see description for FIGS. 3A through 3C above).

A first tabulation element attribute 414 indicates that the message content in message tab attribute 412 should be rendered in tabular form. Additionally, there is a second tabulation element 416 containing content that will be displayed in a second tabulation page. Metadata can also be included to instruct the rendering system size, font, background color, or other characteristics of rendering the message content at the rendering system.

Further, "attachment" attributes 418 and 420 indicate SMTP attachments of the message. For message component that are not configured as SMTP, a "content file" attribute could be used to perform a similar function as an attachment attribute in that it could identify a content file that should be displayed as an "attachment" to one or more SMTP message bodies or tabulation elements. The attachment attributes contain a description of the content file such as the name, category, mime content, and size of a file. Content files can include, but are not limited to, documents, applications, images, video, and the like.

Figure 5B:
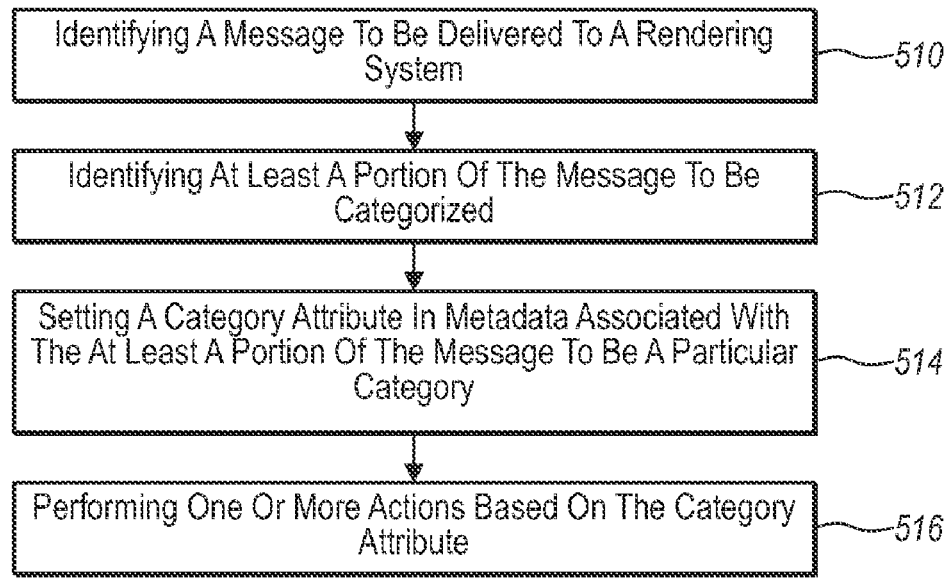
FIG. 5B illustrates an exemplary method for using a category attribute of a message.

A "category" attribute 419 defines a category with respect to the content of at least that portion of the message. Each component of the message can have the same and/or different category. Categories can include, but are not limited to, invoices, statements, engagement letters, and the like. In the example of FIG. 4, the "category" is "balance". FIG. 5B illustrates an exemplary method for categorizing messages including, at 510, identifying a message to be delivered to a rendering system, at 512, identifying at least a portion of the message to be categorized, at 514, setting a category attribute in metadata associated with the at least a portion of the message to be a particular category, and at 516, performing one or more actions based on the category attribute. Categorization can affect various aspects of how the message is configured and rendered to the recipient, and, in some cases, can be dynamically set depending on other settings of the message.

Although not shown, other ways to categorize a message or portions of the message are by industry and role. Exemplary industry categories include, but are not limited to banking, health care, legal, personal, and the like. More specific subcategories can also be defined within these general industry types. Categorizing by industry allows the sender to automatically render third-party content, for example inside or along side the message body(ies). Categorizing the message content by role allows organizations to organize messaging by levels of authority of positions in the company, which can also assist in defining access rights. For example, a message can be defined to be sent to all VPs in the company. Thus, this can implicitly define the recipients of the message as all of the VPs as well as implicitly defining certain access rights to the message, such as preventing the VPs to forward to anyone else. In addition, the sender and recipients can search for all documents sent to that organizational level.

Categories can also be dynamically generated based on how the sender configures the message sending. For example, when a sender sends to a "matter," the matter can be associated with various document types, all of which are given the same categorization as the matter itself. For example, in the legal context, a matter named "litigation case X" may be associated with various documents—such as engagement letter, court docket, and the like. All of these documents will have at least the same categorization as the matter "litigation case X" but may also have categorizations specific to the document itself. Thus, the sender and recipients can search and view all documents associated with a particular matter conveniently. Being able to externally address a message to a "matter" is useful where a sender would like to send information to a file, but not necessarily to a person. In addition, sender and recipient can search by document type, such as the sender viewing all engagement letters that have been sent out for various matters.

Categories can be sender-defined with personalized categorization before or after sending a message. Categories can also be recipient-defined after viewing the message. Thus, when a recipient receives a message, the recipient can personalize categorization of the message and/or documents on an ad hoc basis. Furthermore, senders and recipients can view personalized categories that the sender and/or recipient have enabled. The sender and/or recipient can search for messages content using any combination of type, industry, role, as well as any personalized categorizations defined by the sender and/or recipient. For example, the user may desire to find all tax-related documents across all general categories.

As mentioned above, depending on how the message sending is configured (i.e., a SMTP message body with at least one tabulation element or two or more tabulation elements without any SMTP message body), the content of the message may be rendered in three-dimensional form as opposed to conventional SMTP messaging that renders message content in two-dimensional form. In three-dimensional form, message content is presented in tabulated form with the message content presented in one or more tabbed pages (such as HTML) that allow a user to toggle between the pages. In the example of FIG. 4, the tabulation elements 412 and 414 thus show what content will be rendered in each tabulation page. The XML page provides instructions for rendering the content and may provide a summary of what content will be rendered. However, the content itself is accessed from the content databases 272, 273, 274, 275, 276 and/or 277 at the data center or similar such databases residing at a gateway, depending on how the message is stored. The content specifies any sources for rendering the message content. For example, "tabulation element" attribute 416 indicates that the content will come from a source URL. The content databases 272, 273, 274, 275, 276 and/or 277 can specify text message body, documents, web application content, files, binary files, text files, HTML files, remotely stored content, blogs, videos, audio files, vcards, email entries, URLs, images, applications such as approvals and confirmation, as well as third party sources such as web content and customer databases, and the like.

The dimensionality of the content information 412, 414, 416, 418, 420 can be configured in various ways, which definition is stored in the XML file 400. For example, a sender can define these content areas using a toolbar, or a GUI located on the sender messaging interface. Rule sets can also be used instead of or in addition to these various ways to configure dimensional information. A rule set is a set of instructions located at the gateway that generates metadata depending on certain identified conditions. The content analyzer 214, filter 216, and/or rule manager 224 of the gateway can perform this function. For example, the content analyzer 214 may be configured to parse the message body for a particular word string, such as "account info." Upon finding this identified word string, content analyzer 214 may add a tabulation element to the message data structure containing the content to add a summary of the account for the current month to be displayed stacked under the SMTP message body. The content analyzer 214 also adds corresponding metadata to the XML file 400, in this example "tabulation element" attribute 416, to reflect the added message content.

While not shown, other types of attributes can be included in the XML file to perform certain functionalities at the gateway and/or data center. The following will describe these various attributes. A "message type" and/or "urgency of a message" attributes defines attributes of the message. Message type can include promotional, regulatory, business confidential, business standard, business important, invoice, statement, personal confidential, personal standard, promotional, and the like. In addition, in one embodiment, the message type can include whether a message was generated by message generator operating on a server as opposed to a client computer and, if so, determine the application ID or mail user agent (MUA). The message type and/or urgency assigned to a message can affect the timing of transmission of the message, discussed below with regard to load balancing functions of the gateway.

A "message value" attribute is defined by the sender and/or assigned by an administrative entity for valuating each outgoing message. As mentioned below, organizations may want to know how many times a customer is being communicated with and the relevance of each piece of message to determine what type of messaging should be sent to the customer and the frequency of such messaging. This is particularly useful for larger organizations with multiple divisions that all communicate, unknowingly, with the same customer (end-user).

A "hold SMP metadata" attribute indicates whether the gateway should send or hold the SMP metadata.

A "hold SMTP header/body/attachment" attribute indicates whether the gateway should hold an SMTP header/body/attachment at the gateway.

The "hold SMP tabulation element" attribute indicates whether the gateway should hold an SMP tabulation element and its associated content at the gateway.

The "storage factor" attribute indicates where to store each component of the message, such as at the gateway and/or at the data center. As indicated above, the components of the message can be stored in separate locations and linked to each other.

The XML file may also include various instructions on how to render the message. For example a "logo placement" attribute can define where to render a logo of the sender (e.g., if the sender is an institutional-type sender).

A "precursor message" attribute defines the user of precursor metadata and precursor content that should be sent to render a precursor message at the data center.

A "rights management" attribute defines various rights that a recipient has with regard to activities performed on the message. The rights management can define specific individuals, groups, or can define wildcard patterns, such as *@domain.com, to define groups of recipients to whom the rights management rules apply. Rights management can define whether the recipient can reply, deleted and/or forward a message, and the like. Rights management can also prevent recipients from performing activities, such as deleting messages (e.g., to preserve litigation documents). Rights management can also require approvals to perform an action on the message. The rights management can require that when a recipient attempts to forward a message, an approval request is sent to the sender that provides the sender an opportunity to approve the request. Rights management settings can also support more flexible provisions such as allowing everyone within the company (domain) to view the message, yet not allow the message to be sent outside the company. The rights management can be defined during composing the messages or may be predefined based on the type of user account the recipient has.

A "return via gateway" attribute can be included in the metadata to define a return path and a gateway ID to which to send communications, such as delivery receipts, read receipts, notification messages, confirmation messages, and the like.

For individual type senders, the XML file may have a "sender action" or "sender agency" attribute. This means that a sender must manually approve sending a message through the network, proving that a message originated from a human and not a message-generating application. The sender action can include sender or administrator authorization. This can include holding an outbound message until the sender or administrator authorizes sending of the message. In one embodiment, an email message, a text message, an IM message, a phone message, can be sent to the sender or administrator with a link associated with a hash value that, when clicked by the sender or administrator, requests sending information from the gateway using the hash value and renders the sending information to the sender or administrator to manually approve. The sender action can include the sender being required to perform a test to determine whether the sender is a human, such as a CAPTCHA test in which the sender is required to type in the word depicted in warped text. Note that this sender action may have already been satisfied during analysis by the content analyzer 214 and/or filter 216 of the gateway upon identifying certain characteristics of the message even before the XML file is generated by the parser 222 (see FIG. 2A). In this case, the sender action or sender agency attribute may be tagged with an indicator confirming that the sender has already satisfied this requirement.

When the XML file contains a "confidential" attribute, the message can be rendered to a recipient in a different manner than if the material is not confidential. For example, a red icon can appear on the recipient's interface indicating that a message is confidential.

A variation of the SMP protocol described above may also be used depending on how stringent the administrative settings are for a gateway. Finally, another aspect of SMP is that information traveling through the secure network is encrypted at the network level (using SSL or TLS), at the application level (by the application and database servers), and at the protocol level, thereby ensuring the most robust and secure mechanism possible for safeguarding data.

As discussed above, the XML file contains instructions on how to render a message. Where a SMTP message has been parsed into its constituent parts, the XML file provides instructions to render the message so that the recipient is unaware of the underlying data structure. Where tabulation elements are used, whether with an SMTP message or without an SMTP message, the XML file contains instructions on how to render the tabulation elements. Since tabulation elements are a versatile data structure that can contain text, similar to a message body, content files, and/or third party content, the tabulation elements may be rendered in various ways such as in a message body or as a three-dimensional message page. In addition, the XML file can contain instructions on whether tabulation elements should be displayed as an attachment to another tabulation element and/or SMTP message body.

VII. Verifications, Approvals, Load Balancing, and Aggregation Functions Performed by Gateway One aspect of load balancing provided by the present invention for sending messages is provided by spooling technology at the gateway. Conventional SMTP systems automatically send an outbound message whenever a message is selected for sending, or as shortly thereafter as possible. Thus, for conventional SMTP systems, at times of peak usage, traffic may bog down the network increasing latency and reducing performance. In contrast, as depicted in FIG. 2A, the present invention provides that a message can be spooled in two areas before being sent from a gateway and, in some cases, may not even be sent at all. The first spooling occurs before a message is processed by the SMP module. Spooling provides an opportunity to identify valid senders, recipients, and/or gateways using authentication protocols at the gateways, and, in some cases, using the TSR. This allows for significant amounts of inbound SMTP traffic to be processed and spooled before being sent on to subsequent steps and/or processing. If the message type for a message indicates that the message should be sent via SMTP (i.e., unprotected) without undergoing further SMP processing, the first spooling determines this and sends the message out the gateway.

After a message has undergone extensive review and/or processing by the SMP module, the message is again spooled to a repository 228. Advantageously, this allows the gateway to perform load balancing functions on the traffic going through the gateway. The send agent 230 performs the function of monitoring the network traffic and determining which messages stored in the repository 228 to send out from the gateway at any given time. The gateway thus includes intelligence for spooling messages and sending messages when the timing makes sense based on network traffic, performance factors, the time of day, and/or based on sender defined timing configurations. Sender defined timing configurations include allowing a user to define a time at which the user prefers a message to be sent. The configuration can include a "send by or before," "send after" a certain specified time, "send on date," and the like.

Spooling messages can provide the benefit of load balancing (i.e., distributing and reducing) network traffic. For example, a gateway's traffic can be monitored over time to identify times of peak usage and average usage. The gateway then determines based on the message type/urgency whether to send a message at a particular time or to delay sending the message at a time when the gateway is experiencing less traffic. For example, if a message is part of an asynchronous message between a sender and a recipient, the gateway may determine the message to have a higher priority and, thus, send it more quickly than for a one-way message, such as a statement.

Spooling can provide an opportunity to review the message and/or filter the message based on identification as spam or unwanted content. In contrast to conventional SMTP systems, a message on the network does not have to be from a valid sender. For example, a machine-generated message by a spamming organization can proliferate and propagate on the network, tying up an organization's network resources, increasing the need for the recipient to resort to filtering incoming message traffic. The present invention performs much of these filtering aspects before sending the message but also provides additional measures at the rendering system to make sure that the message is from a valid sender.

Figure 6A:
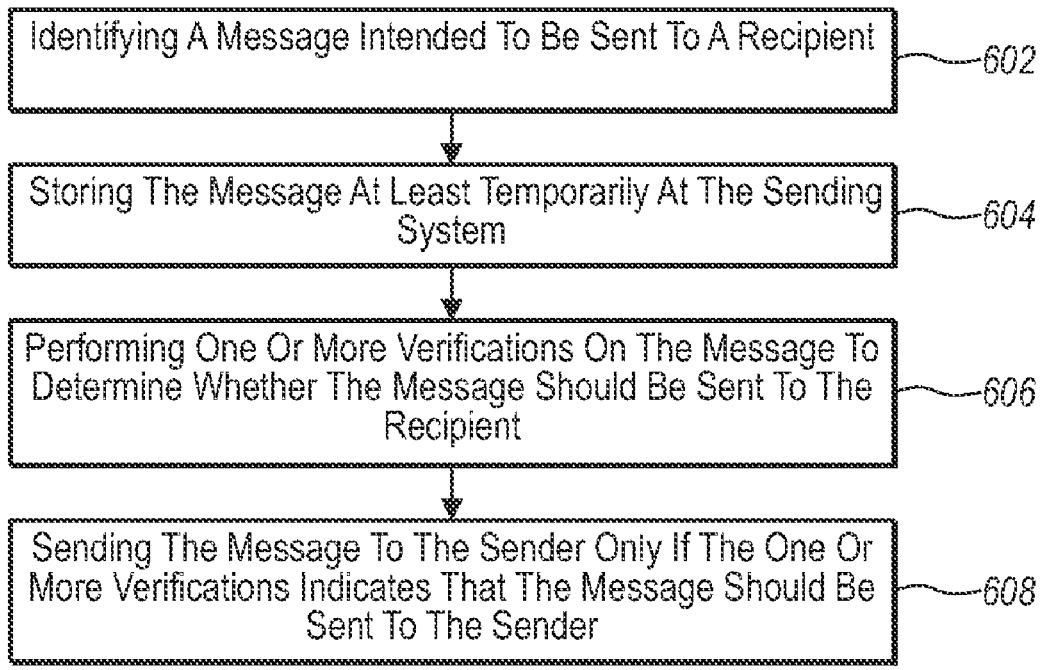
FIG. 6A illustrates an exemplary method for performing verifications before sending a message.

Spooling at the gateway also allows the gateway to perform verifications and validations to confirm that a sender wishes to transmit a message and that various parameters of sending are correct. An exemplary method for performing verifications is depicted in FIG. 6A and includes, at 602, identifying a message intended to be sent to a recipient, the message, at 604, storing the message at least temporarily at the sending system, at 606, performing one or more verifications on the message to determine whether the message should be sent to the recipient, and, at 608, sending the message to the sender only if the one or more verifications indicates that the message should be sent to the sender.

The gateway can perform a verification step that confirms that the sender wishes to send the message. In one embodiment, the gateway can match the external address with a recipient user account. If no recipient user accounts have the identified external address, the gateway can send a verification message to the sender to determine whether the sender made a typographical error or whether the sender really intended to select that particular external address. This assists in catching human errors and giving the sender an opportunity to correct an error if one was made. As mentioned above, the sender may wish to attempt to contact a recipient even if the recipient does not currently have a valid account. The sender can request to hold the message at the gateway until a recipient user account does match the external address.

Further, this verification of the recipient's user account can provide additional value to the recipient. The gateway can check permissions to confirm that the sender is allowed to send to the identified recipients. For example, a recipient may have blocked a particular sender. In another example, a recipient may decide that s/he does not want to receive inbound communication from people who use just an email address as an external address and instead wants to require that senders also supply his/her correct First Name and Last Name or some other query. Thus, in the verification step of determining whether the recipient's user account is valid, the gateway can also determine if any additional required identifying information must be supplied by the sender before the gateway is allowed to send the message to the data center. This can be accomplished by the gateway checking the recipient's user preferences. The gateway can then send a request to the sender to supply the required identifying information when confirming a send operation. If the gateway determines that purported identifying information supplied by the sender matches the required identifying information, then the gateway is allowed to send the message to the data center. In addition, if a matter is specified, a rule may be associated that any message sent to this matter must be approved by an authorized approver before the gateway is allowed to send the message to the data center.

As part of the verifications and validations, the gateway allows a repudiation period in which a sender can, after hitting "send", decide to retract a message that was sent. The gateway accesses the message stored at least temporarily at the gateway to allow the user to change or delete the message. This repudiation period is determined by the network administrator and can be adjusted on the fly. In one embodiment, after the sender hits "send," the gateway can display the identity of recipients to whom the message was sent. This allows the user to verify that the message was addressed to the right recipients, and, if not, to change or delete the message as desired. The gateway can also render repudiation options, such as "recall message," which cancels transmission of the message at the sender gateway and the message is never sent to the recipient's inbox. This is particularly useful for cases when there are misspellings or when the sender forgets to attach a file to the message.

Further, the gateway evaluates sender behavior such as noteworthy events which may be indicative of illegitimate sender usage (referred to as pattern analysis). For example, the gateway can determine whether the sender is sending or has a history of sending to a large number of recipients. If a sender has a past history of sending to only a few recipients and the gateway identifies an unusual aberration of a message being sent to numerous recipients, the gateway may send a confirmation message to confirm that a sender intended to communicate with the large number of recipients. However, if the sender has a history of sending, the gateway may notify an administrator who may take additional steps to investigate whether the sender should be authorized to continue to send messages to a large number of recipients. Alternatively, the gateway may access sender profiles in which the sender may have authorization to send to large number of recipients, such as a newsletter editor or other personnel. Indicia of sender abuse can cause additional processes to occur, such as parsing the message to determine the content of the message. If the content relates to topics traditionally the subject of spam, the gateway may prevent such a message from being sent.

Another aspect of monitoring the frequency of use is that the gateway can monitor frequency of messages between a particular sender and a particular recipient. If a sender frequently communicates with a particular recipient, that is indicia that a message is more likely to be desired by the recipient. If the sender is sending a first-time message to a new recipient, the gateway can present a confirmation message to the sender to validate sending of the message to this first-time recipient.

The gateway may also monitor whether a sender has previously been allowed to send a message to the recipient, and this alone may allow a subsequent message from the sender to be sent to the recipient.

Figure 6B:
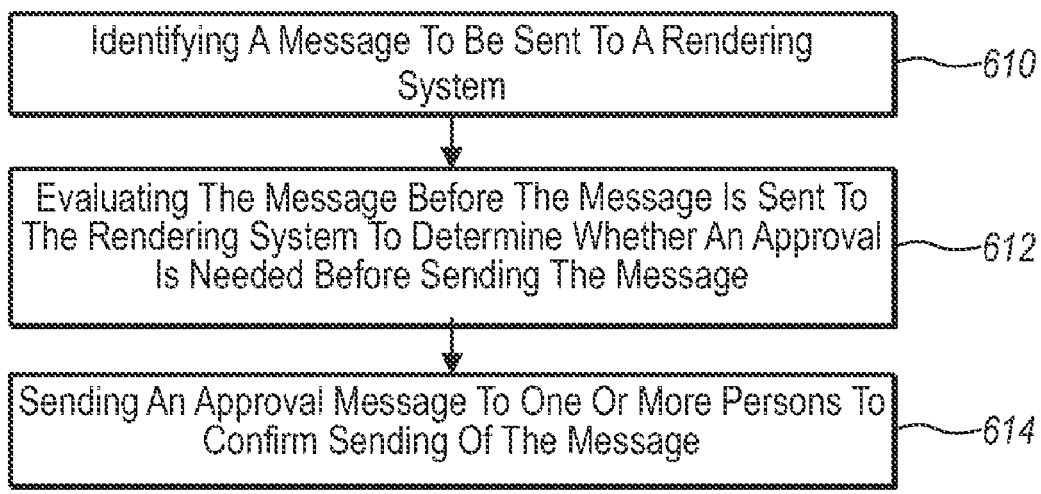
FIG. 6B illustrates an exemplary method for performing approvals before sending a message.

In addition, if the message requires approval from the sender or another third party, this step confirms that appropriate approvals were received. FIG. 6B illustrates an exemplary method for obtaining approvals before sending a message, including at 610, identifying a message desired to be sent to a rendering system, at 612, evaluating the message before the message is sent to the rendering system to determine whether an approval is needed before sending the message, and at 614, sending an approval message to one or more persons to confirm sending of the message. This can include upon identifying an indicia of spam, such as a number of recipients, a number of recipients within a given time period, or content indicating spam, sending a challenge message (such as captcha query) to the sender and sending the message from the gateway only if the sender correctly responds to the challenge message. The approval message may also require administrative approval. Such approval messages can be sent by any method such as email message, text message, phone message, or instant message.

Figure 6C:
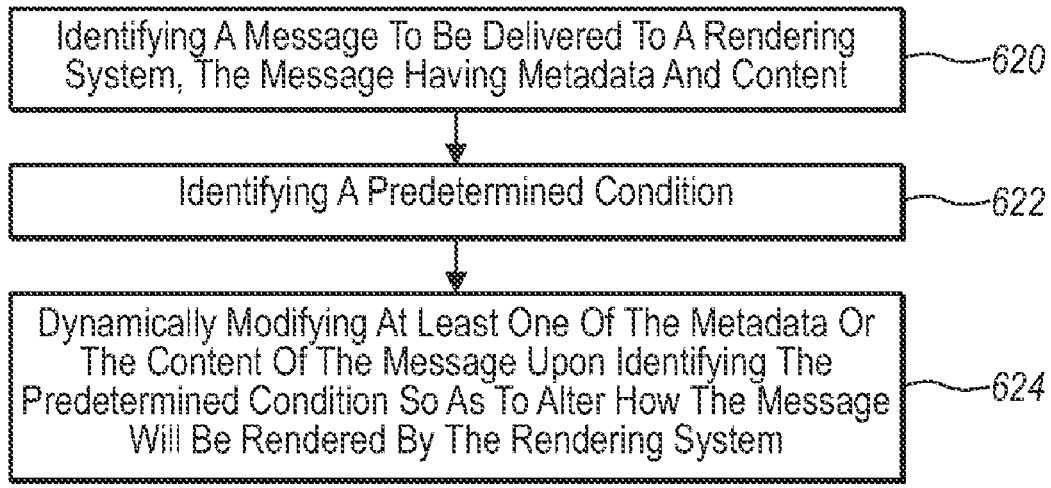
FIG. 6C illustrates an exemplary method of dynamically modifying a message before sending.

The gateway can also modify a message before it is sent to a recipient. As shown in FIG. 6C, an exemplary method for modifying a message before it is sent to a recipient includes at 620, identifying a message to be delivered to a rendering system, the message having metadata and content, at 622, identifying a predetermined condition, and at 624, dynamically modifying at least one of the metadata or the content of the message upon identifying the predetermined condition so as to alter how the message will be rendered by the rendering system. The predetermined condition can be any symbol, pattern, expression, keyword, or protocol attribute that causes the metadata or the content of the message to dynamically be altered before it is sent. Dynamically altering the metadata or the content of the message can alter a timing by which the message is sent, a location at which the message is stored, a category by which the message is stored, or a security protocol by which the message is sent. In one particular example, if the gateway determines that the message was generated by a rack of servers having a message generator software configured to generate mass emails, the gateway can dynamically set the sender type attribute in the metadata of the message from an Individual type (which may be a default setting in the user's preferences) to an Institution type.

Having a sender declare a message type before sending a message through the network assists the gateway in performing aggregation functions to assist in load balancing of the network. This declaration, not found in conventional messaging systems, allows the recipient to have greater control over the types of information she might be willing to read. For example, a financial services organization, such as a bank, may have different types of messages that can be sent to a customer (e.g., user client 104d), each of which may be assigned a message value. A statement may have a higher message value than a newsletter. A bank may define a threshold value against which messages to be sent will be evaluated to determine whether they should be sent to a rendering system or not during a given period so as to increase the likelihood that a customer will read a message from the bank.

Figure 6D:
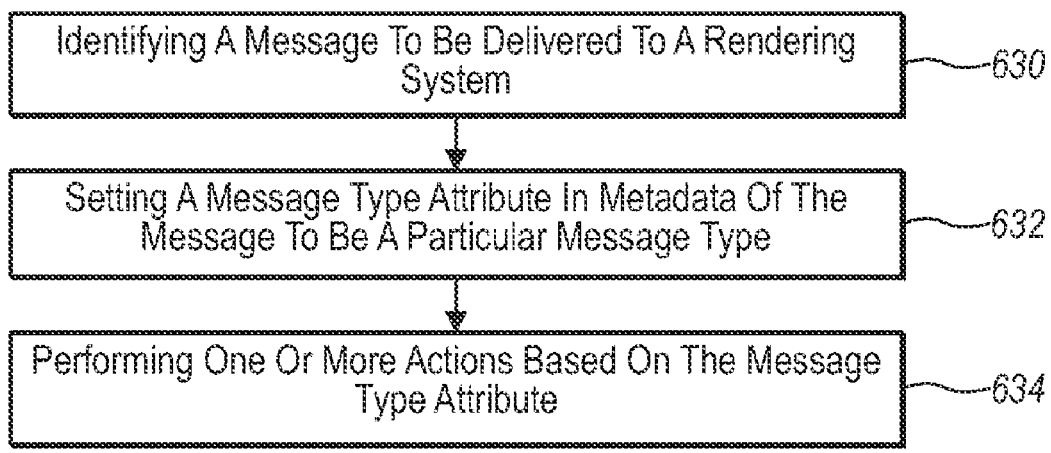
FIG. 6D illustrates an exemplary method of using a message type for sending message.

One exemplary method of using message type at the gateway is depicted in FIG. 6D, including, at 630, identifying a message to be delivered to a rendering system, at 632, setting a message type attribute in the metadata of the message to be a particular message type, and at 634, performing one or more actions based on the message type attribute such as identifying user preferences for each of the recipients associated with the message and determining whether the user preferences of each recipient allows messages to be sent to each recipient having a same message type as the particular message type set in the message. The message type can also define a timing of sending the message, whether the message was generated by a server, or whether the message should be sent securely (using SMP protocol) or unsecurely (using SMTP).

Furthermore, an organization can be given aggregate statistics of user preferences to determine how effective the message is likely to be. The TSR, data center, or gateway can store user preferences. The sending gateway can send a request to access the user preferences for recipients identified in a composed message and receive, before sending the message, a report of whether the user preferences of each recipient allows messages to be sent to each recipient having the same message type as the particular message type set in the message. The gateway can further calculate what percentage of all the recipients of the message have a user preference that allows messages to be sent to each recipient having a same message type as the particular message type set in the message. If the percentage meets or exceeds a desired threshold value, this may be one factor that an organization uses to determine whether to send a particular message.

Figure 6E:
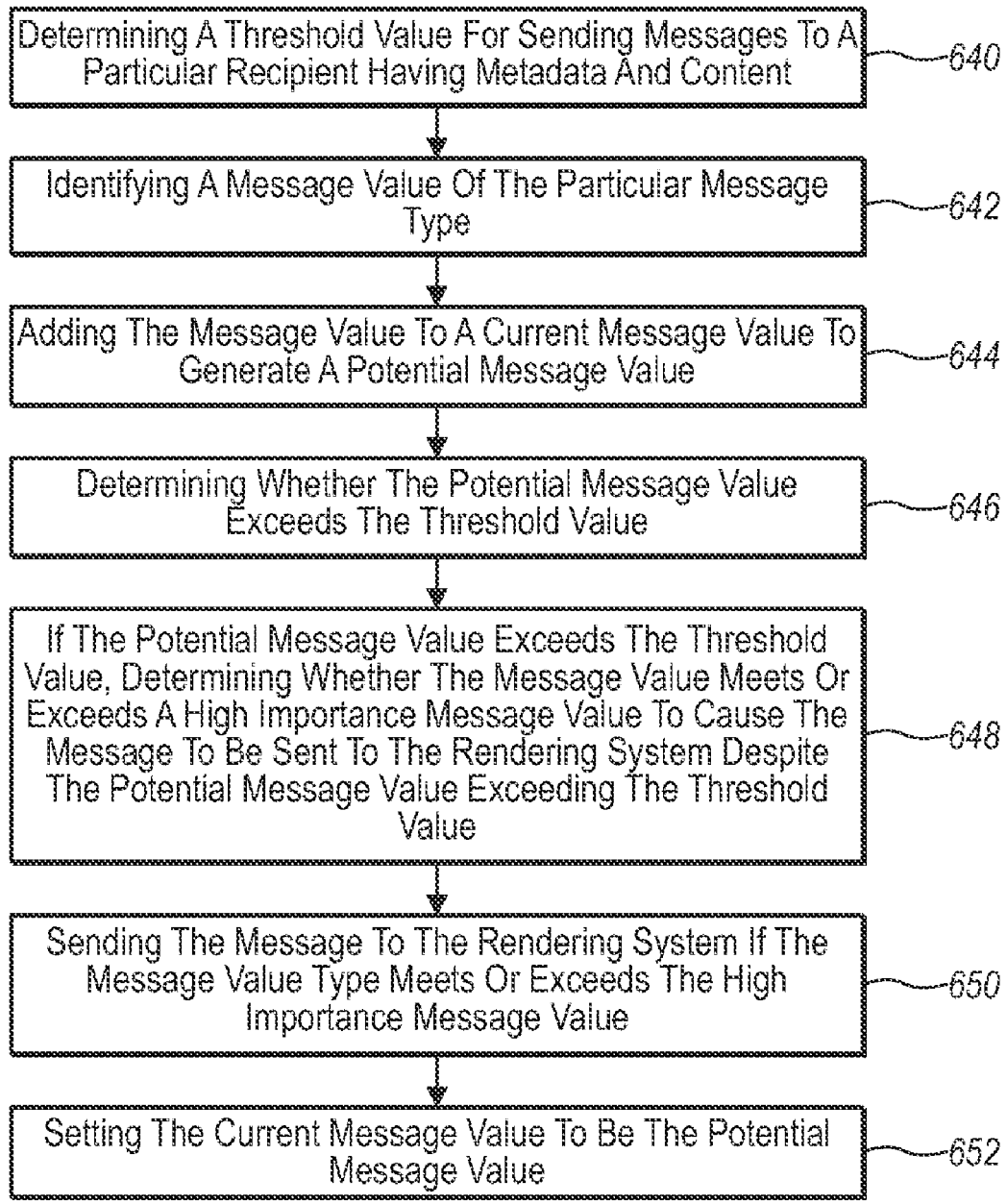
FIG. 6E illustrates an exemplary method of performing aggregation functions before sending a message.

FIG. 6E depicts another exemplary method for gateway aggregation based on message type including, at 640, an organization defining a threshold value for sending messages to a particular recipient, which can be done while configuring the gateway system. Sometime after the threshold value is established, at 642, the gateway identifies a message value of a message that is desired to be sent from a gateway to a rendering system. At 644, the gateway adds the message value to a current message value to generate a potential message value. The gateway, at 646, then determines whether the potential message value exceeds the threshold value. At 648, if the potential message value exceeds the threshold value, the gateway can determine whether the message value meets or exceeds a high importance message value to cause the message to be sent to the rendering system despite the potential message value exceeding the threshold value. The high importance message value defines the minimum value required to allow messages to be sent even if the threshold value will be exceeded. At 650, the gateway sends the message to the rendering system if the message value type meets or exceeds the high importance message value. At 652, the gateway then sets the current message value to be the potential message value. Further, if the gateway determines that a certain customer has not received the threshold level of messages from the bank (i.e., the potential message value does not exceed the threshold value), the gateway may allow other lower-priority messages to be sent to the customer even if the message value does not meet the high importance message value. The gateway then sets the current message value to be the potential message value.

For a large organization that may have personnel from various departments sending information to a customer for various reasons, this allows an organization to make informed and calculated decisions on what message and promotional materials to send a customer within a given period. Having a central way to manage outbound communication and reduce the likelihood of over-communicating with a given recipient is desirable. The current message value can be periodically reset to zero on a daily, weekly, monthly, or yearly basis.

The gateway can monitor messages from various senders associated with the organization directed to the customer so that the threshold value is based from all cumulative sending of messages from the organization to a particular recipient. In addition, for a large organization where a customer may have multiple accounts in different departments, all of which need to communicate with the customer, the gateway provides the ability to centralize customer access and provide traffic-cop functionality to prevent a given customer from receiving too much information. This problem is common in larger organizations where one division may not necessarily be aware that another division may have a relationship with the same customer.

The threshold value can be dynamically adjusted on a per recipient basis. For example, the gateway can also monitor behavior of the customer in reading messages from the organization. If the gateway determines that the recipient actually reads a certain desired percentage (e.g., over 50%) of what is sent to her, the gateway can dynamically increase the threshold value to allow more messages to be sent to the recipient, since it is likely that the recipient will read them regardless of message type. Conversely, if the gateway determines that the recipient reads very little of what is sent (perhaps only the messages having the highest message value), the gateway can infer that the recipient is a discriminate reader and only reads the most important messages. The gateway can then dynamically decrease the threshold value for that particular recipient so that only the most important messages are sent to the recipient. Dynamically adjusting the threshold value can have the effect of greatly increasing the likelihood that a recipient will read important information coming from a particular organization while preventing messages from being sent that the user is likely to reject as not important or worthwhile.

Thus, the gateway serves a unique aggregation function to monitor data communications for a particular organization, including the amount of messaging a user receives from across multiple organizations. In contrast, many conventional secure messaging solutions are vendor-specific and only monitor the amount of messaging coming from a particular organization, or sub-organization. Furthermore, these solutions require a user to define separate user login to access these messages, whereas the gateway is able to perform all of these aggregation functions within the messaging environment of the data center.

Figure 6F:
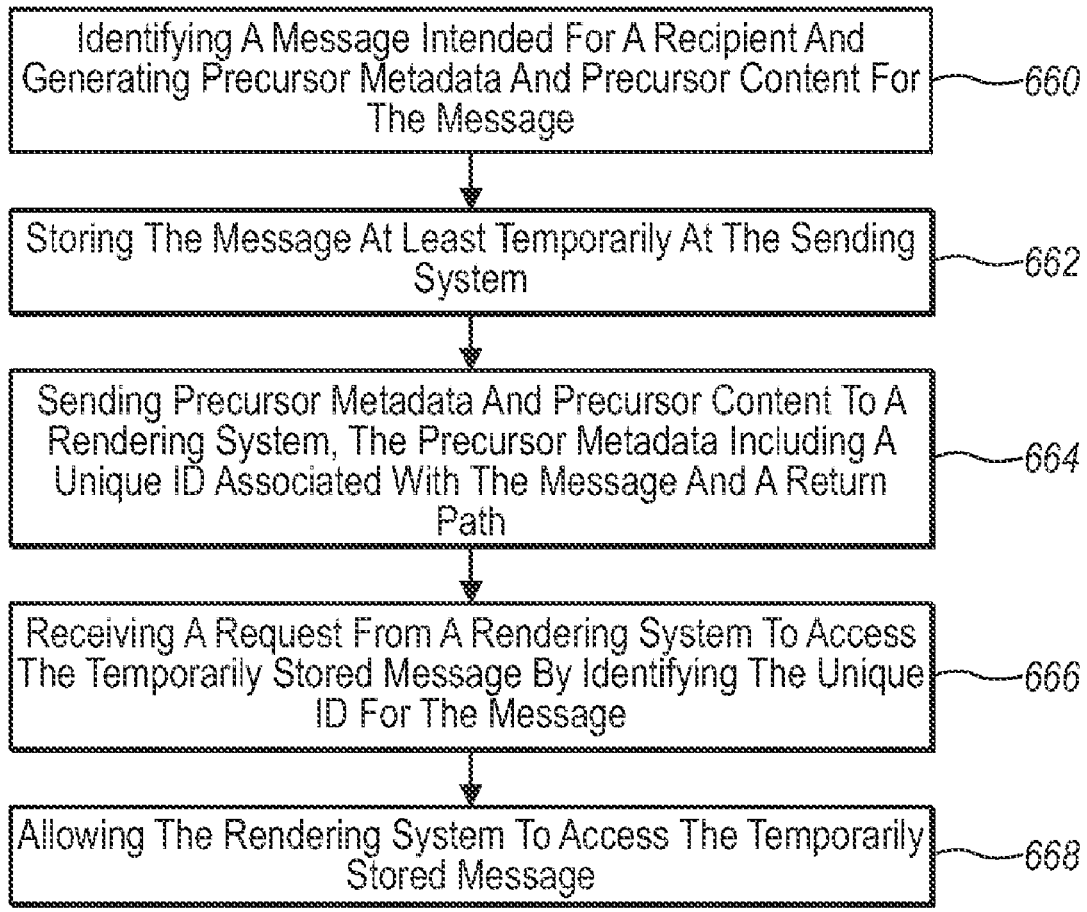
FIG. 6F illustrates an exemplary method of using precursor metadata for sending a precursor message.

Another load balancing technique provided by the gateway is to send precursor messages for mass-type messages, at peak network usage times, or for protected messaging. An exemplary method of using precursor messages is illustrated in FIG. 6F, where, at 660, when the gateway identifies a message intended for a recipient and a situation where a precursor message is desired, the gateway generates precursor metadata that contains basic information about the message—such as sender, sender type, recipient, subject, date sent, a unique message ID, and a return path. At 662, the message is at least temporarily stored at the sending system. At 664, the precursor metadata is sent from the gateway separately from the rest of the message to the rendering system along with a unique ID and a return path.

The rendering system uses the precursor metadata and causes a precursor message to appear in the recipient's inbox. The recipient is generally unaware that the message is a result of a precursor message. In cases where the message originates in the data center and is not sent via a gateway, a precursor message is not required and message rendering occurs as normal. When the recipient selects to view the precursor message, the precursor metadata instructs the rendering system how to handle the recipient request. At 666, the sending system receives a request from a rendering system to access the temporarily stored message by identifying the unique ID for the message and, at 668, allows the rendering system to access the temporarily stored message.

Figure 6G:
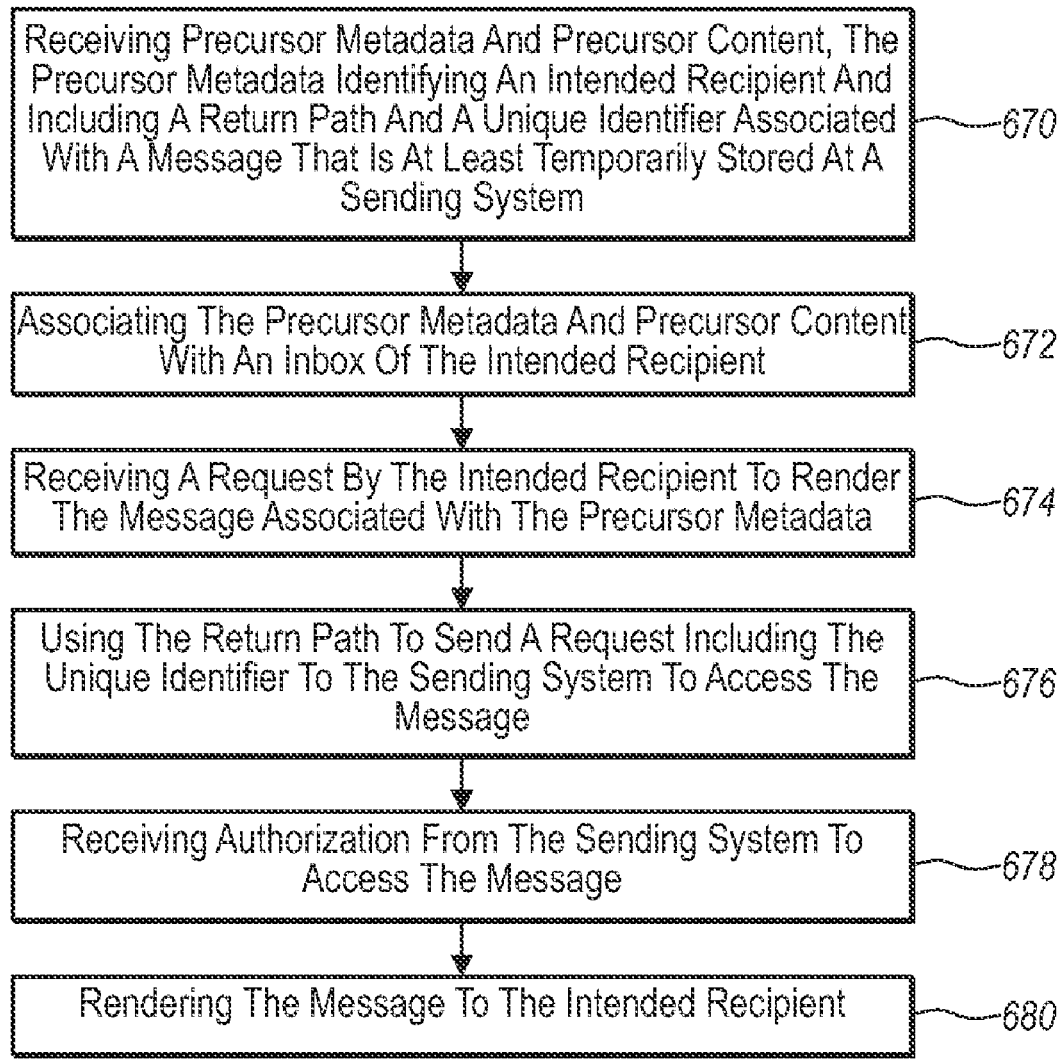
FIG. 6G illustrates an exemplary method of using precursor metadata for receiving a precursor message.

FIG. 6G illustrates one exemplary method for using precursor messages from the point of view of the rendering system, including, at 670 receiving precursor metadata and precursor content, the precursor metadata identifying an intended recipient and including a return path and a unique identifier associated with a message that is at least temporarily stored oat a sending system, at 672, associating the precursor metadata and the precursor content with an inbox of the intended recipient, at 674, receiving a request by the intended recipient to render the message associated with the precursor metadata, at 676, using the return path to send a request including the unique identifier to the sending system to access the message, at 678, receiving authorization from the sending system to access the message, and at 680, rendering the message to the intended recipient.

Once the gateway allows access to the temporarily stored message, various actions may happen. For example, the precursor metadata may instruct the gateway to send the rest of the message to the rendering system for storage. Alternatively, the precursor metadata may instruct the gateway to maintain storage of the rest of the message, but allow the rendering system to access the rest of the message stored at the gateway to render the message to the recipient. Other configurations are also possible.

Advantageously, precursor messages can be used to perform load balancing, especially at times of peak network usage. Further, when the gateway desires to send a message to a thousand recipients, the gateway may choose to send precursor metadata instead, which notifies the recipients of the existence of a message. Then, the recipients can access the message at the gateway, at which time, the actual message may be sent over the network. This serves to distribute the network resources required to send a message to multiple recipients. Thus, precursor messaging can be ideal for mass-type messaging.

Figure 6H:
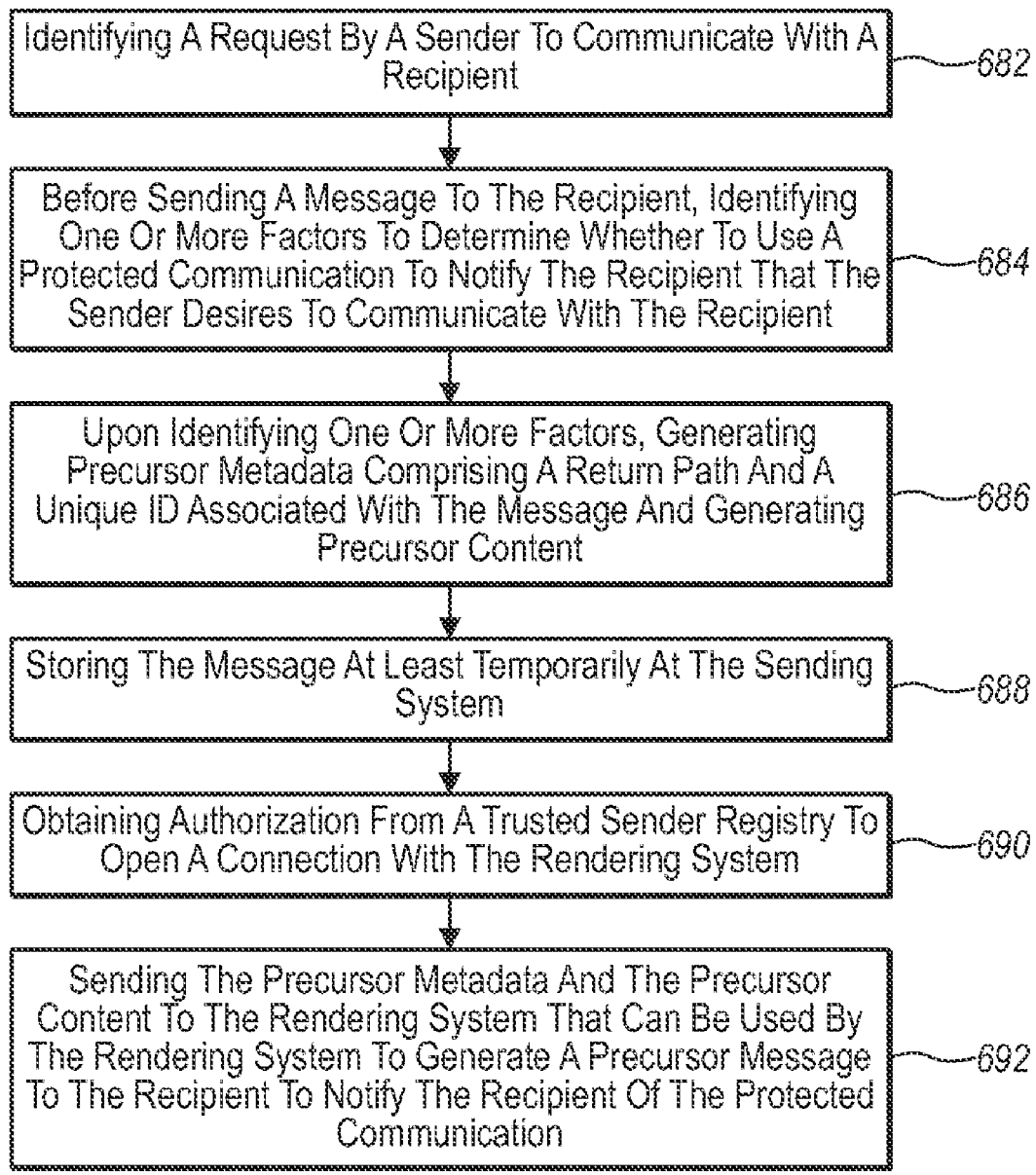
FIG. 6H illustrates an exemplary method of using precursor metadata to perform protected message functions.

Additionally, precursor messages can be used to perform "protected" messaging as exemplarily depicted in FIG. 6H. At 682, the gateway identifies a request by a sender to communicate with a recipient. Before sending a communication to the recipient, at 684, the gateway identifies one or more factors to determine whether to use a protected communication to notify the recipient that the sender desires to communicate with the recipient. This can include the sender defining the message as being protected or unprotected, which can be specified in a protocol attribute in the metadata of the message. Or the gateway can identify a sending configuration rule based on a message type or message urgency, categorization, gateway ID, and the like, that indicates that the message should be protected. When a factor is identified to send a precursor message instead of the main message, at 686, the gateway generates precursor metadata including a return path and a unique message ID associated with the communication and generates precursor content. The gateway, at 688, at least temporarily stores the main message. At 690, authorization is obtained from the trusted sender registry to open a connection with the rendering system, and at 692, the precursor metadata and precursor content is sent to the rendering system to be used by the rendering system to generate a precursor message to the recipient to notify the recipient of the protected communication.

As used herein, the term "protected" refers to where the precursor message is sent instead of the main message itself. A "protected" precursor message can be used for messages that are sent both secure and unsecure. A "secure" message is a message that is sent entirely within the trusted network using a trusted sender registry authorization to validate the transmission of the message between a sending system and a rendering system.

However, in another embodiment, the precursor message could be sent through unsecured means (e.g., SMTP) and used by a rendering system to generate a precursor message that appears to the recipient as a normal message. As mentioned above, the term "send" should be broadly construed to include situations in which a precursor message is sent to a recipient in the place of sending the message itself. For highly confidential messages, advantageously, the protected configuration allows messaging such as legal information, financial information, and the like, to send only a minimal amount of information outside the trusted network, or, alternatively, maintain all the information entirely within the trusted network, including the precursor metadata that is used to generate a precursor message.

Also a combination of protected/unprotected messaging can be done using precursor messages. For example, a bank may desire to keep a message protected until a recipient identifies and/or authenticates herself to the organization. After a recipient successfully authenticates into the recipient's user account, the recipient can view a precursor message in her inbox. When the recipient selects the message, the bank gateway sends the rest of the message through unsecure means, such as SMTP, to the recipient's inbox. Of course, the recipient may remain unaware that the original inbox message was a precursor message and may be unaware of the transferal of the message between the gateway and the data center upon viewing the message.

The gateway spooling can take place for both protected and unprotected messages. For example, spooling can be combined with an unprotected configuration where an application is generating millions of statements for an organization. The gateway determines the best time from a network traffic standpoint to send some or all of the statements. If the statement has a lower priority, the gateway may choose to wait a few minutes until the network traffic on the gateway is lower.

Messages that are sent from the gateway are typically batched before sending. When the gateway is ready to send messages beyond the organizational boundary, the messages are batched and information about the batch is included in repository 228 (FIG. 2A). The repository includes a summary database of the recipient of the message, the time the message needs to be delivered, as well as metadata.

Thus, having the gateway performing verification and other load balancing functions before the message is sent can prevent unwanted messages from even entering the network. Conventional filtering technologies attempt to combat spamming after the message has entered the network, thereby requiring the recipient to consider added measures to reduce unwanted messages. Conventional filtering technologies, in some cases, actually generate more network traffic in an attempt to identify valid senders. For example, a simple challenge/response mechanism would require a challenge message to be created in response to an original message and then require a sender to authenticate herself using a reply message to the challenge message. So, the original message results in two additional messages being sent through the network before the original message are delivered to the recipient. The present invention reduces the amount of traffic over the network as well as performs functions on the sending end that reduce or eliminate the need for the recipient to resort to conventional filtering technology to manage their messaging.

IIX. User Profile and Preferences

Users wishing to send and receive secure messages with each other and/or with institutions but who may not be part of an organization are able to enroll using software applications in the data center. Enrolling can also refer to a user joining the organization on an opt-in basis rather than an affirmative subscription process. For example, an opt-in basis may be applied to users who are employees of an organization. The following user description of user profile and preferences are usually selectable by a user through a user interface of a web application operating from the data center. Since the user interface design can change depending on the design configurations, only the functionality of the user profiles and preferences will be described.

When a user enrolls, the user provides various identification information such as name, postal address, telephone number, email address(es), business name, military ID, social security number, a user ID, password for the user. A profile can include one or more email addresses with which a person is able to contact a user. As discussed above, various aspects of the identifying information of the user profile can be used to send a message to the user without necessarily using the user's email address (referred to as "external address"). The user can then choose whether or not to respond to the message, but the user's email address(es) is not revealed to the sender.

The user is associated with one or more account or sender types. Typically, the sender type is selected depending on how the user is first introduced into the network. If the user is associated with an organization, typically, an administrator will specify that the user has an individual account for a professional sending on behalf of an institution. If the user registers with the data center as a result of receiving a secure message from someone, that user will have an individual/personal account. (Note that if an organization has a gateway, the gateway identification is associated with a sender type being that of an institution, which would not apply to individuals). Once a user develops a profile, the user can manage his/her email associations.

Various preferences can be configured by a user, such as notification preferences for receiving and sending messages and communications relating to linking profiles. For example, a user can specify to notify the user via email or text message when a new message is received or a priority message is received. The user can specify to be notified if a message or priority message sent by the user has not been read within a certain period of time. The user can configure an automatic reminder to be sent for messages that the user sends if the message or priority message is not viewed within a certain period of time. Priority messages may have a shorter period of time for notifications and reminders than regular messages. Notifications can also be specified by the user to be sent via other notification mechanisms, such as, but not limited to SMTP email, SMS text message, instant message, facsimile, letter, postcard, telephone, and the like.

A user can select security preferences. The user can define accepted IP addresses that are allowed to connect to a client device of the user. If a device attempts to login from an IP address not found in the user's preferences, the system may request additional information to verify identity. This is also helpful in preventing man-in-the-middle attacks since a compromised login and password will not necessarily allow someone in a remote location to login due to an IP mismatch. The security preferences may also list recent login activity so that the user can verify that the login activity corresponds to the user's recollection of when the user has had access to the user's account as well as a map showing the geographic locations corresponding to the recent login activity.

Regarding secure messaging preferences, the user can configure display settings, such as the number of messages to display at a time, sorting rules for displaying messages by sender or other criteria, deletion rules, managing blocked users, and managing signatures/approvals. The user can also configure secure settings for when the user composes a message. For example, the user can prevent forwarding on all outgoing secure messages, and sending a copy of outgoing messages to an email account.

A user can also configure content file displaying preferences. The user can specify how contacts, institutions, and categories should be sorted in a list, and the sort order for displaying content files. The user can also configure content file settings for messages that originate from the user or are composed by the user, such as keeping content files in a content file repository when messages are deleted, deleting content files from a content file repository when the message is deleted, and the like.

Further, the user can set contact preferences relating to managing contacts. The user can configure display settings for displaying contacts. The user can also specify certain information about the user's profile to make publicly viewable to contacts with whom the user is linked.

A user can view various individuals included as contacts. This view displays individual-type users, such as professional individual or personal individual accounts. Individual contacts can also be grouped in lists or groups. The contact may have specified a preferred contact mode. When a user selects a contact, a contact display interface provides various information that the contact has made available to other users.

In addition, a user profile can be associated with a list of institutions, so that updates can also be sent to all institutions. For institutions with whom the user may be associated, a primary contact may be listed. Depending on the reason that the user is associated with a contact institution, the primary contact may be different for different users. When a contact institution is selected, a contact display interface provides various contact information about the institution. The contact information may also include maps, available hours, and other useful information.

When a user wants to use the trusted network, the user accesses an authentication page that requests a user ID and password. It will be appreciated that various web-based authentication mechanisms can be used to allow a user authenticated access to the trusted network such as, but not limited to, comparing IP address of user computer, key fobs, and certificated authentication. As mentioned earlier, a virus, Trojan or worm that does infect a user's computer and steals passwords and logins would still not be able to use those credentials remotely since the IP address would not match. The system would then ask for more information, such as a challenge/response, image recognition, or captcha process, before allowing access to the system.

Figure 7A:
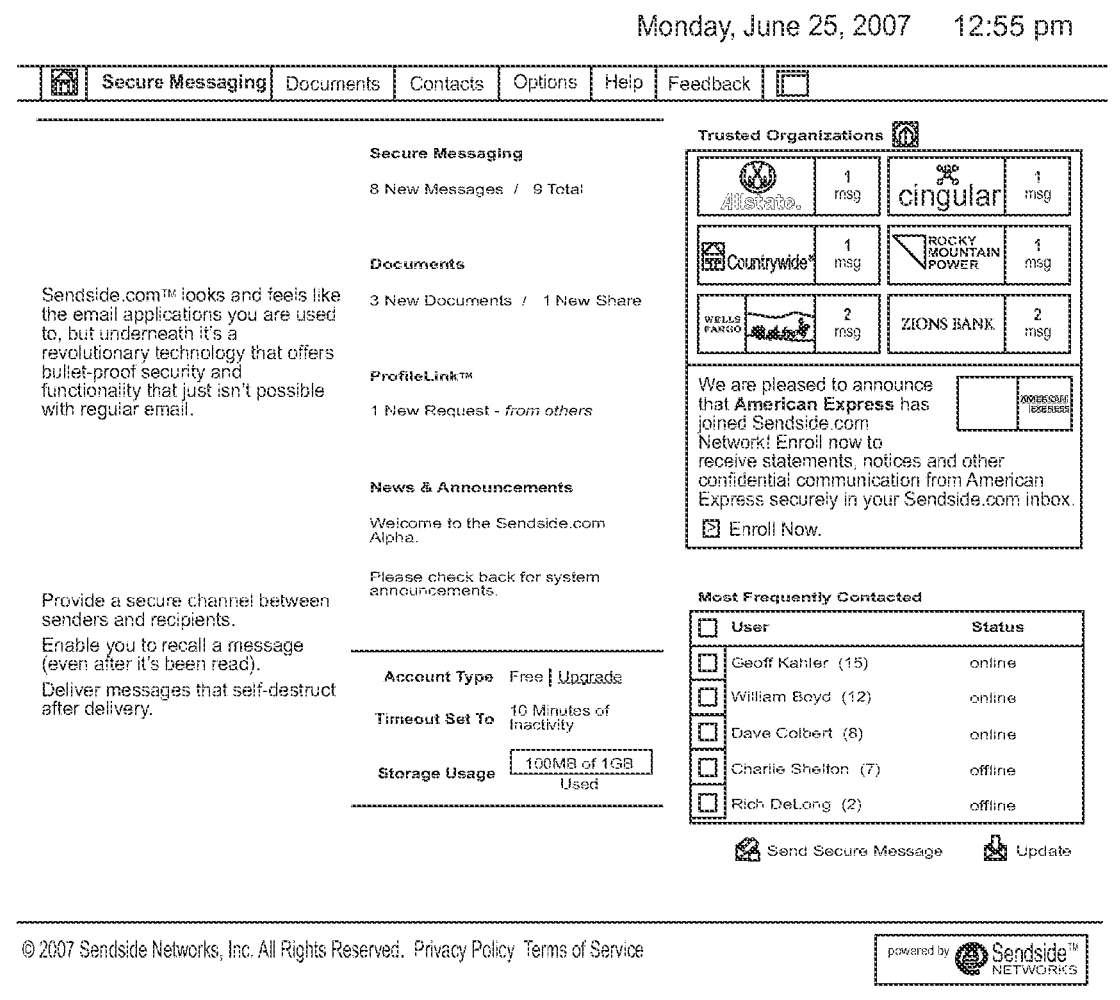

After successfully logging in, the user accesses a home page, depicted in FIG. 7A. The home page includes a message notification summary, document notification summary, a profile link request summary, as well as news/events. Tabs are provided to access secure messaging features, document control, contact management, options, and a help feature. Other account information can be displayed such as the timeout setting (i.e., how long the user has for the session to time out), the type of account (free v. upgrade), and the amount of storage used.

An institution summary displays contact institutions associated with the user and the number of new messages from each institution. A most-frequently-contacted application monitors with which contacts the user communicates most frequently and displays a dynamically updated list with a running tally. This list can be sorted by the user and it allows for presence of those in a users contacts list to know whether or not they are also on the system at the same time. The user is able to select a contact and immediately compose a secure message to that contact or can initiate a chat session with the contact.

Figure 7B:
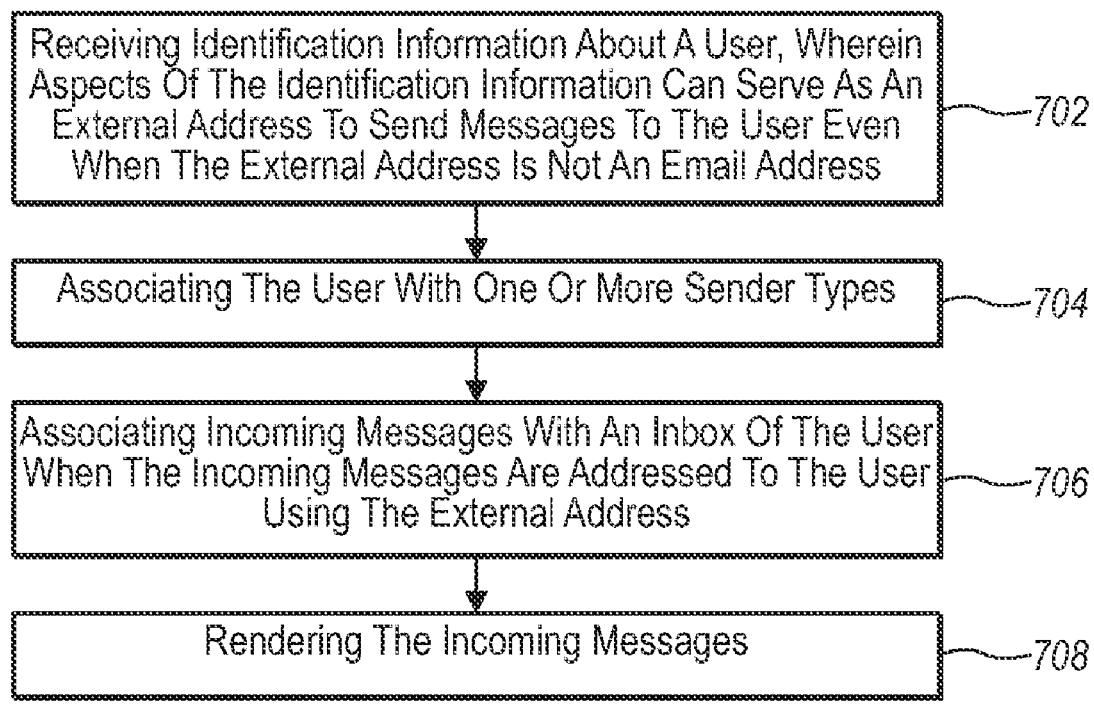
FIG. 7B illustrates an exemplary method for generating a user profile for a user to identify an external address.

The user profile can thus be used to obtain information to be used for sending messages to a user. With reference to FIG. 7B, an exemplary method for obtaining user profile information and sending messages to a user based on the user profile includes, at 702, receiving identification information about a user, wherein aspects of the identification information can serve as an external address to send messages to the user even when the external address is not an email address, at 704, associating the user with one or more sender types, at 706, associating incoming messages with an inbox of the user when the incoming messages are addressed to the user using the external address, and at 708, rendering the incoming messages.

Figure 7C:
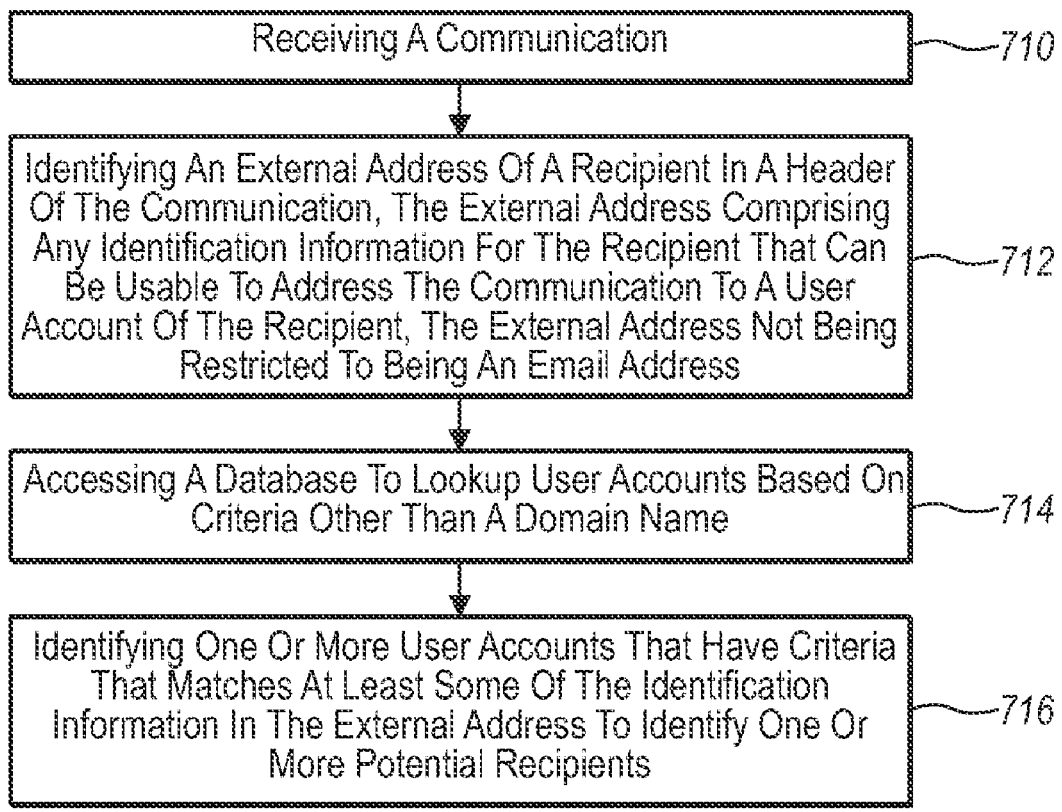
FIG. 7C illustrates an exemplary method for using an external address to send a message to a recipient.

Significantly, the external addressing feature provides an alternative mechanism to locating potential recipients of a communication. When the external address is not an email address, the message can still be sent to one or more recipients. FIG. 7C illustrates an exemplary method for communicating using a profile-base system including, at 710, receiving a communication, and at 712, identifying an external address of a recipient in a header of the communication, the external address comprising any identification information for the recipient that can be usable to address the communication to a user account of the recipient, the external address not being restricted to being an email address. When the external address is not an email address, the method includes, at 714, accessing a database to lookup user accounts based on criteria other than a domain name, and at 716, identifying one or more user accounts that have criteria that matches at least some of the identification information in the external address to identify one or more potential recipients.

When the correct recipient is identified, the communication is associated with an inbox of the recipient. Because one or more user accounts could conceivably have the same identification information contained in the external address, it may be necessary to attempt to narrow down the particular user who should receive the communication. Thus, additional verification from potential recipients and/or the sender may be required.

IX. Secure Messaging User Interface

FIG. 7A illustrates that a user can view various aspects of the secure messaging system, including a user's inbox, sent messages, drafts of messages, archived message, as well as deletion management. The present invention includes an advanced, granular notification system that is highly configurable by the sender and/or end-user. Thus, aspects of messaging which are configured when a sender composes a message result in advanced displaying capabilities for a user viewing a message.

Figure 7D:
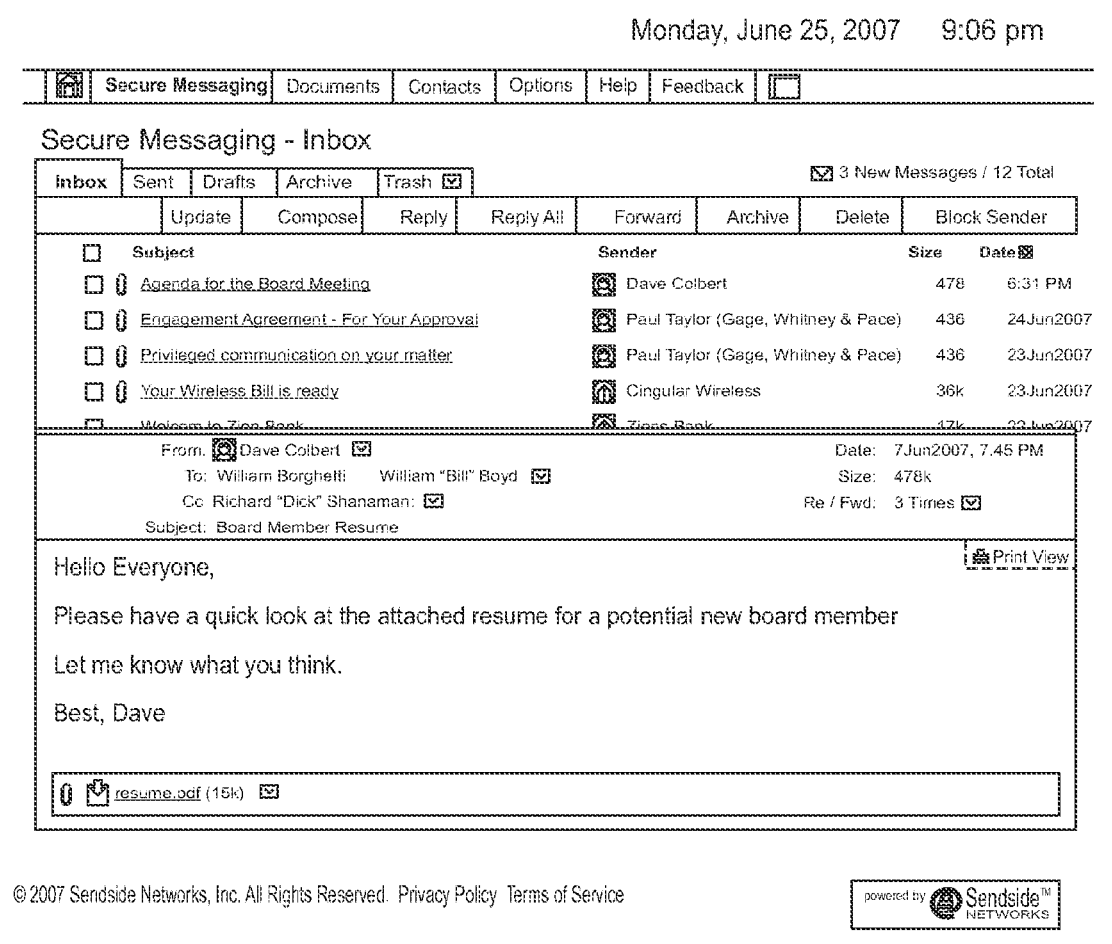

FIG. 7D depicts aspects of a user's inbox. When a rendering system receives a message, the rendering system analyzes the message to identify the sender, the sender type (individual, professional, institution), any content display instructions, such as multi-dimensional messaging instructions, content files, rights management that defines whether the recipient can copy, paste, forward, reply, delete, and the like.

As shown in FIG. 7D, messages in a user's inbox can be rendered along with various features about the message, which emphasize the trusted nature of the messaging. For example, if an institution sends a message, a symbol is displayed to represent that an institution is attempting to communicate with the user rather than an individual. Additionally, the message can be rendered differently, based on the sender type. Instead of a more traditional displaying, under the message list, logos of the institution can be displayed used to indicate greater importance or user focus.

The rendering system provides for dynamic rendering of messages. The rendering system examines variables and adjusts the inbox on the fly. Variables that can be adjusted include, but are not limited to, the sender ID, sender type (Institution, Professional, Individual), message type (Promotional, required, etc.), priority, urgency, and category. Displaying a user's inbox also does not require a page refresh or reload. In one embodiment, the inbox display can dynamically adjust the display without a page reload using an XMLHTTP request method, such as AJAX, to retrieve information without requiring the user to fully reload the page, making the user experience faster and more robust.

In one embodiment, automatic displaying of a message in a user's inbox is not permitted. The user is required to affirmatively select a message to be viewed. User access of a message is reported back to the sending system for trackability purposes, which will be described below. However, once a message is selected, it can be viewed along with basic information about the message, such as sender, recipient, CC recipients, subject, date, size, and basic tracking information. This prevents non-repudiation and helps provide the sender with more accurate information regarding read status and history.

FIG. 7E illustrates a compose message interface that allows a user to compose a message and send it. The message interface allows a user to perform traditional messaging functions such as specifying attachments (i.e., content files), identifying CC and BCC recipients, and the like. In addition, the message interface allows a user to select whether the message should be secure or unsecure. Although not depicted, the user could specify a time for delivery (i.e., immediately or delayed). As mentioned above, when a message is delivered in an unsecured manner, sending of the message follows conventional SMTP protocols, including sending a copy of the message and any attached content files to be stored at the recipient as well as being stored by the sending system.

Figure 7F:
FIG. 7F illustrates a screen shot of three-dimensional messaging page.

FIG. 7F depicts one example of a displaying of a three-dimensional message including message body, intranet documents, key dates, and team information. Advantageously, the recipient is presented all of this information without leaving the messaging environment. When each tabulation is rendered, it calls the corresponding content—such as SMTP message body, SMTP attachment, tabulation content, the link for web content, a file location for a document, and the like. The user can toggle between the different tabulations to view the content contained in each tabulation. The activity performed on each tabulation and the specific time of such activity can be logged. This can provide reporting features so that the sender can generate reports of how recipients interacted with the content, what recipients read, infer what recipients found to be most interesting, how long it took the recipients to read the content, etc.

One aspect of the invention is that all displaying of message components is done within the secure messaging environment created by the gateway and data center. For tabulations which contain third party content, the data center renders the third party content in a manner that does not require redirecting to the third party server. Another aspect of accessing third party content includes allowing an end-user to view password protected data within the secure messaging environment such that the end-user is not required to redirect to a different website and login a second time to view the password protected data.

X. Logging and Viewing of Messaging Activity

Figure 8A:
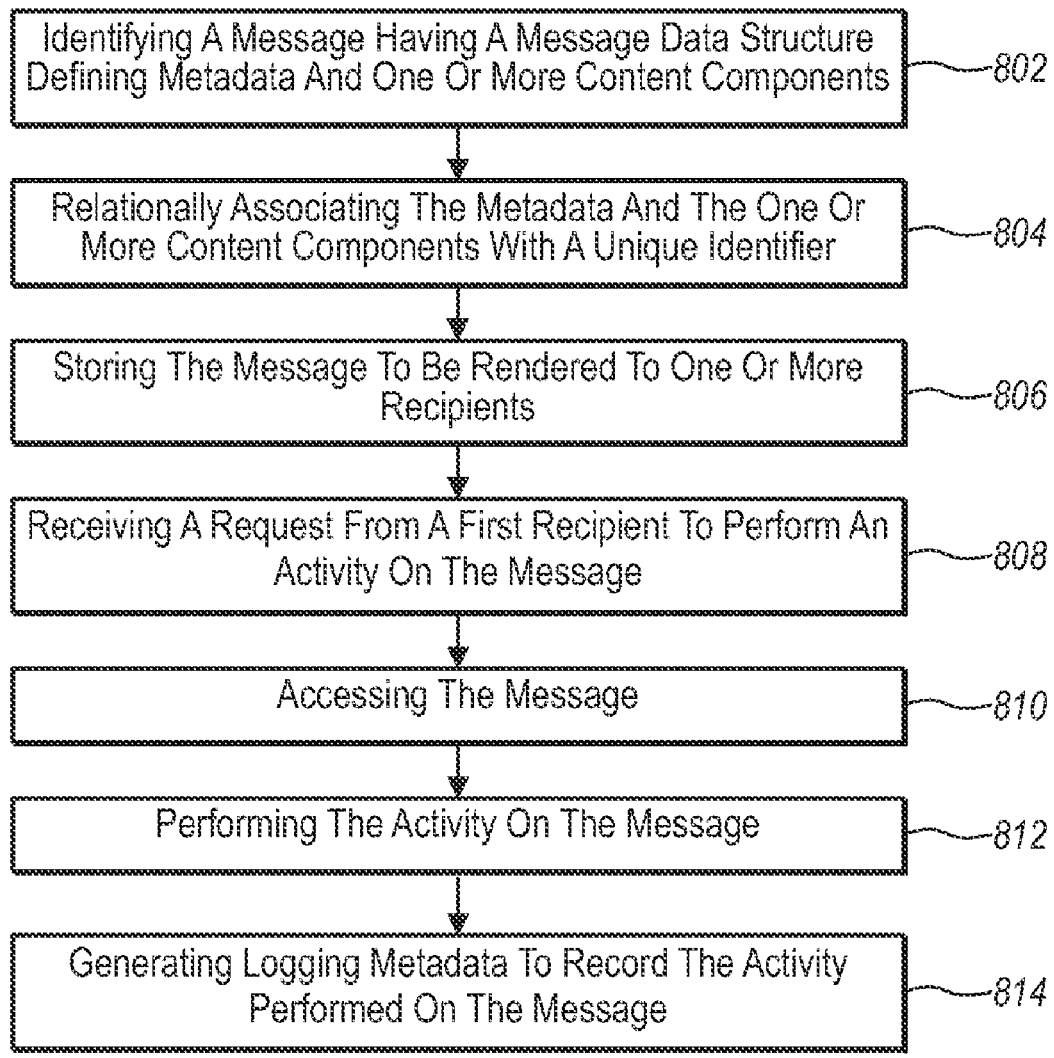
FIG. 8A illustrates an exemplary method for performing logging of activity on a message.

The sending system and rendering system also interact to log and view messaging activity occurring both at the sending system and the rendering system (also referred to herein as tracking features). FIG. 8A illustrates an exemplary method for logging and viewing activity on a message including, at 802, identifying a message having a message data structure defining metadata and one or more content components, at 804, relationally associating the metadata and the one or more content components with a unique identifier, at 806, storing the message to be rendered to one or more recipients, at 808, receiving a request from a first recipient to perform an activity on the message, at 810, accessing the message, at 812, performing the activity on the message, and at 814, generating logging metadata to record the activity performed on the message.

Message logging and delivery notifications (242; FIG. 2A) handles logging of delivery notifications which indicates when the message was sent, when the message was delivered to the data center and associated with an inbox of a recipient, when the message was rendered to the recipient, whether the recipient replied and to whom, whether the recipient hovered over a portion of the message, and whether the message was forwarded, deleted, recalled, and/or modified. Conventionally, this type of information was only available to members of an organization using an enterprise system to track message reading within the organizational boundaries. However, the present invention allows for members of the organization to track behavior outside of the confines of the organizational boundary.

One aspect of the invention is that rendering of a message to a recipient requires a recipient to affirmatively acknowledge the message. So, at the protocol level, a message cannot be viewed without returning a read receipt to the sending system. Therefore, a message read receipt has added assurance that the message was affirmatively selected by a user for viewing, whereas conventional SMTP technology allows messages to be automatically opened (i.e., read) without the user being required to necessarily "select" a message to be read.

With reference to FIGS. 8B through 8H illustrate various sending aspects that a user can view through the user's account for messages that have been sent by the user. FIG. 8B illustrates that a user can select a sent message and view the message body that was sent. FIG. 8C depicts a message summary associated with the sent message. The message summary provides a comprehensive dash board of which recipients have read the message, whether there are attached content files, the sending options selected for the message, the priority and category, the percentage of recipients who have and not read the message, the message reach, and recalls. All of this information is provided in a simple, visual format. The recipient list for a message can also be sorted by who has read the message and who has not.

Since SMP message content is not integrated with the message body, as it is with conventional SMTP messages, tracking of activities can be performed at a very granular level on each portion of the message including a SMTP header, SMTP message body, SMTP attachment, header and/or tabulation element, which has not been available in the prior art. Thus, the sender can view whether an aspect of the message content, such as a content file, was downloaded, viewed, forwarded, edited, and the like. FIG. 8D illustrates content file activity with regard to a message sent by the user. The content file activity displays the content file so that a user can select it for viewing and also displays which recipients have viewed the content file or not. The content file activity can display content files as distinct content, such as documents, images, videos, and the like.

FIG. 8E displays the reach of the message. For example, if recipients forward the message to others, the same type of tracking information can be obtained and viewed for subsequent generations of sending the message. The reach can be tracked for individual recipients as well as individual pieces of the content. Significantly, the sender is able to view the generations of activity that are performed by the recipients, as well as any other third parties to whom the recipients send the communication. This may allow a sender to understand messaging behavior with regard to a particular type of communication; or may allow a sender to be aware of undesirable activity being performed on the communication and to know the source of the undesirable activity.

Figure 8F:
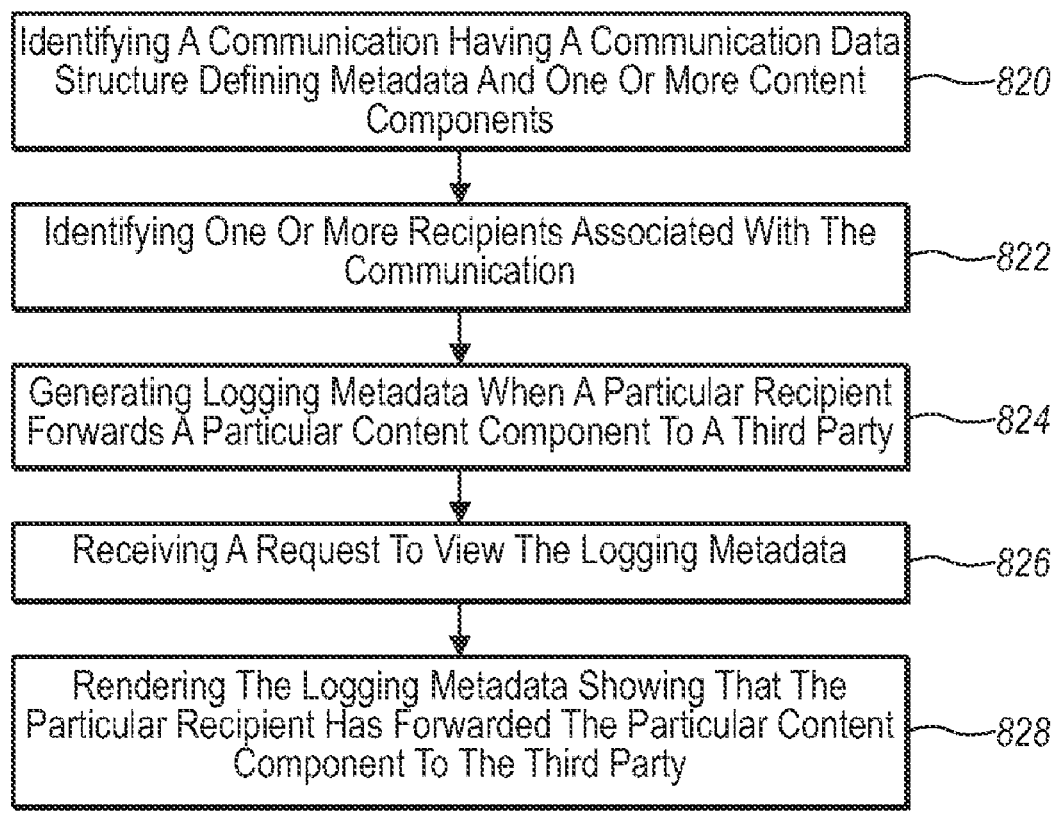
FIG. 8F illustrates an exemplary method for monitoring and rendering the reach of a message.

FIG. 8F depicts an exemplary embodiment for monitoring and rendering the reach of a communication, including, at 820, identifying a communication having a communication data structure defining metadata and one or more content components, at 822, identifying one or more recipients associated with the communication, at 824, generating logging metadata when a particular recipient forwards a particular content component to a third party, at 826, receiving a request to view the logging metadata, and at 828, rendering the logging metadata showing that the particular recipient has forwarded the particular content component to the third party.

After a recipient forwards the communication to a third party, the data center can monitor subsequent activity that the third party performs on the communication by generating logging metadata to record the activity performed on the communication by the third party. The subsequent activity can include when the third party hovering over a portion of the communication, deletes at least a portion of the communication, replies to at least a portion of the communication, forwards at least a portion of the communication, or recalls at least a portion of the communication. The data center can then render the subsequent activity to the sender when it receives a request to view the logging metadata for the third party.

FIG. 8G illustrates an activity log of the sender and recipients of the message and displays events such as message read, replied to message, message forwarded, viewed document, downloaded document, deleted document, deleted message, reminder sent, message recalled, and the like. A time stamp can also be displayed by each action taken on the sent message. Depending on how the sender has configured the read receipt configurations, the sender can receive a real-time notification of activity in the sender's sent box.

FIG. 8H shows that the user/sender is also allowed to generate a PDF report of tracking information. Since message activity is ongoing, this PDF report feature allows senders to take a "snapshot" in time of what is happening to a particular piece of communication.

The reporting could also be presented over various time periods. For example, if an organization sends a message to 10,000 recipients, the organization can obtain a report of what percentage of the recipients viewed the message the first day, first week, and first month after sending to determine the efficacy of the organization's message.

Other sending features available to the user include a reminder feature. By tracking which recipients have already read a message, the sending system can determine which recipients still have not read the message and earmark these recipients for sending a reminder message. In one embodiment, when a user selects this feature, a dialog box appears which automatically lists the recipients who have not yet read the message. The recipients can be automatically selected and the sender allowed to de-select certain recipients to send the reminder to. Or, the recipients can be unselected, and the sender required to select certain recipients to send a reminder to. Upon clicking this feature for a given sent message, a dialog box would automatically appear with the recipients selected who have not yet read the message.

Another sending feature includes allowing a sender to recall a message, even after the message has been read by one or more recipients. The relational storage mechanisms of the present invention allow the message to be completely deleted from the recipients' inboxes. All logging of activity on messages and documents is associated with the unique ID of the message. This allows the sending system to track where components of a message are located in the trusted network and perform secondary or tertiary operations on them at some point in the future, such as recalling the message or content if necessary. In one embodiment, any sending system can recall a message if it discovers that a message is unsolicited and illegitimate so as to remove the message from the recipient's inbox before or even after it is read such that, to the recipients, it appears as if the message never existed.

Further, message components can be searched based on activity performed on the message and/or for a specific time period. Searching can be performed on a very granular level. For example, the user can search for all messages that she has sent but have not yet been viewed. Or, the user can search for all messages that have been forwarded by recipients of messages she has sent. Other searching queries are possible based on the teaching presented herein.

XI. Content File Management

Since the message data structures of the present invention are separable as compared to conventional SMTP message data structures, this allows for tracking of specific components of the message. As shown in FIGS. 9A through 9D, the user interface allows a user to view content file activity for content files that are received and/or sent by the user. Content files that can be viewed by a user include content files associated with a message (e.g., as an attachment), content files that are not associated with a message (the Shareholder Report example above) or shared content files that do not need to be resent. Thus, activity on content files is logged in much the same way as done with other message components. For example, when a user opens a content file, a read receipt is generated by the rendering system and sent back to the sending system.

As mentioned above, the relational storage aspects of the invention allow for only a single copy of the document to be stored on the network, which can be accessed by the users associated with the document. Not only is this efficient from a storage perspective, but also assists with easily identifying versions of a document and tracking dates that versions were created. Thus, as shown in FIG. 9A, the user can view a content file repository that can be identified by the source or sender. FIG. 9A also depicts that senders and recipients can search documents by a time variable—such as documents for today, this week, this month, this quarter, etc. FIG. 9A illustrates that auto-categorization features performed by the sending system can contribute to being able to organize documents in an efficient manner.

Figure 9B:
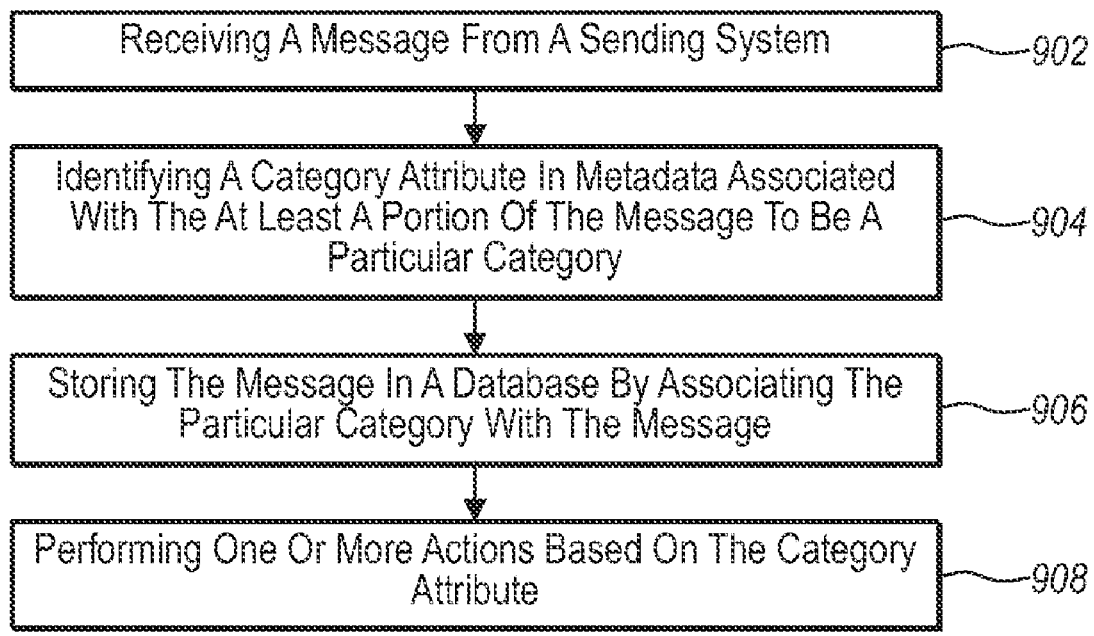
FIG. 9B illustrates an exemplary method for auto-categorizing message data.

FIG. 9B illustrates an exemplary method for using the category attribute to auto-categorize messages at the rendering system including, at 902, receiving a message from a sending system, at 904, identifying a category attribute in metadata associated with the at least a portion of the message to be a particular category, at 906, storing the message in a database by associating the particular category with the message, and at 908, performing one or more actions based on the category attribute.

As mentioned above, categories can be defined by an administrator, sender and/or recipient, even after the message is sent. Thus, a particular message may have been categorized by three separate entities, which categorization can be shared between sender and recipient to efficiently organize documents on both the sending and receiving ends. A particular document may have more than one categorization, so FIG. 9C illustrates that a user can select one or more categories to see what documents come up for that particular combination. This further assists a user to narrow a document search where a user's content file repository may be rather large. FIG. 9D depicts an advanced view of a content file repository where a user is allowed to search documents by file name and category.

Embodiments included general-purpose and/or special-purpose devices or systems that include both hardware and/or software components. Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a trusted network having at least one sending system and at least one rendering system, a method of categorizing content files for communications such that the content files are configured to be organized and/or rendered according to categorization associated with the content files, the method comprising:

identifying, by a computer, a communication to be delivered to a rendering system, the communication having a communication data structure defining metadata and two or more separable message components such that the two or more separable message components are configured to be sent and/or stored separately from each other;

identifying, by the computer, at least a portion of the communication to be categorized;

setting a categorization attribute in metadata associated with the at least a portion of the communication to be a particular category, wherein setting a categorization attribute in metadata associated with the at least a portion of the communication to be a particular category comprises defining a rule that automatically sets the categorization attribute to be the particular category upon identification of predetermined conditions;

performing one or more actions based on the categorization attribute; and sending the metadata associated with the at least a portion of the communication to the rendering system, the metadata associated with the at least a portion of the communication including the categorization attribute so that the rendering system renders the particular category to a recipient.

2. The method as recited in claim 1, wherein the predetermined conditions can include identifying a symbol, pattern, expression, or keyword in a content of the at least a portion of the communication.

3. The method as recited in claim 1, wherein the automatically set categorization attribute can be used to determine a timing for sending at least the metadata to the rendering system.

4. The method as recited in claim 1, wherein the particular category is associated with one or more recipients, wherein setting the categorization attribute to be the particular category sets a recipient attribute to include the one or more recipients associated with the particular category without a sender being required to manually select the one or more recipients.

5. The method as recited in claim 1, wherein the particular category is associated with one or more message types, wherein setting the categorization attribute to be the particular category sets a message type attribute to include one or more message types associated with the particular category without a sender being required to manually select the one or more message types.

6. The method as recited in claim 1, wherein the particular category is associated with rights management rules, wherein setting the categorization attribute to be the particular category sets a rights management attribute to include one or more rights management rules associated with the particular category without a sender being required to manually select the one or more rights management rules.

7. The method as recited in claim 1, wherein performing one or more actions based on the categorization attribute comprises sending at least a portion of the communication to the rendering system, wherein the rendering system uses the particular categorization associated with at least a portion of the communication to perform search functions.

8. The method as recited in claim 1, wherein the particular category is at least one of invoice, statement, engagement letter, balance, or a combination thereof.

9. The method as recited in claim 1, wherein the particular category is an industry including at least one of banking, health care, legal, personal, or a combination thereof.

10. The method as recited in claim 9, wherein performing one or more actions based on the categorization attribute comprises adding third party content to the communication based on the industry.

11. The method as recited in claim 1, wherein the particular category is a particular level of authority in an organization.

12. The method as recited in claim 11, wherein performing one or more actions based on the categorization attribute comprises sending the communication only to users of the organization having the particular level of authority.

13. The method as recited in claim 11, further comprising setting certain rights management associated with the level of authority in the organization.

14. The method as recited in claim 1, wherein the communication is addressed to an external address being a matter, wherein the matter is associated with a particular category and the categorization attribute is set to a particular category.

15. The method as recited in claim 1, wherein setting a categorization attribute in metadata associated with the at least a portion of the communication to be a particular category is performed by at least one of an administrator, the sender, or the recipient, wherein the categorization attribute is linked to both the sender and the recipient, so that both the sender and the recipient can search for the communication based on the particular category.

16. The method as recited in claim 1, wherein setting a categorization attribute in metadata associated with the at least a portion of the communication to be a particular category comprises setting a particular category for the communication as a whole, and setting one or more additional categories for one or more content components of the communication.

17. A non-transitory computer-readable medium including instructions that are executable by a computer to cause the computer to categorize content files for communications such that the content files are configured to be organized and/or rendered according to categorization associated with the content files, by:
  identifying a communication to be delivered to a rendering system, the communication having a communication data structure defining metadata and two or more separable message components such that the two or more separable message components are configured to be sent and/or stored separately from each other;
  identifying at least a portion of the communication to be categorized;
  setting a categorization attribute in metadata associated with the at least a portion of the communication to be a particular category, wherein setting a categorization attribute in metadata associated with the at least a portion of the communication to be a particular category comprises defining a rule that automatically sets the categorization attribute to be the particular category upon identification of predetermined conditions;
  performing one or more actions based on the categorization attribute; and
  sending the metadata associated with the at least a portion of the communication to the rendering system, the metadata associated with the at least a portion of the communication including the categorization attribute so that the rendering system renders the particular category to a recipient.

* * * * *